(12) United States Patent
Kuchinsky et al.

(10) Patent No.: US 12,517,302 B2
(45) Date of Patent: Jan. 6, 2026

(54) MODE-SELECTIVE OPTICAL FIBER COUPLERS

(71) Applicant: CORNING INCORPORATED, Corning, NY (US)

(72) Inventors: Sergey Anatol'evich Kuchinsky, Helsinki (FI); Dmitri Vladislavovich Kuksenkov, Elmira, NY (US); Ming-Jun Li, Horseheads, NY (US); Vladimir Nikolaevich Nazarov, Espoo (FI); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 269 days.

(21) Appl. No.: 18/382,255

(22) Filed: Oct. 20, 2023

(65) Prior Publication Data

US 2024/0159966 A1  May 16, 2024

Related U.S. Application Data

(60) Provisional application No. 63/425,092, filed on Nov. 14, 2022.

(51) Int. Cl.
*G02B 6/14* (2006.01)
*G02B 6/26* (2006.01)
*G02B 6/02* (2006.01)

(52) U.S. Cl.
CPC .............. *G02B 6/14* (2013.01); *G02B 6/26* (2013.01); *G02B 6/02071* (2013.01); *G02B 6/021* (2013.01)

(58) Field of Classification Search
None
See application file for complete search history.

(56) References Cited

U.S. PATENT DOCUMENTS 4,054,366 A * 10/1977 Barnoski ............. G02B 6/2856
385/24
4,763,977 A * 8/1988 Kawasaki ........... G02B 6/2835
359/900

(Continued)

OTHER PUBLICATIONS

Chen et al., "Broadband mode-selective couplers based on tapered side-polished fibers", Optics Express vol. 29, Issue 13, pp. 19690-19702, (2021).

(Continued)

*Primary Examiner* — Jerry Rahll
(74) *Attorney, Agent, or Firm* — Amy T. Lang

(57) ABSTRACT

In embodiments, a mode selective optical fiber coupler may include a first propagation waveguide and a second propagation waveguide joined along a coupling length L. The first propagation waveguide and the second propagation waveguide may be tapered from an input face and an output face of the coupler to a midpoint of the coupler. An LP01 mode of an optical signal with a wavelength of 800-950 nm coupled into the first propagation waveguide propagates through the first propagation waveguide and is emitted from the first propagation waveguide. An LP01 loss of the coupler at the output face is less than 1.0 dB. An LP11 mode of the optical signal coupled into the first propagation waveguide is cross-coupled to the second propagation waveguide and is emitted from the second propagation waveguide. An LP11 loss of the coupler at the output face is less than 1.5 dB.

20 Claims, 16 Drawing Sheets

(56) References Cited

U.S. PATENT DOCUMENTS

| | | | |
|---|---|---|---|
| 4,828,350 A * | 5/1989 | Kim | G02B 6/2821 |
| | | | 385/28 |
| 5,717,798 A | 2/1998 | Strasser et al. | |
| 6,614,961 B2 * | 9/2003 | Kim | G02B 6/2835 |
| | | | 65/408 |
| 6,628,859 B2 | 9/2003 | Huang et al. | |
| 10,838,155 B2 * | 11/2020 | Kopp | G02B 6/3885 |
| 2006/0045451 A1 * | 3/2006 | Wu | G02B 6/02395 |
| | | | 385/127 |
| 2013/0230290 A1 * | 9/2013 | Evans | G02B 6/02019 |
| | | | 385/124 |
| 2021/0018689 A1 * | 1/2021 | Beaudoin | G02B 6/03633 |

OTHER PUBLICATIONS

Corral et al., "MIMO Equalization for Two-Mode Division Multiplexing over Standard SMF at 850 nm", Advanced Photonics Congress (IPR, Networks, NOMA, PS, Sensors, SPPCom) © OSA 2017, 3 pages.

Gonthier, F. et al., 'Tapered single-mode fibres and devices. Part 1: Adiabaticity criteria', IEE Proceedings J (Optoelectronics), 1991, 138, (5), pp. 343-354.

He et al., "Coupling analysis of non-circular-symmetric modes and design of orientation-insensitive few-mode fiber couplers", Optics Communications 383 (2017), pp. 42-49.

He et al., "Ultra-Low-Loss Broadband All-Fiber Mode Selective Couplers for MIMO-Less MDM Transmission", JLT, vol. 38, No. 8, Apr. 15, 2020, p. 2376.

Kim et., "High performance fused-type mode selective coupler for two-mode fiber devices", OFC 2000, paper TUB5, 3 pages.

Koshiba et., "Demonstration of mode-division multiplexing transmission over 10 km two-mode fiber with mode coupler", OFC 2011, paper OWA4, 3 pages.

Li et al., "88×3×112-GB/s WDM Transmission over 50 km of Three-Mode Fiber with Inline Few-Mode Fiber Amplifier", ECOC 2011, paper Th.13.C.2, pp. 1-3.

Llorente et al., "Modal selectivity at 850 nm employing standard single-mode couplers: Theory and experimental demonstration", Optics Communications 436 (2019) pp. 248-252.

Llorente et al., "Mode Conversion for Mode Division Multiplexing at 850 nm in Standard SMF", IEEE Photonics Technology Letters, vol. 29, No. 11, Jun. 1, 2017, p. 929.

Ming-Jun Li. et al., "Demonstration of SWDM Transmission over OM4 Multimode Fiber with Modal Dispersion Compensation", OFC 2017 © OSA 2017, 3 pages.

Plant et al., "850-nm VCSEL Transmission Over Standard Single-Mode Fiber Using Fiber Mode Filter", IEEE Photonics Technology Letters, vol. 24, No. 5, Mar. 1, 2012, p. 368.

Shaw et a., "Highly selective evanescent modal filter for two-mode optical fibers", Optics Letters, vol. 11, Issue 9, pp. 581-583 (1986).

Shieh et al., "Fabrication of a Low-Loss Fused Fiber Spatial-Mode Coupler for Few-Mode Transmission", IEEE Photonics Technology Letters, vol. 25, No. 20, Oct. 15, 2013, p. 1985.

* cited by examiner

Loss: 0.19dB
Cross-coupling: -17 dB

Loss: 0.17dB
Cross-coupling: -21.7 dB

MODE-SELECTIVE OPTICAL FIBER COUPLERS

This application claims the benefit of priority under 35 U.S.C § 120 of U.S. Provisional Application Ser. No. 63/425,092 filed on Nov. 14, 2022, the content of which is relied upon and incorporated herein by reference in its entirety.

BACKGROUND

Field

The present specification generally relates to couplers for optical fibers and, more particularly, to mode-selective optical fiber couplers.

Technical Background

Recent advances in optical data transmission technologies, such as time and wavelength-division multiplexing, as well as various multi-level modulation formats, have led to demonstration of up to 100 Tb/s transmission capacity or greater for single core, single mode optical fiber. Further transmission capacity increases may be achieved by space division multiplexing (SDM) techniques using either multi-core optical fibers (where different signals are transmitted in different individual cores of the fiber) or multi-mode optical fibers (where different signals are transmitted in different optical modes). The later approach is known as mode division multiplexing (MDM), and has received the interest of the optical transmission research community over the last years.

While conceptually simple, the implementation of MDM is technologically complex, as it requires minimization of the mode-mixing and differential mode attenuation, and a practical implementation for efficient mode multiplexing/demultiplexing (MUX/DEMUX). Initial demonstrations of MDM technology utilized free-space optics with high multiplexing losses due to the use of bulk optics for coupling and beam splitting/combining elements, and thus proved to be impractical. More recent developments related to the implementation of all-fiber mode-selective couplers for MDM technologies effective for improving losses suffer from other deficiencies such as narrow operating bandwidths and complex designs that are difficult to manufacture.

Accordingly, a need exists for alternative designs for mode-selective optical fiber couplers for use in mode-division multiplexing.

SUMMARY

According to a first aspect, a mode-selective optical fiber coupler includes: an input face and an output face separated by a coupling length L; a first propagation waveguide extending from the input face to the output face, the first propagation waveguide comprising a first core, a first inner cladding concentric with the first core, and a first outer cladding surrounding the first inner cladding, the first outer cladding having a first outer surface comprising a first arcuate segment and a first engagement segment; and a second propagation waveguide extending from the input face to the output face, the second propagation waveguide comprising a second core, a second inner cladding concentric with the second core, and a second outer cladding surrounding the second inner cladding, the second outer cladding having a second outer surface comprising a second arcuate segment and a second engagement segment, wherein: the first engagement segment and the second engagement segment are joined along the coupling length L; the first propagation waveguide and the second propagation waveguide are tapered from the input face and the output face to a midpoint of the coupler such that a tapered width dimension $W_t$ of the coupler at the midpoint is less than a full width dimension $W_f$ of the coupler at the input face and at the output face; an LP01 mode of an optical signal coupled into the first core at the input face propagates through the first propagation waveguide and is emitted from the first core at the output face, wherein an LP01 loss of the coupler at the output face is less than 1.0 dB for wavelengths in a spectral band having a bandwidth of less than or equal to 100 nm within a wavelength range from greater than or equal to 800 nm to less than or equal to 950 nm; and an LP11 mode of the optical signal coupled into the first core at the input face is cross-coupled to the second core and is emitted from the second core at the output face, wherein an LP11 loss of the coupler at the output face is less than 1.5 dB for wavelengths in the spectral band having the bandwidth of less than or equal to 100 nm within the wavelength range from greater than or equal to 800 nm to less than or equal to 950 nm.

A second aspect includes the coupler of the first aspect, wherein: the LP01 loss of the coupler at the output face is less than 0.5 dB for wavelengths in the spectral band having the bandwidth of less than or equal to 100 nm within the wavelength range from greater than or equal to 800 nm to less than or equal to 950 nm.

A third aspect includes the coupler of the first or second aspects, wherein: the LP11 loss of the coupler at the output face is less than 1.0 dB for wavelengths in the spectral band having the bandwidth of less than or equal to 100 nm within the wavelength range from greater than or equal to 800 nm to less than or equal to 950 nm.

A fourth aspect includes the coupler of any of the preceding aspects, wherein: an LP01 cross-talk of the coupler at the output face is less than −10 dB for wavelengths in the spectral band having the bandwidth of less than or equal to 100 nm within the wavelength range from greater than or equal to 800 nm to less than or equal to 950 nm.

A fifth aspect includes the coupler of any of the preceding aspects, wherein: an LP11 cross-talk of the coupler at the output face is less than −5 dB for wavelengths in the spectral band having the bandwidth of less than or equal to 100 nm within the wavelength range from greater than or equal to 800 nm to less than or equal to 950 nm.

A sixth aspect includes the coupler of any of the preceding aspects, wherein a core-to-core spacing between the first core and the second core is less than or equal to 67 μm at the input face and at the output face.

A seventh aspect includes the coupler of any of the preceding aspects, wherein the core-to-core spacing between the first core and the second core is greater than or equal to 63 μm at the input face and at the output face.

An eighth aspect includes the coupler of any of the preceding aspects, wherein the full width dimension $W_f$ of the coupler at the input face and the output face is less than 250 μm.

A ninth aspect includes the coupler of any of the preceding aspects, wherein a ratio of the tapered width dimension $W_t$ at the midpoint to the full width dimension $W_f$ at the input face or the output face is from greater than or equal to 0.14 to less than or equal to 0.26.

A tenth aspect includes the coupler of any of the preceding aspects, wherein a width dimension of the coupler varies adiabatically from the full width dimension $W_f$ at the input face and the output face to the tapered width dimension $W_t$ at the midpoint.

An eleventh aspect includes the coupler of any of the preceding aspects, wherein the first core and the second core each have a diameter greater than or equal to 8 μm and less than or equal to 10 μm at the input face and at the output face.

A twelfth aspect includes the coupler of any of the preceding aspects, wherein the first propagation waveguide and the second propagation waveguide are single-moded at a wavelength of greater than 1260 nm.

A thirteenth aspect includes the coupler of any of the preceding aspects, wherein the first inner cladding and the second inner cladding each have a diameter greater than or equal to 48 μm and less than or equal to 52 μm at the input face and at the output face.

A fourteenth aspect includes the coupler of any of the preceding aspects, wherein the first outer cladding and the second outer cladding each have a diameter less than or equal to 125 μm at the input face and at the output face.

A fifteenth aspect includes the coupler of any of the preceding aspects, wherein the coupling length L is greater than or equal to 24 mm and less than or equal to 30 mm.

A sixteenth aspect includes the coupler of any of the preceding aspects, wherein: the first core comprises a first core refractive index $n_{C1}$; the first inner cladding comprises a first inner cladding refractive index $n_{IC1}$; and the first outer cladding comprises a first outer cladding refractive index $n_{OC1}$, wherein $n_{C1} > n_{IC1} > n_{OC1}$.

A seventeenth aspect includes the coupler of any of the preceding aspects, wherein: the second core comprises a second core refractive index $n_{C2}$; the second inner cladding comprises a second inner cladding refractive index $n_{IC2}$; and the second outer cladding comprises a second outer cladding refractive index $n_{OC2}$, wherein $n_{C2} > n_{IC2} > n_{OC2}$.

An eighteenth aspect includes the coupler of any of the preceding aspects, wherein: $n_{C1}$ and $n_{C2}$ are greater than or equal to 1.455 and less than or equal to 1.46; $n_{IC1}$ and $n_{IC2}$ are greater than or equal to 1.45 and less than 1.455; and $n_{OC1}$ and $n_{OC2}$ are greater than or equal to 1.445 and less than 1.45.

A nineteenth aspect includes the coupler of any of the preceding aspects, wherein the first propagation waveguide and the second propagation waveguide are formed from silica-based glass.

A twentieth aspect includes a mode-selective optical fiber coupler comprising: an input face and an output face separated by a coupling length L; a first propagation waveguide extending from the input face to the output face, the first propagation waveguide comprising a first core, a first inner cladding concentric with the first core, and a first outer cladding surrounding the first inner cladding, the first outer cladding having a first outer surface comprising a first arcuate segment and a first engagement segment; and a second propagation waveguide extending from the input face to the output face, the second propagation waveguide comprising a second core, a second inner cladding concentric with the second core, and a second outer cladding surrounding the second inner cladding, the second outer cladding having a second outer surface comprising a second arcuate segment and a second engagement segment, wherein: the first engagement segment and the second engagement segment are joined along the coupling length L; the first propagation waveguide and the second propagation waveguide are tapered from the input face and the output face to a midpoint of the coupler such that a tapered width dimension $W_t$ of the coupler at the midpoint is less than a full width dimension $W_f$ of the coupler at the input face and at the output face; a first optical signal consisting of an LP01 mode coupled into the first core at the input face propagates through the first propagation waveguide and is emitted from the first core at the output face, wherein an LP01 loss of the coupler in the first propagation waveguide at the output face is less than 1.0 dB for wavelengths in a spectral band having a bandwidth of less than or equal to 100 nm with a wavelength range from greater than or equal to 800 nm to less than or equal to 950 nm; and a second optical signal comprising an LP11 mode coupled into the second core at the input face is cross-coupled to the first core and is emitted from the first core at the output face, wherein an LP11 loss of the coupler at the output face is less than 1.5 dB for wavelengths in the spectral band having the bandwidth of less than or equal to 100 nm with the wavelength range from greater than or equal to 800 nm to less than or equal to 950 nm.

A twenty-first aspect includes the coupler of the twentieth aspect, wherein: the LP01 loss of the coupler at the output face is less than 0.5 dB for wavelengths in the spectral band having the bandwidth of less than or equal to 100 nm within the wavelength range from greater than or equal to 800 nm to less than or equal to 950 nm.

A twenty-second aspect includes the coupler of any of the twentieth through twenty-first aspects, wherein: the LP11 loss of the coupler at the output face is less than 1.0 dB for wavelengths in the spectral band having the bandwidth of less than or equal to 100 nm within the wavelength range from greater than or equal to 800 nm to less than or equal to 950 nm.

A twenty-third aspect includes the coupler of any of the twentieth through twenty-second aspects, wherein: an LP01 cross-talk of the coupler at the output face is less than −20 dB for wavelengths in the spectral band having the bandwidth of less than or equal to 100 nm within the wavelength range from greater than or equal to 800 nm to less than or equal to 950 nm.

A twenty-fourth aspect includes the coupler of any of the twentieth through twenty-third aspects, wherein: an LP11 cross-talk of the coupler at the output face is less than or equal to −5 dB for wavelengths in the spectral band having the bandwidth of less than or equal to 100 nm within the wavelength range from greater than or equal to 800 nm to less than or equal to 950 nm.

A twenty-fifth aspect includes a mode-selective optical fiber coupler comprising: an input face and an output face separated by a coupling length L; a first propagation waveguide extending from the input face to the output face, the first propagation waveguide comprising a first core with first core refractive index $n_{C1}$, a first inner cladding concentric with the first core and having a first inner cladding refractive index Pict, and a first outer cladding surrounding the first inner cladding and having a first outer cladding refractive index $n_{OC1}$, the first outer cladding having a first outer surface comprising a first arcuate segment and a first engagement segment; and a second propagation waveguide extending from the input face to the output face, the second propagation waveguide comprising a second core with second core refractive index $n_{C2}$, a second inner cladding concentric with the second core and having a second inner cladding refractive index $n_{IC2}$, and a second outer cladding surrounding the second inner cladding and having a second outer cladding refractive index $n_{OC2}$, the second outer cladding having a second outer surface comprising a second arcuate segment and a second engagement segment, wherein: the first engagement segment and the second engagement segment are joined along the coupling length L; $n_{C1} > n_{IC1} > n_{OC1}$ and $n_{C2} > n_{IC2} > n_{OC2}$; the first propagation waveguide and the second propagation waveguide are tapered from the input face and the output face to a midpoint of the coupler such that a tapered width dimension $W_t$ of the coupler at the midpoint is less than a full width dimension $W_f$ of the coupler at the input face and at the output face and a ratio of $W_t$ to $W_f$ is greater than or equal to 0.14 and less than or equal to 0.26; and a core-to-core spacing between the first core and the second core is less than or equal to 67 µm at the input face and at the output face.

A twenty-sixth aspect includes the coupler of the twenty-fifth aspect, wherein an LP01 mode of an optical signal coupled into the first core at the input face propagates through the first propagation waveguide and is emitted from the first core at the output face, wherein an LP01 loss of the coupler at the output face is less than 1.0 dB for wavelengths in a spectral band having a bandwidth of less than or equal to 100 nm within a wavelength range from greater than or equal to 800 nm to less than or equal to 950 nm; and an LP11 mode of the optical signal coupled into the first core at the input face is cross-coupled to the second core and is emitted from the second core at the output face, wherein an LP11 loss of the coupler at the output face is less than 1.5 dB for wavelengths in the spectral band having the bandwidth of less than or equal to 100 nm within the wavelength range from greater than or equal to 800 nm to less than or equal to 950 nm.

A twenty-seventh aspect includes the coupler of any of the twenty-fifth through twenty-sixth aspects, wherein: an LP01 cross-talk of the coupler at the output face is less than −10 dB for wavelengths in the spectral band having the bandwidth of less than or equal to 100 nm within the wavelength range from greater than or equal to 800 nm to less than or equal to 950 nm.

A twenty-eighth aspect includes the coupler of any of the twenty-fifth through twenty-seventh aspects, wherein: an LP11 cross-talk of the coupler at the output face is less than −5 dB for wavelengths in the spectral band having the bandwidth of less than or equal to 100 nm within the wavelength range from greater than or equal to 800 nm to less than or equal to 950 nm.

A twenty-ninth aspect includes the coupler of any of the twenty-fifth through twenty-eighth aspects, wherein a first optical signal consisting of an LP01 mode coupled into the first core at the input face propagates through the first propagation waveguide and is emitted from the first core at the output face, wherein an LP01 loss of the coupler at the output face is less than 1.0 dB for wavelengths in a spectral band having a bandwidth of less than or equal to 100 nm within a wavelength range from greater than or equal to 800 nm to less than or equal to 950 nm; and a second optical signal comprising an LP11 mode coupled into the second core at the input face is cross-coupled to the first core and is emitted from the first core at the output face, wherein an LP11 loss of the coupler at the output face is less than 1.5 dB for wavelengths in the spectral band having the bandwidth of less than or equal to 100 nm within the wavelength range from greater than or equal to 800 nm to less than or equal to 950 nm.

A thirtieth aspect includes the coupler of any of the twenty-fifth through twenty-ninth aspects, wherein: an LP01 cross-talk of the coupler at the output face is less than −20 dB for wavelengths in the spectral band having the bandwidth of less than or equal to 100 nm within the wavelength range from greater than or equal to 800 nm to less than or equal to 950 nm.

A thirty-first aspect includes the coupler of any of the twenty-fifth through thirtieth aspects, wherein: an LP11 cross-talk of the coupler at the output face is less than or equal to −5 dB for wavelengths in the spectral band having the bandwidth of less than or equal to 100 nm within the wavelength range from greater than or equal to 800 nm to less than or equal to 950 nm.

A thirty-second aspect includes the coupler of any of the twenty-fifth through thirty-first aspects, wherein the core-to-core spacing between the first core and the second core is greater than or equal to 63 µm at the input face and at the output face.

A thirty-third aspect includes the coupler of any of the twenty-fifth through thirty-second aspects, wherein the full width dimension $W_f$ of the coupler at the input face and the output face is less than 250 µm.

A thirty-fourth aspect includes the coupler of any of the twenty-fifth through thirty-third aspects, wherein a width dimension of the coupler varies adiabatically from the full width dimension $W_f$ at the input face and the output face to the tapered width dimension $W_t$ at the midpoint.

A thirty-fifth aspect includes the coupler of any of the twenty-fifth through thirty-fourth aspects, wherein the first core and the second core each have a diameter greater than or equal to 8 µm and less than or equal to 10 µm at the input face and at the output face.

A thirty-sixth aspect includes the coupler of any of the twenty-fifth through thirty-fifth aspects, wherein the first propagation waveguide and the second propagation waveguide are single-moded at a wavelength of greater than 1260 nm.

A thirty-seventh aspect includes the coupler of any of the twenty-fifth through thirty-sixth aspects, wherein the first inner cladding and the second inner cladding each have a diameter greater than or equal to 48 µm and less than or equal to 52 µm at the input face and at the output face.

A thirty-eighth aspect includes the coupler of any of the twenty-fifth through thirty-seventh aspects, wherein the first outer cladding and the second outer cladding each have a diameter less than or equal to 125 µm at the input face and at the output face.

A thirty-ninth aspect includes the coupler of any of the twenty-fifth thirty-eighth aspects, wherein the coupling length L is greater than or equal to 24 mm and less than or equal to 30 mm.

A fortieth aspect includes the coupler of any of the twenty-fifth through thirty-ninth aspects, wherein the core-to-core spacing between the first core and the second core is greater than or equal to 63 µm at the input face and at the output face.

A forty-first aspect includes the coupler of any of the twenty-fifth through fortieth aspects, wherein the first propagation waveguide and the second propagation waveguide are formed from silica-based glass.

A forty-second aspect includes a mode-selective optical fiber coupler comprising: an input face and an output face separated by a coupling length L; a first propagation waveguide extending from the input face to the output face, the first propagation waveguide comprising a first core and a first outer cladding surrounding the first core, the first outer cladding having a first outer surface comprising a first arcuate segment and a first engagement segment; and a second propagation waveguide extending from the input face to the output face, the second propagation waveguide comprising a second core and a second outer cladding surrounding the second core, the second outer cladding having a second outer surface comprising a second arcuate segment and a second engagement segment, wherein: the first engagement segment and the second engagement segment are joined along the coupling length L; the first propagation waveguide is few-moded at 800 nm to 950 nm; the second propagation waveguide is single-moded at 850 nm; the first propagation waveguide and the second propagation waveguide are tapered from the input face and the output face to a midpoint of the coupler such that a tapered width dimension $W_t$ of the coupler at the midpoint is less than a full width dimension $W_f$ of the coupler at the input face and at the output face, the first core has a first input core diameter $D_{C1}$ at the input face and the second core has a second input core diameter $D_{C2}$ at the input face, wherein $D_{C2}<D_{C1}$; an LP01 mode of a first optical signal coupled into the first core at the input face propagates through the first propagation waveguide and is emitted from the first core at the output face, wherein an LP01 loss of the coupler at the output face is less than 1.0 dB for wavelengths in a spectral band having a bandwidth of less than or equal to 30 nm within a wavelength range from greater than or equal to 800 nm to less than or equal to 950 nm; and an LP01 mode of a second optical signal coupled into the second core at the input face is converted to an LP11 mode, cross-coupled to the first core, and emitted from the first core at the output face, wherein an LP11 loss of the coupler at the output face is less than 1.5 dB for wavelengths in the spectral band having the bandwidth of less than or equal to 30 nm within the wavelength range from greater than or equal to 800 nm to less than or equal to 950 nm.

A forty-third aspect includes the coupler of the forty-second aspect, wherein: an LP01 cross-talk of the coupler at the output face is less than −10 dB for wavelengths in the spectral band having the bandwidth of less than or equal to 30 nm within the wavelength range from greater than or equal to 800 nm to less than or equal to 950 nm.

A forty-fourth aspect includes the coupler of any of the forty-second through forty-third aspects, wherein: an LP11 cross-talk of the coupler at the output face is less than −5 dB for wavelengths in the spectral band having the bandwidth of less than or equal to 30 nm within the wavelength range from greater than or equal to 800 nm to less than or equal to 950 nm.

A forty-fifth aspect includes the coupler of any of the forty-second through forty-fourth aspects, wherein a core-to-core spacing between the first core and the second core is less than or equal to 67 μm at the input face and at the output face.

A forty-sixth aspect includes the coupler of any of the forty-second through forty-fifth aspects, wherein the core-to-core spacing between the first core and the second core is greater than or equal to 63 μm at the input face and at the output face.

A forty-seventh aspect includes the coupler of any of the forty-second through forty-sixth aspects, wherein the full width dimension $W_f$ of the coupler at the input face and the output face is less than 250 μm.

A forty-eighth aspect includes the coupler of any of the forty-second through forty-seventh aspects, wherein a ratio of the tapered width dimension $W_t$ at the midpoint to the full width dimension $W_f$ at the input face or the output face is from greater than or equal to 0.65 to less than or equal to 0.9.

A forty-ninth aspect includes the coupler of any of the forty-second through forty-eighth aspects, wherein a width dimension of the coupler varies adiabatically from the full width dimension $W_f$ at the input face and the output face to the tapered width dimension $W_t$ at the midpoint.

A fiftieth aspect includes the coupler of any of the forty-second through forty-ninth aspects, wherein $D_{C1}$ is greater than or equal to 7.7 μm and less than or equal to 10 μm.

A fifty-first aspect includes the coupler of any of the forty-second through fiftieth aspects, wherein $D_{C2}$ is greater than or equal to 2 μm and less than or equal to 7 μm.

A fifty-second aspect includes the coupler of any of the forty-second through fifty-first aspects, wherein a ratio of a diameter of the second core of the second propagation waveguide at a midpoint $M_P$ of the coupler to a diameter of the second core of the second propagation waveguide at the input face is greater than or equal to 0.65 and less than or equal to 0.9.

A fifty-third aspect includes the coupler of any of the forty-second through fifty-second aspects, wherein a ratio of a diameter of the first core of the first propagation waveguide at a midpoint $M_P$ of the coupler to a diameter of the first core of the first propagation waveguide at the input face is greater than or equal to 0.65 and less than or equal to 0.9.

A fifty-fourth aspect includes the coupler of any of the forty-second through fifty-third aspects, wherein the first outer cladding and the second outer cladding each have a diameter less than or equal to 125 μm at the input face and at the output face.

A fifty-fifth aspect includes the coupler of any of the forty-second through fifty-fourth aspects, wherein the coupling length L is greater than or equal to 24 mm and less than or equal to 30 mm.

A fifty-sixth aspect includes the coupler of any of the forty-second through fifty-fifth aspects, wherein: the first core comprises a first core refractive index $n_{C1}$; and the first outer cladding comprises a first outer cladding refractive index $n_{OC1}$, wherein $n_{C1}>n_{OC1}$.

A fifty-seventh aspect includes the coupler of any of the forty-second through fifty-sixth aspects, wherein: the second core comprises a second core refractive index $n_{C2}$; and the second outer cladding comprises a second outer cladding refractive index $n_{OC2}$, wherein $n_{C2}>n_{OC2}$.

A fifty-eighth aspect includes the coupler of any of the forty-second through fifty-seventh aspects, wherein: $n_{C1}$ and $n_{C2}$ are greater than or equal to 1.455 and less than or equal to 1.46; and $n_{OC1}$ and $n_{OC2}$ are greater than or equal to 1.445 and less than 1.45.

A fifty-ninth aspect includes the coupler of any of the forty-second through fifty-eighth aspects, wherein the first propagation waveguide and the second propagation waveguide are formed from silica-based glass.

A sixtieth aspect may include a method of making a mode-selective optical fiber coupler, the method comprising: polishing an outer surface of a preform cane such that the outer surface comprises an arcuate segment and an engagement segment, the preform cane comprising a core portion with a core refractive index $n_{C1}$ and an outer cladding portion surrounding the core portion and having an outer cladding refractive index $n_{OC1}$; drawing a coupler preform fiber from the preform cane; segmenting the coupler preform fiber into a first preform fiber and a second preform fiber, the first preform fiber comprising a first engagement segment and the second preform fiber comprising a second engagement segment; mating the first preform fiber and the second preform fiber along the first engagement segment and the second engagement segment and sleeving the first preform fiber and the second preform fiber in a capillary tube, thereby forming a preform assembly; fusing the first preform fiber, the second preform fiber, and the capillary tube; and locally heating a portion of the preform assembly at a midpoint of the preform assembly while tensioning the preform assembly thereby forming the mode-selective optical fiber coupler comprising a first propagation waveguide corresponding to the first preform fiber and a second propagation waveguide corresponding to the second preform fiber, wherein: $n_{C1}>n_{OC1}$; the first propagation waveguide and the second propagation waveguide are tapered from an input face and an output face to a midpoint of the coupler such that a tapered width dimension $W_t$ of the coupler at the midpoint is less than a full width dimension $W_f$ of the coupler at the input face and at the output face; and a core-to-core spacing between a first core of the first propagation waveguide and a second core of the second propagation waveguide is less than or equal to 67 µm at the input face and at the output face.

A sixty-first aspect includes the coupler of the sixtieth aspect, further comprising, prior to the mating: locally heating a middle portion of the second preform fiber; and drawing the second preform fiber to reduce a diameter of the second preform fiber.

A sixty-second aspect includes the coupler of any of the sixtieth and sixty-first aspects, further comprising: introducing a test signal into the preform assembly during the heating and tensioning of the preform assembly; monitoring a power of LP01 modes output from the preform assembly during the heating and tensioning; and discontinuing the heating and tensioning when the power of the LP01 modes reaches a target value.

Additional features and advantages of the mode-selective optical fiber couplers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
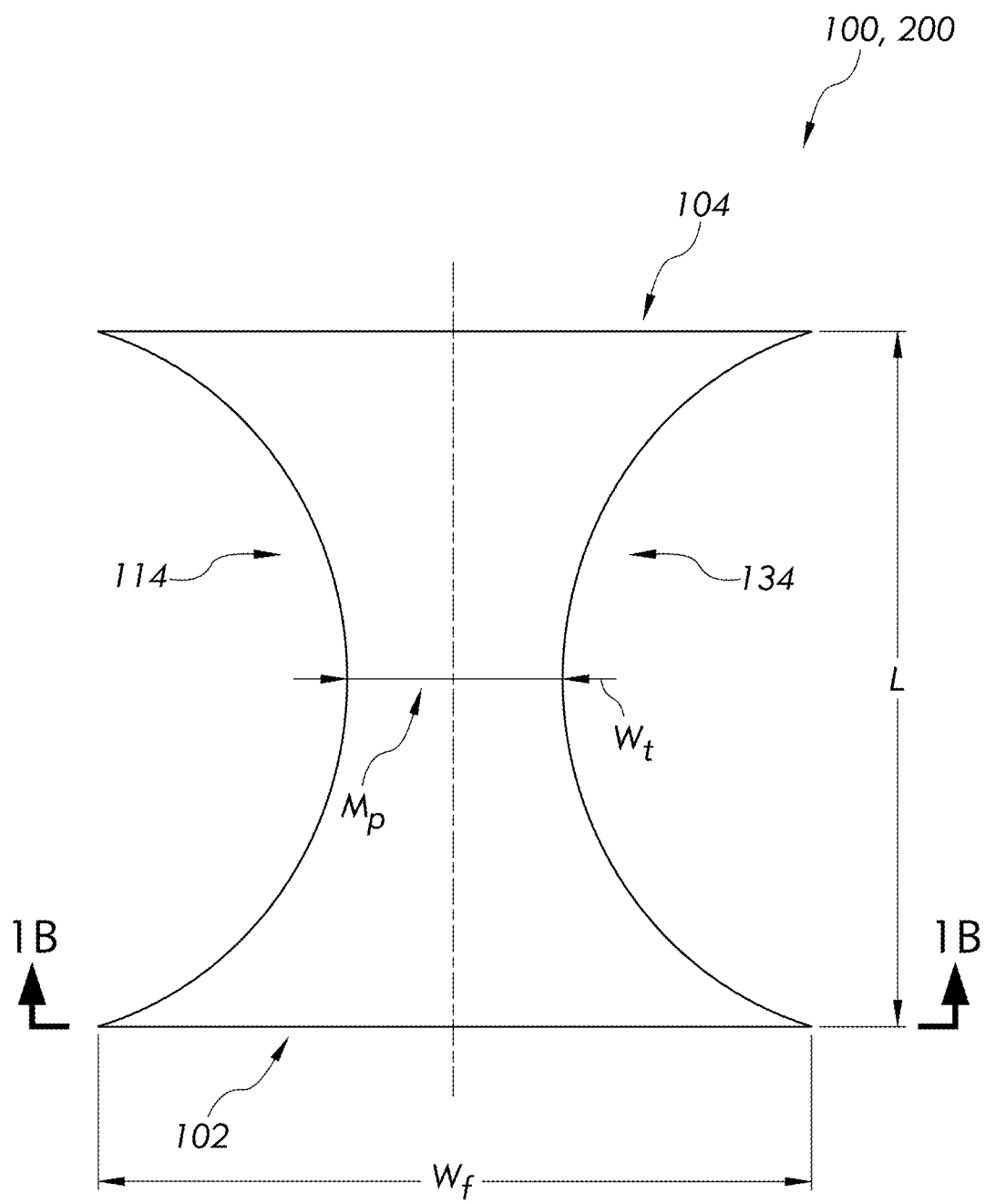
FIG. 1A schematically depicts an axial view of a mode-selective optical fiber coupler, according to one or more embodiments shown and described herein.

Reference will now be made in detail to embodiments of mode-selective optical fiber couplers, embodiments of which are illustrated in the accompanying drawings. Whenever possible, the same reference numerals will be used throughout the drawings to refer to the same or like parts.

Figure 1B:
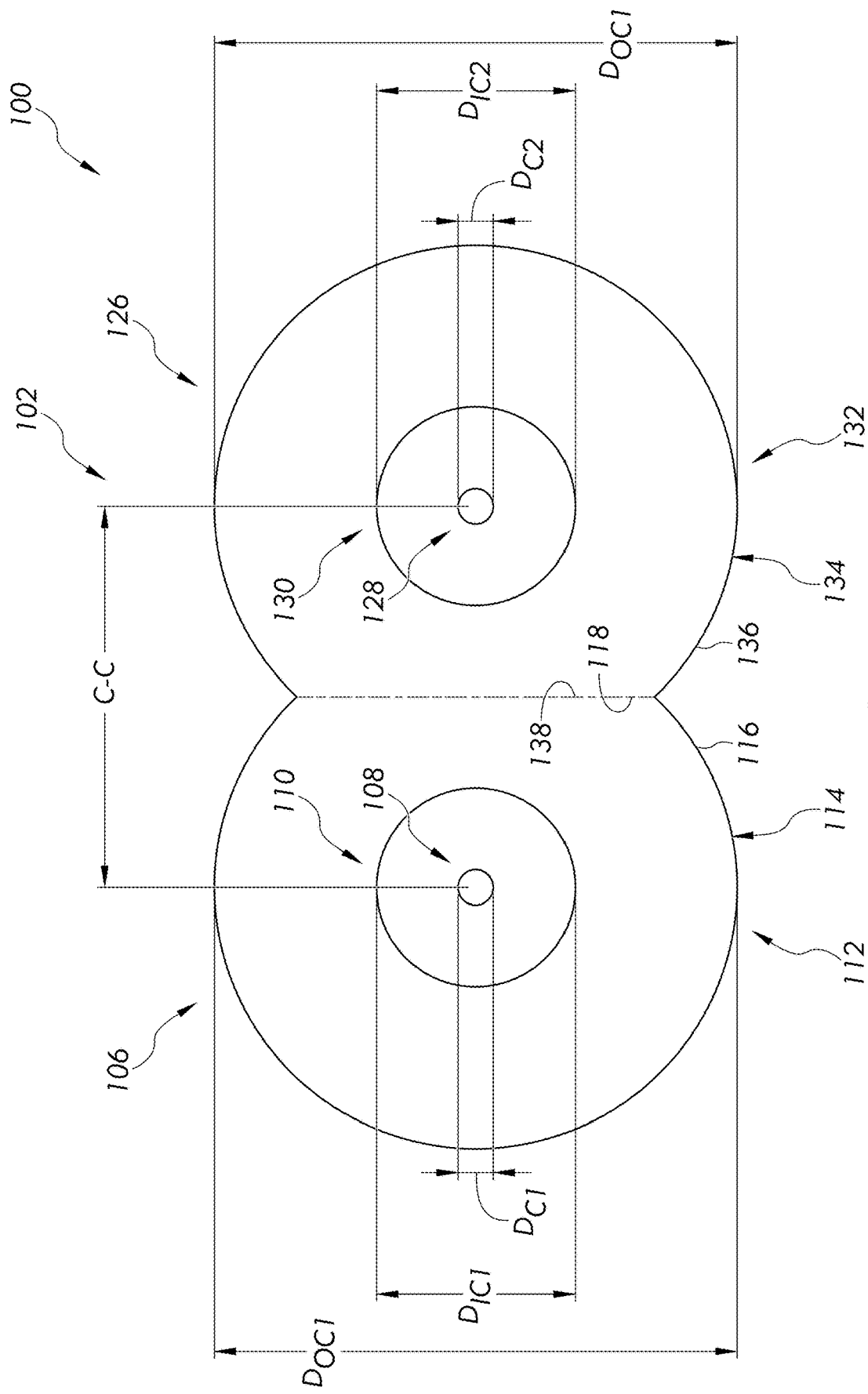
FIG. 1B schematically depicts a cross-sectional view of the mode-selective optical fiber coupler of FIG. 1A along the line 1B-1B, according to one or more embodiments shown and described herein.

An embodiment of a mode-selective optical fiber coupler is schematically depicted in FIGS. 1A-1B. The mode-selective optical fiber coupler generally comprises an input face and an output face separated by a coupling length L, a first propagation waveguide extending from the input face to the output face, and a second propagation waveguide extending from the input face to the output face. The first propagation waveguide may include a first core, a first inner cladding concentric with the first core, and a first outer cladding surrounding the first inner cladding. The first outer cladding comprises a first outer surface comprising a first arcuate segment and a first engagement segment. The second propagation waveguide may include a second core, a second inner cladding concentric with the second core, and a second outer cladding surrounding the second inner cladding. The second outer cladding may include a second outer surface comprising a second arcuate segment and a second engagement segment. The first engagement segment and the second engagement segment are joined along the coupling length L of the coupler. The first propagation waveguide and the second propagation waveguide are tapered from the input face and the output face to a midpoint of the coupler such that a tapered width dimension $W_t$ of the coupler at the midpoint is less than a full width dimension $W_f$ of the coupler at the input face and at the output face. An LP01 mode of an optical signal coupled into the first core at the input face propagates through the first propagation waveguide and is emitted from the first core at the output face. An LP01 loss of the coupler at the output face is less than 1.0 dB for wavelengths in a spectral band having a bandwidth of less than or equal to 100 nm within a wavelength range from greater than or equal to 800 nm to less than or equal to 950 nm. An LP11 mode of the optical signal coupled into the first core at the input face is cross-coupled to the second core and is emitted from the second core at the output face. An LP11 loss of the coupler at the output face is less than 1.5 dB for wavelengths in the spectral band having the bandwidth of less than or equal to 100 nm within the wavelength range from greater than or equal to 800 nm to less than or equal to 950 nm. Various embodiments of mode-selective optical fiber couplers will be described herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The "relative refractive index" or "relative refractive index percent" as used herein with respect to the waveguides of the mode-selective optical fiber coupler is defined according to equation (1):

$$\Delta\% = 100\frac{n^2(r) - n_{Ref}^2}{2n^2(r)} \quad (1)$$

where n(r) is the refractive index at the radial distance r from the waveguide's centerline (corresponding to r=0) and $n_{Ref}$ is the reference refractive index, in this case the refractive index of pure (undoped) silica glass (i.e., $n_{Ref}$=1.452@850 nm). The refractive indices are measured at a wavelength of 850 nm, unless otherwise specified. As used herein, the relative refractive index is represented by Δ (or "delta") or Δ % (or "delta %") and its values are given in units of "%" or "% Δ", unless otherwise specified. Relative refractive index may also be expressed as Δ(r) or Δ(r) %. When the refractive index of a region is less than the reference index $n_{Ref}$, the relative refractive index is negative and can be referred to as a trench or depressed region. When the refractive index of a region is greater than the reference index $n_{Ref}$, the relative refractive index is positive and the region can be said to be raised or have a positive relative refractive index.

The "refractive index profile" is the relationship between refractive index or relative refractive index and radial distance r from the waveguide's centerline for each waveguide of the mode-selective optical fiber coupler. For refractive index or relative refractive index profiles depicted herein as having relatively sharp boundaries between various regions, normal variations in processing conditions appreciated in the art may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the refractive index or relative refractive index may vary with radial position within the core and/or any of the claddings of the waveguide. When refractive index or relative refractive index varies with radial position in a particular region of the waveguide (within a core and/or any of the claddings of the waveguide), it may be expressed in terms of its actual or approximate functional dependence or in terms of an average value applicable to the region. Unless otherwise specified, if the relative refractive index of a region (the core and/or any of the inner and/or outer claddings) is expressed as a single value, it is understood that the refractive index or relative refractive index in the region is constant, or approximately constant, and corresponds to the single value or that the single value represents an average value of a non-constant relative refractive index dependence with radial position in the region. Whether by design or as a consequence of normal manufacturing variability, the dependence of refractive index or relative refractive index on radial position may be sloped, curved, or otherwise non-constant.

The term "α-profile" (also referred to as an "alpha profile") refers to a relative refractive index profile Δ(r) of the core region that has the following functional form (2):

$$\Delta(r) = \Delta(r_0)\left\{1 - \left[\frac{|r - r_0|}{(r - r_0)}\right]^\alpha\right\} \quad (2)$$

where $r_o$ is the point at which Δ(r) is maximum, $r_1$ is the point at which Δ(r) is zero (disposed radially outward of $r_o$), and r is in the range $r_i \leq r \leq r_f$, where $r_i$ is the initial point of the α-profile, $r_f$ is the final point of the α-profile, and α is a real number, referred to herein as an "alpha value." In some embodiments, examples shown herein can have a core with an alpha profile having an alpha value of 1≤α≤100. In practice, in an actual waveguide, even when the target profile is an alpha profile, some level of deviation from the ideal configuration can occur. Therefore, the alpha value for an optical fiber may be obtained from a best fit of the measured index profile, as is known in the art.

The term "graded-index profile" refers to an alpha profile, where α<10. The term "step-index profile" refers to an alpha profile, where α≥10.

An "up-dopant" is a substance added to a glass that has a propensity to raise the refractive index relative to pure undoped silica. Examples of up-dopants include $GeO_2$ (germania), $Al_2O_3$, $P_2O_5$, $TiO_2$, Cl, Br, and alkali metal oxides, such as $K_2O$, $Na_2O$, $Li_2O$, $Cs_2O$, $Rb_2O$, and mixtures thereof.

A "down-dopant" is a substance added to a glass that has a propensity to lower the refractive index relative to pure undoped silica. Examples of down-dopants include fluorine and boron.

The term "cross-talk" is a measure of how much power leaks from one waveguide to another waveguide of the mode-selective optical fiber coupler. The cross-talk can be determined based on the coupling coefficient from one waveguide to another waveguide, which depends on the refractive index profile design of the waveguides, specifically the distance between the two waveguides, the structure of the cladding region(s) surrounding the core region of the two waveguides, and Δβ, which depends on a difference in propagation constant β values between the waveguides.

The cross-talk (in dB) is used to describe cross-coupling between two modes, where the two modes can be in the same waveguide or in two different waveguides. If the launched power of one mode is $P_1$ and the cross-coupled power to another mode is $P_2$, the cross-talk between the two modes is given by equation (3):

$$X = 10\log\left(\frac{P_2}{P_1}\right). \quad (3)$$

The loss (in dB) refers to the attenuation of the power of an optical signal over the length of the mode-selective optical fiber coupler. In the present description, loss is reported for the LP01 mode of an optical signal (the "LP01 loss") propagating in the same waveguide. the loss of the LP11 mode of an optical signal (the "LP11 loss") is reported for the LP11 mode coupled to the adjacent waveguide of the mode-selective optical fiber coupler. Loss may be determined according to equation (4):

$$\text{Loss} = 10\log\left(\frac{P_2}{P_1}\right) \quad (4)$$

where P1 is the input power of the mode, and P2 is the output power of the mode.

As noted herein, mode division multiplexing in optical transmission technologies is of considerable interest for a variety of applications. For example, the application of MDM techniques for use with short-reach optical connections (such as those found in datacenters) include a combination of relatively inexpensive 850 nm vertical cavity surface emitting lasers (VCSELs), optical fibers that are two-moded at 850 nm (such as Corning® SMF-28® optical fiber), and mode-selective optical couplers. Commercially available optical fiber couplers specified for single-mode operation at a 1550 nm spectral band have been demonstrated as feasible for mode-selective operation at 850 nm (the wavelength of the VCSELs) with LP01 and LP11 modes, and thus are generally suitable for use in this application. However, the LP01 mode losses and LP11 mode losses in such couplers are excessively high at wavelengths of interest (i.e., 850 nm).

The mode-selective optical fiber couplers described herein mitigate the aforementioned problems and provide mode-selective optical fiber couplers with low LP01 losses and LP11 losses that support Short Wave Division Multiplexing (SWDM) transmission for wavelengths within the spectral band from 800 nm to 950 nm.

Figure 1C:
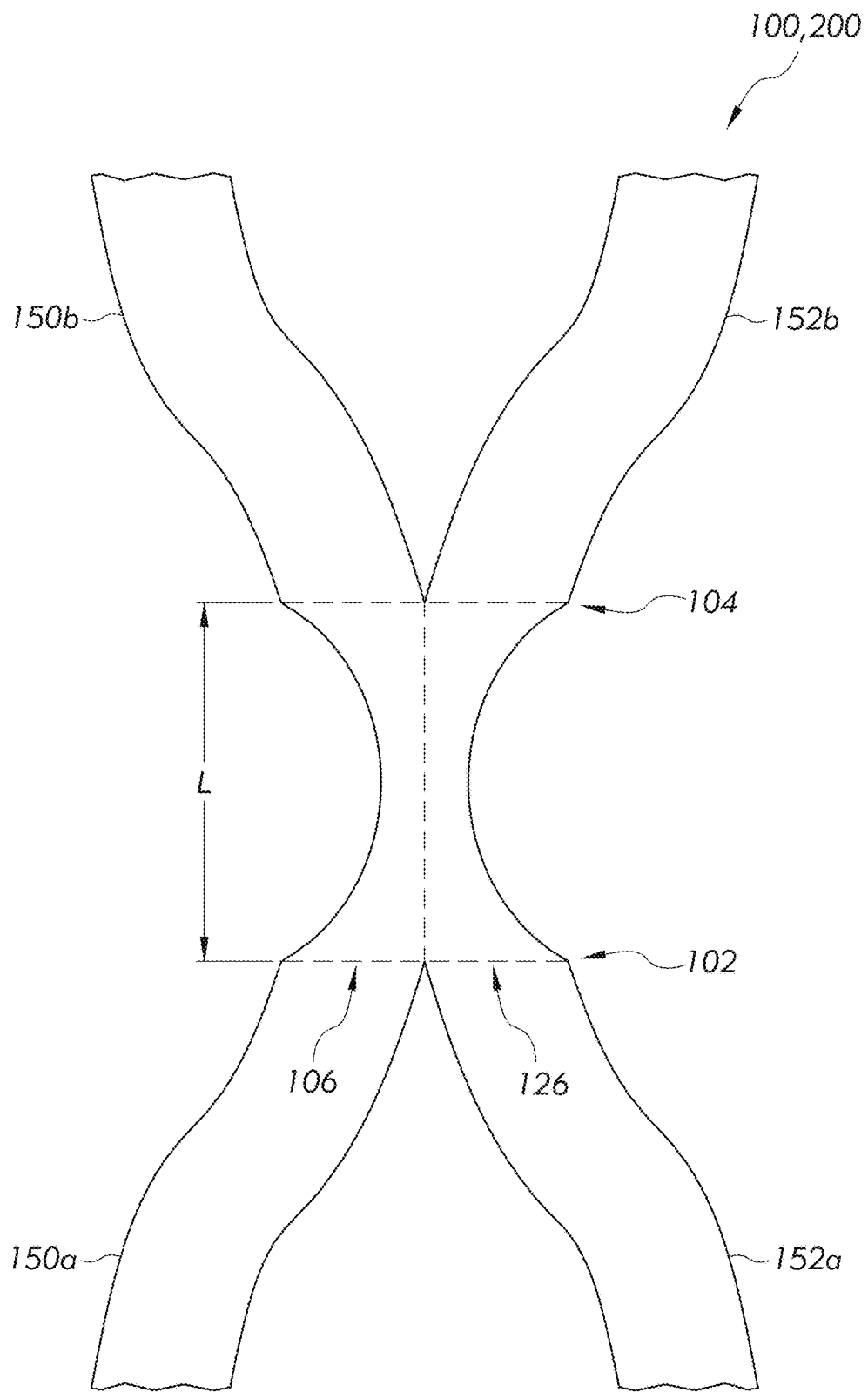
FIG. 1C schematically depicts an axial view of a mode-selective optical fiber coupler comprising leads extending from the input face and the output face, according to one or more embodiments shown and described herein FIG. 2A graphically depicts an example of a refractive index profile (Y-axis) as a function of radius (X-axis) of a propagation waveguide of a mode-selective optical fiber coupler, according to one or more embodiments shown and described herein.

Referring now to FIGS. 1A, 1B, and 1C, an embodiment of a mode-selective optical fiber coupler 100 (also referred to herein as the "coupler") along an axis of the coupler (FIG. 1A) and in cross section (FIG. 1B) along the line 1B-1B of FIG. 1A (i.e., a cross section of the coupler 100 through the plane of the input face 102). The coupler 100 generally comprises an input face 102, an output face 104, a first propagation waveguide 106, and a second propagation waveguide 126. In the embodiments described herein, the input face 102 and output face 104 of the coupler 100 are spaced apart by a coupling length L and the first propagation waveguide 106 and the second propagation waveguide 126 extend from the input face 102 to the output face 104 of the coupler. A midpoint $M_P$ of the coupler 100 is located in the length direction of the coupler at a distance L/2 from the input face 102 and the output face 104.

In embodiments, the coupler 100 may further comprise leads 150a, 150b, 152a, 152b (as shown in FIG. 1C), extending from the input face 102 and the output face 104 to facilitate coupling optical signals into the first propagation waveguide 106 and the second propagation waveguide 126 and coupling optical signals out of the first propagation waveguide 106 and the second propagation waveguide 126. For example, lead 150a may extend from the first propagation waveguide 106 at the input face 102 and lead 150b may extend from the first propagation waveguide 106 at the output face 104. Similarly, lead 152a may extend from the second propagation waveguide 126 at the input face 102 and lead 152b may extend from the second propagation waveguide 126 at the output face 104. The leads 150a, 150b, may be optical fibers that are structured and dimensioned to correspond to the structure and dimensions of the first propagation waveguide 106 at the input face 102 and the output face 104 and may be integrally formed with the first propagation waveguide 106. The leads 152a, 152b, may be optical fibers that are structured and dimensioned to correspond to the structure and dimensions of the second propagation waveguide 126 at the input face 102 and the output face 104 and may be integrally formed with the second propagation waveguide 126.

In embodiments described herein, the coupler 100 (including the first propagation waveguide 106 and the second propagation waveguide 126) is tapered from the input face 102 and the output face 104 to the midpoint $M_P$ of the coupler 100 to facilitate cross-coupling of optical signals, such as specific modes of optical signals, from one of the first propagation waveguide 106 and the second propagation waveguide 126 to the other of the first propagation waveguide 106 and the second propagation waveguide 126.

In particular, one or more optical signals may be coupled into (i.e., launched into) the first propagation waveguide 106 and/or the second propagation waveguide 126 at the input face 102 of the coupler 100, propagate over the coupling length L of the coupler 100, and exit the coupler 100 at the output face 104 of the coupler. As the optical signal(s) propagate through the coupler 100, a mode of the optical signal may be cross-coupled to an adjacent propagation waveguide (i.e., from one of the first propagation waveguide 106 or the second propagation waveguide 126 to the other of the first propagation waveguide 106 and the second propagation waveguide 126) and emitted from the output face of the coupler 100, as described in further detail herein. In embodiments, a mode of the optical signal may be converted to a second, different mode, cross-coupled to the adjacent propagation waveguide (i.e., from one of the first propagation waveguide 106 or the second propagation waveguide 126 to the other of the first propagation waveguide 106 and the second propagation waveguide 126) and emitted from the output face of the coupler, as described in further detail herein.

In embodiments, the coupling length L of the coupler is greater than or equal to 24 mm and less than or equal to 30 mm. For example, the coupling length L of the coupler 100 may be greater than or equal to 25 mm and less than or equal to 30 mm, greater than or equal to 26 mm and less than or equal to 30 mm, greater than or equal to 27 mm and less than or equal to 30 mm, greater than or equal to 24 mm and less than or equal to 29 mm, greater than or equal to 25 mm and less than or equal to 29 mm, greater than or equal to 26 mm and less than or equal to 29 mm, greater than or equal to 27 mm and less than or equal to 29 mm, or any range formed from any of these endpoints. If the coupling length L of the coupler 100 is greater than 30 mm, the form factor of the coupler 100 may be undesirable as the coupler 100 may take up excess space when deployed for use. If the coupling length L of the coupler 100 is less than 24 mm, it may be difficult to achieve sufficient adiabatic tapering of the coupler 100 (discussed in further detail herein) to arrive at the desired cross-coupling (or de-coupling) of optical signals propagating in the coupler 100.

In embodiments, the first propagation waveguide 106 comprises a first core 108, a first inner cladding 110, and a first outer cladding 112. The first inner cladding 110 surrounds and directly contacts the first core 108 such that the first inner cladding 110 and the first core 108 are concentric and circular symmetric in cross section with respect to an axial centerline of the first core 108 (i.e., circular symmetric with respect to the central axis of the first core 108 extending in the length direction of the coupler 100). The first outer cladding 112 surrounds and directly contacts the first inner cladding 110. In embodiments, the first outer cladding 112, the first inner cladding 110, and the first core 108 are concentric. However, it should be understood that, in other embodiments, the first outer cladding 112 may be non-concentric with the first inner cladding 110 and the first core 108. In embodiments, the first core 108 and the first inner cladding 110 are generally circular in cross section to facilitate mating and coupling to standard optical fibers. In embodiments described herein, the first outer cladding 112 is depicted as being partially circular in cross section, which also facilitates mating and coupling to standard optical fibers. However, it should be understood that the first outer cladding 112 may have other shapes in cross section.

In embodiments, the first core 108 has a diameter $D_{C1}$ greater than or equal to 8 µm and less than or equal to 10 µm at the input face 102 and/or the output face 104. For example, the diameter $D_{C1}$ of the first core 108 may be greater than or equal to 8.25 µm and less than or equal to 9.75 µm, greater than or equal to 8.5 µm and less than or equal to 9.5 µm, or even greater than or equal to 8.75 µm and less than or equal to 9.25 µm. In embodiments, the diameter $D_{C1}$ of the first core 108 may be greater than or equal to 8 µm and less than or equal to 9.75 µm, greater than or equal to 8 µm and less than or equal to 9.5 µm, greater than or equal to 8 µm and less than or equal to 9.25 µm, greater than or equal to 8 µm and less than or equal to 9 µm, greater than or equal to 8 µm and less than or equal to 8.75 µm, greater than or equal to 8 µm and less than or equal to 8.5 µm, greater than or equal to 8 µm and less than or equal to 8.25 µm, greater than or equal to 8.25 µm and less than or equal to 10 µm, greater than or equal to 8.5 µm and less than or equal to 10 µm, greater than or equal to 8.75 µm and less than or equal to 10 µm, greater than or equal to 9 µm and less than or equal to 10 µm, greater than or equal to 9.25 µm and less than or equal to 10 μm, greater than or equal to 9.5 μm and less than or equal to 10 μm, greater than or equal to 9.75 μm and less than or equal to 10 μm, or any range formed from any of the foregoing endpoints.

In embodiments, the first inner cladding 110 has a diameter $D_{IC1}$ greater than or equal to 48 μm and less than or equal to 50 μm at the input face 102 and/or the output face 104. For example, the diameter $D_{IC1}$ of the first inner cladding 110 may be greater than or equal to 48.25 μm and less than or equal to 49.75 μm, greater than or equal to 48.5 μm and less than or equal to 49.5 μm, or even greater than or equal to 48.75 μm and less than or equal to 49.25 μm. In embodiments, the diameter $D_{IC1}$ of the first inner cladding 110 may be greater than or equal to 48 μm and less than or equal to 49.75 μm, greater than or equal to 48 μm and less than or equal to 49.5 μm, greater than or equal to 48 μm and less than or equal to 49.25 μm, greater than or equal to 48 μm and less than or equal to 49 μm, greater than or equal to 48 μm and less than or equal to 48.75 μm, greater than or equal to 48 μm and less than or equal to 48.5 μm, greater than or equal to 48 μm and less than or equal to 48.25 μm, greater than or equal to 48.25 μm and less than or equal to 50 μm, greater than or equal to 48.5 μm and less than or equal to 50 μm, greater than or equal to 48.75 μm and less than or equal to 50 μm, greater than or equal to 49 μm and less than or equal to 50 μm, greater than or equal to 49.25 μm and less than or equal to 50 μm, greater than or equal to 49.5 μm and less than or equal to 50 μm, greater than or equal to 49.75 μm and less than or equal to 50 μm, or any range formed from any of the foregoing endpoints.

In embodiments, the first outer cladding 112 is sized to facilitate coupling the first propagation waveguide 106 to optical fibers having standardized dimensions. Accordingly, the first outer cladding 112 has a maximum diameter $D_{OC1}$ of less than or equal to 125 μm and greater than or equal to 115 μm at the input face 102 and/or the output face 104. In embodiments, the maximum diameter $D_{OC1}$ of the first outer cladding 112 may be greater than or equal to 116 μm and less than or equal to 125 μm, greater than or equal to 117 μm and less than or equal to 125 μm, greater than or equal to 118 μm and less than or equal to 125 μm, greater than or equal to 119 μm and less than or equal to 125 μm, greater than or equal to 120 μm and less than or equal to 125 μm, greater than or equal to 121 μm and less than or equal to 125 μm, greater than or equal to 122 μm and less than or equal to 125 μm, greater than or equal to 123 μm and less than or equal to 125 μm, greater than or equal to 124 μm and less than or equal to 125 μm, or any range formed from any of the foregoing endpoints.

In the embodiments of the coupler 100 described herein, the first outer cladding 112 comprises a first outer surface 114. The first outer surface 114 comprises a first arcuate segment 116 and a first engagement segment 118 along which the first propagation waveguide 106 is engaged with (such as fused to) a corresponding second engagement segment 138 of the second propagation waveguide 126. In embodiments, the first engagement segment 118 may be a linear segment, such as a flat, formed in the first outer surface 114 of the first outer cladding 112 during manufacture of the coupler 100. While the first engagement segment 118 is described herein as a linear segment, it should be understood that other forms of the first engagement segment 118 are contemplated and possible including, for example and without limitation, engagement segments with compound curvatures, engagement segments with saw-tooth profiles, engagement segments with square-tooth profiles, and the like.

In the embodiments described herein, the first core 108 comprises a first core refractive index $n_{C1}$ and a first core relative refractive index $\Delta_{C1}$, the first inner cladding 110 comprises a first inner cladding refractive index $n_{IC1}$ and a first inner cladding relative refractive index $\Delta_{IC1}$, and the first outer cladding 112 comprises a first outer cladding refractive index $n_{OC1}$ and a first outer cladding relative refractive index $\Delta_{OC1}$. The first core 108, the first inner cladding 110, and the first outer cladding 112 are formed from materials having indices of refraction such that $n_{C1} > n_{IC1} > n_{OC1}$ and $\Delta_{C1} > \Delta_{IC1} > \Delta_{OC1}$. For example, each of the first core 108, the first inner cladding 110, and the first outer cladding 112 may be formed from silica-based glass (including pure silica), and two or more of the first core 108, the first inner cladding 110, and the first outer cladding 112 may comprise dopants (such as up-dopants or down-dopants) to modify the refractive index of the silica-based glass relative to pure (un-doped) silica glass to achieve the desired refractive index relationship between the first core 108, first inner cladding 110, and first outer cladding 112.

For example, in embodiments, the first outer cladding 112 may comprise pure (un-doped) silica glass, the first inner cladding 110 may comprise silica-based glass with an up-dopant to increase the refractive index $n_{IC1}$ of the first inner cladding 110 relative to the refractive index $n_{OC1}$ of the first outer cladding 112, and the first core 108 may comprise silica-based glass with an up-dopant to increase the refractive index $n_{C1}$ of the first core 108 relative to the refractive index $n_{IC1}$ of the first inner cladding 110 such that $n_{C1} > n_{IC1} > n_{OC1}$ and $\Delta_{C1} > \Delta_{IC1} > \Delta_{OC1}$.

As another example, in embodiments, the first outer cladding 112 may comprise silica-based glass with a down-dopant to decrease the refractive index $n_{OC1}$ of the first outer cladding 112 relative to pure (un-doped) silica glass, the first inner cladding 110 may comprise pure (un-doped) silica glass or silica-based glass with an up-dopant or a down-dopant such that the refractive index $n_{IC1}$ of the first inner cladding 110 is greater than the refractive index $n_{OC1}$ of the first outer cladding 112, and the first core 108 may comprise silica-based glass with an up-dopant to increase the refractive index $n_{C1}$ of the first core 108 relative to the refractive index $n_{IC1}$ of the first inner cladding 110 such that $n_{C1} > n_{IC1} > n_{OC1}$ and $\Delta_{C1} > \Delta_{IC1} > \Delta_{OC1}$.

As yet another example, in embodiments, the first outer cladding 112 may comprise silica-based glass with an up-dopant to increase the refractive index $n_{OC1}$ of the first outer cladding 112 with respect to pure (un-doped) silica glass, the first inner cladding 110 may comprise silica-based glass with an up-dopant to increase the refractive index $n_{IC1}$ of the first inner cladding 110 relative to the refractive index $n_{IC1}$ of the first outer cladding 112, and the first core 108 may comprise silica-based glass with an up-dopant to increase the refractive index $n_{C1}$ of the first core 108 relative to the refractive index $n_{IC1}$ of the first inner cladding 110 such that $n_{C1} > n_{IC1} > n_{OC1}$ and $\Delta_{C1} > \Delta_{IC1} > \Delta_{OC1}$. The refractive index profile of this embodiment is graphically depicted in FIG. 2A which shows refractive index (at 850 nm) of each of the first core 108, first inner cladding 110, and first outer cladding 112 as a function of radial distance from the axial centerline of the first core 108 of the first propagation waveguide 106. FIG. 2B graphically depicts the relative refractive index profile of this same embodiment which shows the relative refractive index Δ (%) of each of the first core 108, first inner cladding 110, and first outer cladding 112 as a function of radial distance from the axial centerline of the first core 108 of the first propagation waveguide 106.

Figure 2A:
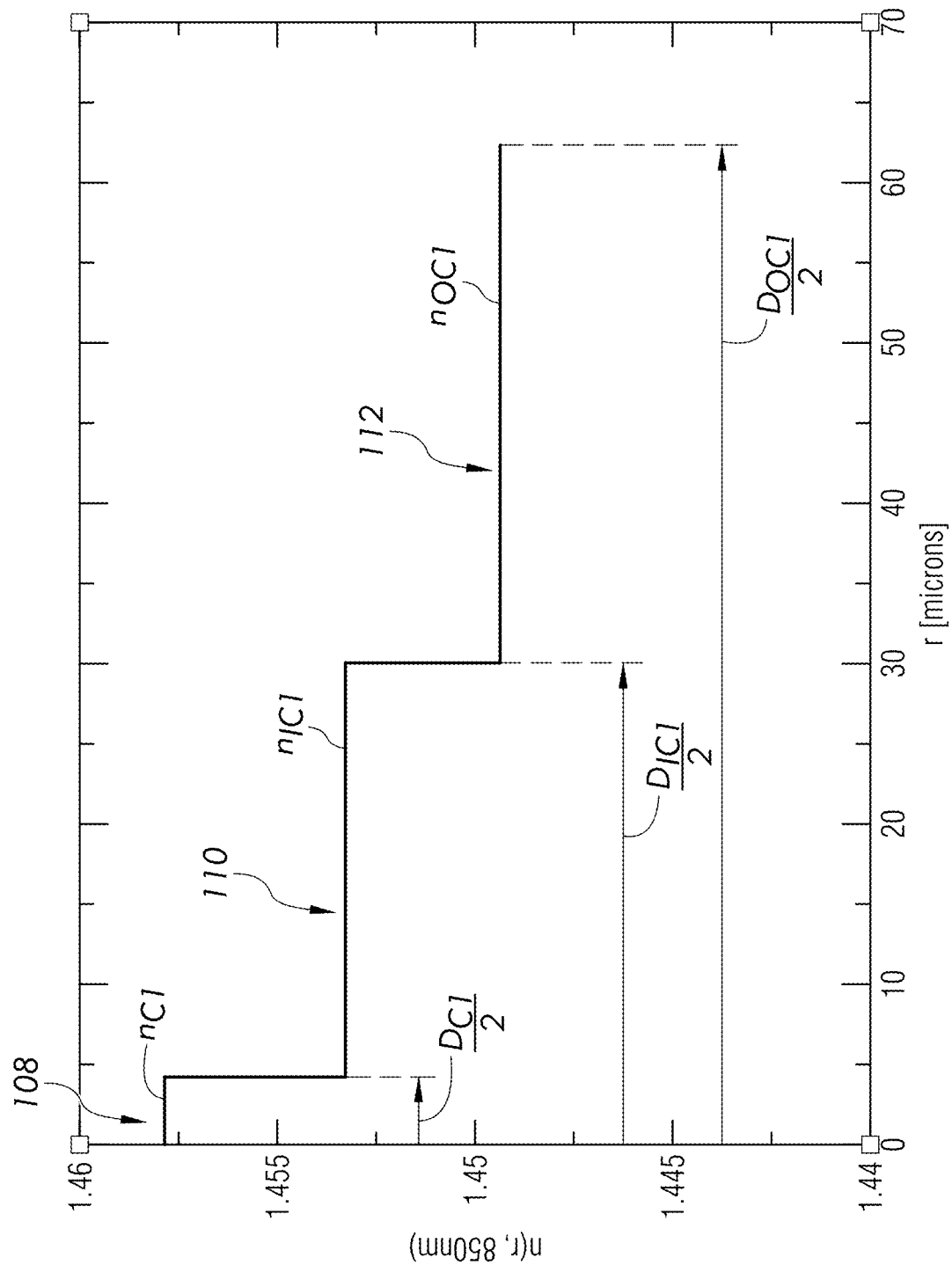
FIG. 2B graphically depicts an example of a relative refractive index profile (Y-axis) as a function of radius (X-axis) of a propagation waveguide of a mode-selective optical fiber coupler, according to one or more embodiments shown and described herein.
Figure 2B:
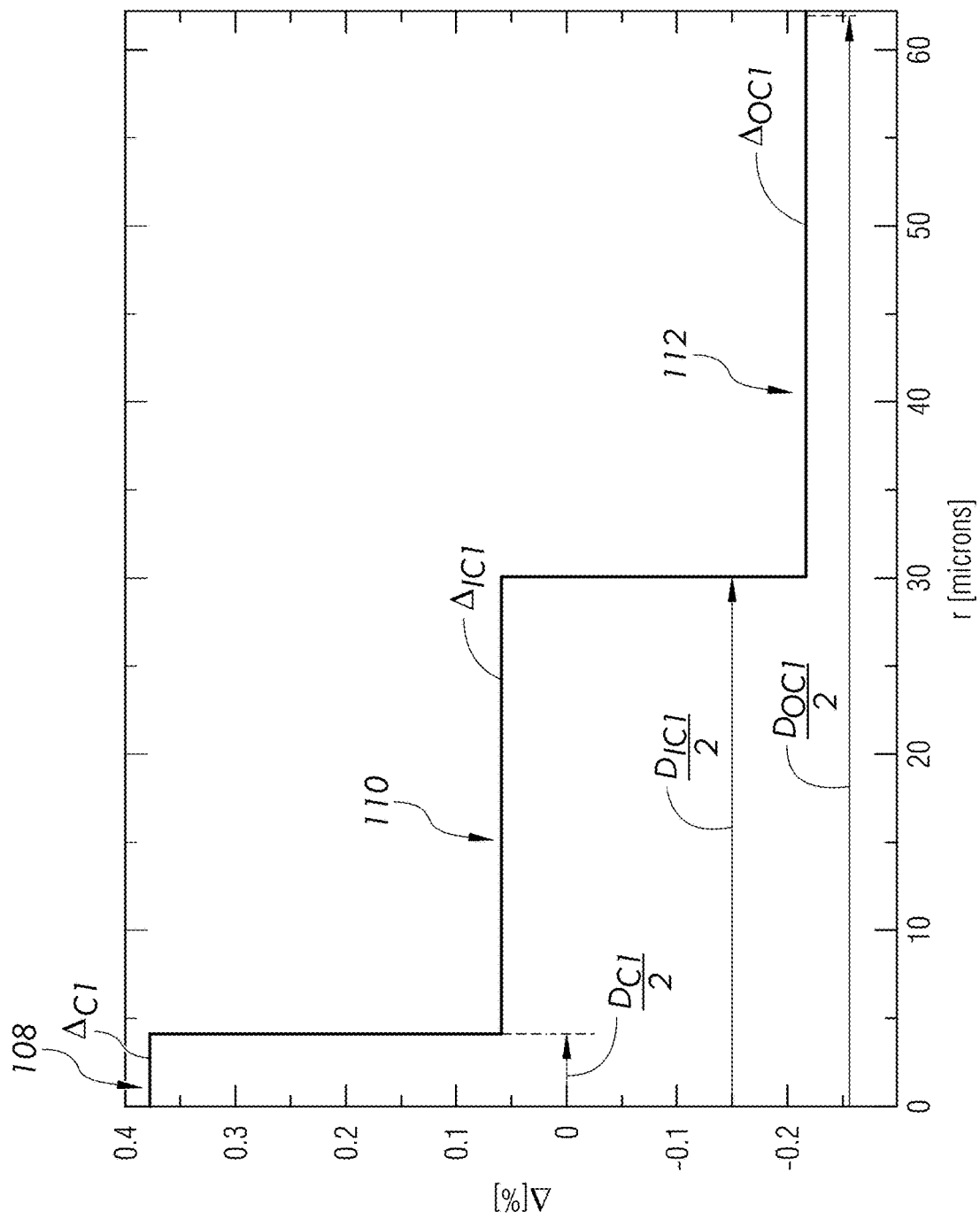

While FIGS. 2A and 2B graphically depict a refractive index profile and a relative refractive index profile in which each of the first core 108, first inner cladding 110, and first outer cladding 112 each comprise an up-dopant, it should be understood that the general shape of the refractive index profile depicted in FIG. 2A (i.e., where $n_{C1}>n_{IC1}>n_{OC1}$) and the general shape of the relative refractive index profile depicted in FIG. 2B (i.e., where $\Delta_{C1}>\Delta_{IC1}>\Delta_{OC1}$) are consistent with other embodiments of the refractive index profile and the relative refractive index profile of the first propagation waveguide 106 described herein.

In an embodiment, the index of refraction $n_{C1}$ of the first core 108 may be greater than or equal to 1.455 and less than or equal to 1.46; the index of refraction $n_{IC1}$ of the first inner cladding 110 may be greater than or equal to 1.45 and less than 1.455; and the index of refraction $n_{OC1}$ of the first outer cladding 112 may be greater than or equal to 1.445 and less than 1.45. However, it should be understood that other refractive index profiles for the first propagation waveguide 106 are contemplated and possible so long as $n_{C1}>n_{IC1}>n_{OC1}$.

In an embodiment, the relative refractive index $\Delta_{C1}$ of the first core 108 may be greater than or equal to 0.33% and less than or equal to 0.45%; the relative refractive index $\Delta_{IC1}$ of the first inner cladding 110 may be greater than or equal to 0% and less than 0.1%; and the relative refractive index $\Delta_{OC1}$ of the first outer cladding 112 may be greater than or equal to −0.2% and less than −0.35%. However, it should be understood that other relative refractive index profiles for the first propagation waveguide 106 are contemplated and possible so long as $\Delta_{C1}>\Delta_{IC1}>\Delta_{OC1}$.

Referring to FIGS. 1B and 2A-2B, the first core 108 of the first propagation waveguide 106 may have a step-index profile with a core alpha value greater than or equal to 10, as depicted in FIGS. 2A-2B. In such embodiments, the core alpha value may be greater than or equal to 20, or even greater than or equal to 30. However, it should be understood that other embodiments are contemplated and possible, such as embodiments where the first core 108 of the first propagation waveguide 106 has a graded-index profile with a core alpha value less than 10, such as less than or equal to 5, less than or equal to 4, less than or equal to 3, or even less than or equal to 2.

In embodiments, the first propagation waveguide 106 is single-moded at wavelengths greater than 1260 nm. In embodiments of the coupler 100 described herein, the first propagation waveguide 106 supports two propagating modes (LP01, LP11) within the wavelength range from 800 nm to 950 nm.

In embodiments, the second propagation waveguide 126 comprises a second core 128, a second inner cladding 130, and a second outer cladding 132. The second inner cladding 130 surrounds and directly contacts the second core 128 such that the second inner cladding 130 and the second core 128 are concentric and circular symmetric in cross section with respect to an axial centerline of the second core 128 (i.e., circular symmetric with respect to the central axis of the second core 128 extending in the length direction of the coupler 100). The second outer cladding 132 surrounds and directly contacts the second inner cladding 130. In embodiments, the second outer cladding 132, the second inner cladding 130, and the second core 128 are concentric. However, it should be understood that, in other embodiments, the second outer cladding 132 may be non-concentric with the second inner cladding 130 and the second core 128. In embodiments, the second core 128 and the second inner cladding 130 are generally circular in cross section to facilitate mating and coupling to standard optical fibers. In embodiments described herein, the second outer cladding 132 is depicted as being partially circular in cross section, which also facilitates mating and coupling to standard optical fibers. However, it should be understood that the second outer cladding 132 may have other shapes in cross section.

In embodiments, the second core 128 has a diameter $D_{C2}$ greater than or equal to 8 μm and less than or equal to 10 μm at the input face 102 and/or the output face 104. For example, the diameter $D_{C2}$ of the second core 128 may be greater than or equal to 8.25 μm and less than or equal to 9.75 μm, greater than or equal to 8.5 μm and less than or equal to 9.5 μm, or even greater than or equal to 8.75 μm and less than or equal to 9.25 μm. In embodiments, the diameter $D_{C2}$ of the second core 128 may be greater than or equal to 8 μm and less than or equal to 9.75 μm, greater than or equal to 8 μm and less than or equal to 9.5 μm, greater than or equal to 8 μm and less than or equal to 9.25 μm, greater than or equal to 8 μm and less than or equal to 9 μm, greater than or equal to 8 μm and less than or equal to 8.75 μm, greater than or equal to 8 μm and less than or equal to 8.5 μm, greater than or equal to 8 μm and less than or equal to 8.25 μm, greater than or equal to 8.25 μm and less than or equal to 10 μm, greater than or equal to 8.5 μm and less than or equal to 10 μm, greater than or equal to 8.75 μm and less than or equal to 10 μm, greater than or equal to 9 μm and less than or equal to 10 μm, greater than or equal to 9.25 μm and less than or equal to 10 μm, greater than or equal to 9.5 μm and less than or equal to 10 μm, greater than or equal to 9.75 μm and less than or equal to 10 μm, or any range formed from any of the foregoing endpoints.

In embodiments, the second inner cladding 130 has a diameter Dice greater than or equal to 48 μm and less than or equal to 50 μm at the input face 102 and/or the output face 104. For example, the diameter Dice of the second inner cladding 130 may be greater than or equal to 48.25 μm and less than or equal to 49.75 μm, greater than or equal to 48.5 μm and less than or equal to 49.5 μm, or even greater than or equal to 48.75 μm and less than or equal to 49.25 μm. In embodiments, the diameter Dice of the second inner cladding 130 may be greater than or equal to 48 μm and less than or equal to 49.75 μm, greater than or equal to 48 μm and less than or equal to 49.5 μm, greater than or equal to 48 μm and less than or equal to 49.25 μm, greater than or equal to 48 μm and less than or equal to 49 μm, greater than or equal to 48 μm and less than or equal to 48.75 μm, greater than or equal to 48 μm and less than or equal to 48.5 μm, greater than or equal to 48 μm and less than or equal to 48.25 μm, greater than or equal to 48.25 μm and less than or equal to 50 μm, greater than or equal to 48.5 μm and less than or equal to 50 μm, greater than or equal to 48.75 μm and less than or equal to 50 μm, greater than or equal to 49 μm and less than or equal to 50 μm, greater than or equal to 49.25 μm and less than or equal to 50 μm, greater than or equal to 49.5 μm and less than or equal to 50 μm, greater than or equal to 49.75 μm and less than or equal to 50 μm, or any range formed from any of the foregoing endpoints.

In embodiments, the second outer cladding 132 is sized to facilitate coupling the second propagation waveguide 126 to optical fibers having standardized dimensions. Accordingly, the second outer cladding 132 has a maximum diameter $D_{OC2}$ of less than or equal to 125 nm and greater than or equal to 115 μm at the input face 102 and/or the output face 104. In embodiment, the maximum diameter $D_{OC2}$ of the second outer cladding 132 may be greater than or equal to 116 μm and less than or equal to 125 μm, greater than or equal to 117 µm and less than or equal to 125 µm, greater than or equal to 118 µm and less than or equal to 125 µm, greater than or equal to 119 µm and less than or equal to 125 µm, greater than or equal to 120 µm and less than or equal to 125 µm, greater than or equal to 121 µm and less than or equal to 125 µm, greater than or equal to 122 µm and less than or equal to 125 µm, greater than or equal to 123 µm and less than or equal to 125 µm, greater than or equal to 124 µm and less than or equal to 125 µm, or any range formed from any of the foregoing endpoints.

In the embodiments of the coupler 100 described herein, the second outer cladding 132 comprises a second outer surface 134. The second outer surface 134 comprises a second arcuate segment 136 and a second engagement segment 138 along which the second propagation waveguide 126 is engaged with (such as fused to) the corresponding first engagement segment 118 of the first propagation waveguide 106. In embodiments, the second engagement segment 138 may be a linear segment, such as a flat, formed in the second outer surface 134 of the second outer cladding 132 during manufacture of the coupler 100. While the second engagement segment 138 is described herein as a linear segment, it should be understood that other forms of the second engagement segment 138 are contemplated and possible including, for example and without limitation, engagement segments with compound curvatures, engagement segments with saw-tooth profiles, engagement segments with square-tooth profiles, and the like.

In the embodiments described herein, the second core 128 comprises a second core refractive index $n_{C2}$ and a second core relative refractive index $\Delta_{C2}$, the second inner cladding 130 comprises a second inner cladding refractive index $n_{IC2}$ and a second inner cladding relative refractive index $\Delta_{IC2}$, and the second outer cladding 132 comprises a second outer cladding refractive index $n_{OC2}$ and a second outer cladding relative refractive index $\Delta_{OC2}$. The second core 128, the second inner cladding 130, and the second outer cladding 132 are formed from materials having indices of refraction such that $n_{C2} > n_{IC2} > n_{OC2}$ and $\Delta_{C2} > \Delta_{IC2} > \Delta_{OC2}$. For example, each of the second core 128, the second inner cladding 130, and the second outer cladding 132 may be formed from silica-based glass (including pure silica), and two or more of the second core 128, the second inner cladding 130, and the second outer cladding 132 may comprise dopants (such as up-dopants or down-dopants) to modify the refractive index of the silica-based glass relative to pure (un-doped) silica glass to achieve the desired refractive index relationship between the second core 128, second inner cladding 130, and second outer cladding 132.

For example, in embodiments, the second outer cladding 132 may comprise pure (un-doped) silica glass, the second inner cladding 130 may comprise silica-based glass with an up-dopant to increase the refractive index $n_{IC2}$ of the second inner cladding 130 relative to the refractive index $n_{OC2}$ of the second outer cladding 132, and the second core 128 may comprise silica-based glass with an up-dopant to increase the refractive index $n_{C2}$ of the second core 128 relative to the refractive index $n_{IC2}$ of the second inner cladding 130 such that $n_{C2} > n_{IC2} > n_{OC2}$ and $\Delta_{C2} > \Delta_{IC2} > \Delta_{OC2}$.

As another example, in embodiments, the second outer cladding 132 may comprise silica-based glass with a down-dopant to decrease the refractive index $n_{OC2}$ of the second outer cladding 132 relative to pure (un-doped) silica glass, the second inner cladding 130 may comprise pure (un-doped) silica glass or silica-based glass with an up-dopant or a down-dopant such that the refractive index $n_{IC2}$ of the second inner cladding 130 is greater than the refractive index $n_{OC2}$ of the second outer cladding 132, and the second core 128 may comprise silica-based glass with an up-dopant to increase the refractive index $n_{C2}$ of the second core 128 relative to the refractive index $n_{IC2}$ of the second inner cladding 130 such that $n_{C2} > n_{IC2} > n_{OC2}$ and $\Delta_{C2} > \Delta_{IC2} > \Delta_{OC2}$.

As yet another example, in embodiments, the second outer cladding 132 may comprise silica-based glass with an up-dopant to increase the refractive index $n_{OC2}$ of the second outer cladding 132 with respect to pure (un-doped) silica glass, the second inner cladding 130 may comprise silica-based glass with an up-dopant to increase the refractive index $n_{IC2}$ of the second inner cladding 130 relative to the refractive index $n_{IC2}$ of the second outer cladding 132, and the second core 128 may comprise silica-based glass with an up-dopant to increase the refractive index $n_{C2}$ of the second core 128 relative to the refractive index $n_{IC2}$ of the second inner cladding 130 such that $n_{C2} > n_{IC2} > n_{OC2}$ and $\Delta_{C2} > \Delta\Delta_{IC2} > \Delta_{OC2}$. The refractive index profile of this embodiment may be similar to the refractive index profile of the first propagation waveguide 106 graphically depicted in FIG. 2A and the relative refractive index profile may be similar to the relative refractive index profile of the first propagation waveguide 106 graphically depicted in FIG. 2B. However, it should be understood that the general shape of the refractive index profile depicted in FIG. 2A and the relative refractive index profile depicted in FIG. 2B are consistent with other embodiments of the refractive index profile and relative refractive index profile of the second propagation waveguide 126 described herein.

In an embodiment, the index of refraction $n_{C2}$ of the second core 128 may be greater than or equal to 1.455 and less than or equal to 1.46; the index of refraction $n_{IC2}$ of the second inner cladding 130 may be greater than or equal to 1.45 and less than 1.455; and the index of refraction $n_{OC2}$ of the second outer cladding 132 may be greater than or equal to 1.445 and less than 1.45. However, it should be understood that other refractive index profiles for the second propagation waveguide 126 are contemplated and possible so long as $n_{C2} > n_{IC2} > n_{OC2}$.

In an embodiment, the relative refractive index $\Delta_{C2}$ of the second core 128 may be greater than or equal to 0.33% and less than or equal to 0.45%; the relative refractive index $\Delta_{IC1}$ of the second inner cladding 130 may be greater than or equal to 0% and less than 0.1%; and the relative refractive index $\Delta_{OC2}$ of the second outer cladding 132 may be greater than or equal to −0.2% and less than −0.35%. However, it should be understood that other relative refractive index profiles for the second propagation waveguide 126 are contemplated and possible so long as $\Delta_{C2} > \Delta_{IC2} > \Delta_{OC2}$.

As described herein with respect to the first propagation waveguide 106, the second core 128 of the second propagation waveguide 126 may have a step-index profile with a core alpha value greater than or equal to 10. In such embodiments, the core alpha value may be greater than or equal to 20, or even greater than or equal to 30. However, it should be understood that other embodiments are contemplated and possible, such as embodiments where the second core 128 of the second propagation waveguide 126 has a graded-index profile with a core alpha value less than 10, such as less than or equal to 5, less than or equal to 4, less than or equal to 3, or even less than or equal to 2.

In embodiments, the second propagation waveguide 126 is single-moded at wavelengths greater than 1260 nm. In embodiments of the coupler 100 described herein, the second propagation waveguide 126 supports two propagating modes (LP01, LP11) within the wavelength range from 800 nm to 950 nm.

While not wishing to be bound by theory, it is believe that the structure of the first propagation waveguide 106 and the second propagation waveguide 126 (i.e., the arrangement of the core, inner cladding, and outer cladding of each waveguide and corresponding dimensions), along with the refractive index profile of each of the waveguides, may contribute to efficiently cross-coupling an optical signal from the first propagation waveguide 106 into the second propagation waveguide 126 (or vice-versa) over the desired spectral band (e.g., wavelengths with the spectral band from greater than or equal to 800 nm to less than or equal to 950 nm).

In embodiments, the dimensions and properties of the first propagation waveguide 106 and the second propagation waveguide 126 may be the same (i.e., the same dimensions for the core, inner cladding, and outer cladding and the same refractive index profile may be the same) such that the coupler 100 is symmetric both in terms of its geometry (i.e., the first propagation waveguide 106 and the second propagation waveguide 126 have the same structure) and its properties (i.e., the first propagation waveguide 106 and the second propagation waveguide 126 have the same propagation properties, such as propagation constants at a given wavelength of light). However, in alternative embodiments, one or more of the dimensions and/or properties of the first propagation waveguide 106 may be different from the second propagation waveguide 126 so long as the propagation constants of the first propagation waveguide 106 and the second propagation waveguide 126 are similar enough to facilitate the desired cross-coupling of optical signals (or modes of optical signals) between adjacent waveguides.

Still referring to FIGS. 1A and 1B, in embodiments, the first core 108 of the first propagation waveguide 106 and the second core 128 of the second propagation waveguide 126 are spaced apart at the input face 102 and at the output face 104 by a core-to-core spacing (C-C in FIG. 1B) measured from the axial centerline of the first core 108 to the axial centerline of the second core 128. In embodiments, the core-to-core spacing is less than or equal to 67 μm at the input face 102 and at the output face 104. In embodiments, the core-to-core spacing is greater than or equal to 63 μm at the input face 102 and the output face 104. Core-to-core spacings within this range may facilitate tapering the coupler 100 (and the first propagation waveguide 106 and the second propagation waveguide 126) a sufficient amount over a relatively short distance (such as ½ of the coupling length L) to facilitate cross-coupling an optical signal (or modes of an optical signal) from the first propagation waveguide 106 into the second propagation (or vice-versa) over the desired spectral band (e.g., wavelengths with the spectral band from greater than or equal to 800 nm to less than or equal to 950 nm).

In embodiments, the core-to-core spacing at the input face 102 and at the output face 104 may be greater than or equal to 63 μm and less than or equal to 67 μm, greater than or equal to 63.25 μm and less than or equal to 66.75 μm, greater than or equal to 63.5 μm and less than or equal to 66.5 μm, greater than or equal to 63.75 μm and less than or equal to 66.25 μm, greater than or equal to 64 μm and less than or equal to 65 μm, greater than or equal to 64.25 μm and less than or equal to 65.75 μm, greater than or equal to 64.5 μm and less than or equal to 65.5 μm, greater than or equal to 64.75 μm and less than or equal to 65.25 μm, greater than or equal to 63 μm and less than or equal to 66.75 μm, greater than or equal to 63 μm and less than or equal to 66.5 μm, greater than or equal to 63 μm and less than or equal to 66.25 μm, greater than or equal to 63 μm and less than or equal to 66 μm, greater than or equal to 63 μm and less than or equal to 65.75 μm, greater than or equal to 63 μm and less than or equal to 65.5 μm, greater than or equal to 63 μm and less than or equal to 65.25 μm, greater than or equal to 63 μm and less than or equal to 65 μm, greater than or equal to 63 μm and less than or equal to 64.75 μm, greater than or equal to 63 μm and less than or equal to 64.5 μm, greater than or equal to 63 μm and less than or equal to 64.25 μm, greater than or equal to 63 μm and less than or equal to 64 μm, greater than or equal to 63 μm and less than or equal to 63.75 μm, greater than or equal to 63 μm and less than or equal to 63.5 μm, greater than or equal to 63 μm and less than or equal to 63.25 μm, greater than or equal to 63.25 μm and less than or equal to 67 μm, greater than or equal to 63.5 μm and less than or equal to 67 μm, greater than or equal to 63.75 μm and less than or equal to 67 μm, greater than or equal to 64 μm and less than or equal to 67 μm, greater than or equal to 64.25 μm and less than or equal to 67 μm, greater than or equal to 64.5 μm and less than or equal to 67 μm, greater than or equal to 64.75 μm and less than or equal to 67 μm, greater than or equal to 65 μm and less than or equal to 67 μm, greater than or equal to 65.25 μm and less than or equal to 67 μm, greater than or equal to 65.5 μm and less than or equal to 67 μm, greater than or equal to 65.75 μm and less than or equal to 67 μm, greater than or equal to 66 μm and less than or equal to 67 μm, greater than or equal to 66.25 μm and less than or equal to 67 μm, greater than or equal to 66.5 μm and less than or equal to 67 μm, greater than or equal to 66.75 μm and less than or equal to 67 μm, or any ranges formed from any of these endpoints.

In the embodiments described herein, core-to-core spacings at the input face 102 and at the output face 104 within the range of greater than or equal to 63 μm and less than or equal to 67 μm are facilitated by the structure of the first propagation waveguide 106 and the second propagation waveguide 126. In particular, as described herein, the outer cladding of each of the first propagation waveguide 106 and the second propagation waveguide 126 has a maximum diameter less than or equal to 125 μm and also includes an outer surface having an arcuate segment and an engagement segment. The diameter of each of the first propagation waveguide 106 and the second propagation waveguide 126 as measured from one point on the arcuate segment, through the axial centerline of the core, and to a second point on the arcuate segment corresponds to the maximum diameter of the outer cladding. However, the diameter of each of the first propagation waveguide 106 and the second propagation waveguide 126 as measured from one point on the arcuate segment, through the axial centerline of the core, and to a second point on the engagement segment is less than the maximum diameter of the outer cladding. Thus, joining the first propagation waveguide 106 and the second propagation waveguide 126 along the corresponding engagement segments 118, 138 achieves a core-to-core spacing of less than the diameter of the outer cladding of either the first propagation waveguide 106 or the second propagation waveguide 126, such as a core-to-core spacing within the range of greater than or equal to 63 μm and less than or equal to 67 μm as described herein.

In embodiments, the full width dimension $W_f$ of the coupler 100 at the input face 102 and at the output face 104 (as shown in FIG. 1A) is the linear dimension of the coupler 100 from one point on the first arcuate segment 116, through the axial centerline of the first core 108, through a second point at the junction of the first engagement segment 118 and the second engagement segment 138 along the shortest diameter of the first propagation waveguide 106, through the axial centerline of the second core 128 and to a third point on the second arcuate segment 136 along the shortest diameter of the second propagation waveguide 126. That is, the full width dimension $W_f$ of the coupler 100 at the input face 102 and the output face 104 is the sum of the shortest diameter of the first propagation waveguide 106 and the shortest diameter of the second propagation waveguide 126.

In embodiments, the full width dimension $W_f$ of the coupler 100 at the input face 102 and at the output face 104 is less than 250 μm. In embodiments, the full width dimension $W_f$ of the coupler 100 at the input face 102 and at the output face 104 is greater than or equal to 183 μm and less than or equal to 187 μm. In embodiments, the full width dimension $W_f$ of the coupler 100 at the input face 102 and at the output face 104 is the sum of one half of the maximum diameter ($D_{OC1}$) of the first outer cladding 112 of the first propagation waveguide 106, one half of the maximum diameter ($D_{OC2}$) of the second outer cladding 132 of the second propagation waveguide 126 and the center-to-center (C-C) between the first core 108 and the second core 128 (i.e., (($D_{OC1}+D_{OC2}$)/2+(C-C)).

In embodiments, the tapered width dimension $W_t$ is the linear dimension at the midpoint $M_P$ of the coupler 100 (i.e., the width dimension at ½ the coupling length). The tapered width dimension $W_t$ is measured at the midpoint $M_P$ of the coupler 100 from one point on the first arcuate segment 116, through the axial centerline of the first core 108, through a second point at the junction of the first engagement segment 118 and the second engagement segment 138 along the shortest diameter of the first propagation waveguide 106, through the axial centerline of the second core 128 and to a third point on the second arcuate segment 136 along the shortest diameter of the second propagation waveguide 126.

As noted herein, the coupler 100 (including the first propagation waveguide 106 and the second propagation waveguide 126) is tapered from the input face 102 and the output face 104 to the midpoint $M_P$ of the coupler 100. Tapering of the coupler 100 from the input face 102 and the output face 104 to the midpoint $M_P$ facilitates decreasing the core-to-core spacing between the first core 108 of the first propagation waveguide 106 and the second core 128 of the second propagation waveguide 126 which, in turn, enables cross-coupling of optical signals (or modes of optical signals) from the first core 108 of the first propagation waveguide 106 to the second core 128 of the second propagation waveguide 126 (or vice-versa). In addition, tapering of the coupler 100 from the input face 102 and the output face 104 to the midpoint $M_P$, specifically tapering of the first core 108 and the second core 128 of the first propagation waveguide 106 and the second propagation waveguide 126, respectively, facilitates selectively cross-coupling certain modes of an optical signal from one of the first propagation waveguide 106 and the second propagation waveguide 126 to the other of the first propagation waveguide 106 and the second propagation waveguide 126 exclusive of other modes of the optical signal. For example, and without limitation, the taper of the coupler 100 may facilitate cross-coupling an LP11 mode of an optical signal from one of the first propagation waveguide 106 and the second propagation waveguide 126 to the other of the first propagation waveguide 106 and the second propagation waveguide 126 exclusive of an LP01 mode of the same optical signal.

In embodiments described herein, the design of the first propagation waveguide 106, the second propagation waveguide 126, and the taper of the coupler 100 facilitate cross-coupling LP11 modes of an optical signal from one of the first propagation waveguide 106 and the second propagation waveguide 126 to the other of the first propagation waveguide 106 and the second propagation waveguide 126 with relatively low loss and relatively low cross-talk, as described in further detail herein, for optical signals having a wavelength within a spectral band from greater than or equal to 800 nm to less than or equal to 950 nm. Similarly, the design of the first propagation waveguide 106, the second propagation waveguide 126, and the taper of the coupler 100 facilitate through-propagation of an LP01 mode of an optical signal in a single propagation waveguide, such as one of the first propagation waveguide 106 and the second propagation waveguide 126, with relatively low loss and relatively low cross-talk, as described in further detail herein, for optical signals having a wavelength within a spectral band from greater than or equal to 800 nm to less than or equal to 950 nm.

In embodiments, the degree of taper of the coupler 100 from the input face 102 and the output face 104 to the midpoint $M_P$ is defined by a scaling factor $F_S$. The scaling factor $F_S$ corresponds to the ratio of a dimension of one part of the coupler 100 (such as the tapered width dimension $W_t$, the diameter of a core, the diameter of an inner cladding, or the diameter of an outer cladding) at the midpoint $M_P$ to the dimension of a corresponding part of the coupler 100 at the input face 102 or the output face 104 of the coupler 100. In embodiments, the scaling factor $F_S$ is greater than or equal to 0.14 and less than or equal to 0.26 to facilitate the cross-coupling or through propagation of certain modes of an optical signal with relatively low loss and relatively low cross-talk, as described herein. In embodiments, the scaling factor $F_S$ may be greater than or equal to 0.19 and less than or equal to 0.21. Accordingly, it should be understood that a ratio of the tapered width dimension $W_t$ of the coupler 100 at the midpoint $M_P$ to the full width dimension of the coupler 100 at the input face 102 or the output face 104 is greater than or equal to 0.14 and less than or equal to 0.26. Other parts of both the first propagation waveguide 106 and the second propagation waveguide 126 exhibit a similar relationship.

For example, in embodiments, the ratio of the diameter of the first core 108 of the first propagation waveguide 106 at the midpoint $M_P$ to the diameter of the first core 108 of the first propagation waveguide 106 at the input face 102 (and/or the output face 104) is greater than or equal to 0.14 and less than or equal to 0.26, such as greater than or equal to 0.19 and less than or equal to 0.21; the ratio of the diameter of the first inner cladding 110 of the first propagation waveguide 106 at the midpoint $M_P$ to the diameter of the first inner cladding 110 of the first propagation waveguide 106 at the input face 102 (and/or the output face 104) is greater than or equal to 0.14 and less than or equal to 0.26, such as greater than or equal to 0.19 and less than or equal to 0.21; and the ratio of the diameter of the first outer cladding 112 of the first propagation waveguide 106 at the midpoint $M_P$ to the diameter of the first outer cladding 112 of the first propagation waveguide 106 at the input face 102 (and/or the output face 104) is greater than or equal to 0.14 and less than or equal to 0.26, such as greater than or equal to 0.19 and less than or equal to 0.21.

Likewise, in embodiments, the ratio of the diameter of the second core 128 of the second propagation waveguide 126 at the midpoint $M_P$ to the diameter of the second core 128 of the second propagation waveguide 126 at the input face 102 (and/or the output face 104) is greater than or equal to 0.14 and less than or equal to 0.26, such as greater than or equal to 0.19 and less than or equal to 0.21; the ratio of the diameter of the second inner cladding 130 of the second propagation waveguide 126 at the midpoint $M_P$ to the diameter of the second inner cladding 130 of the second propagation waveguide 126 at the input face 102 (and/or the output face 104) is greater than or equal to 0.14 and less than or equal to 0.26, such as greater than or equal to 0.19 and less than or equal to 0.21; and the ratio of the diameter of the second outer cladding 132 of the second propagation waveguide 126 at the midpoint $M_P$ to the diameter of the second outer cladding 132 of the second propagation waveguide 126 at the input face 102 (and/or the output face 104) is greater than or equal to 0.14 and less than or equal to 0.26, such as greater than or equal to 0.19 and less than or equal to 0.21.

Similarly, in embodiments, the ratio of the core-to-core spacing at the midpoint of the coupler 100 to the core-to-core spacing at the input face 102 (and/or the output face 104) is greater than or equal to 0.14 and less than or equal to 0.26, such as greater than or equal to 0.19 and less than or equal to 0.21.

In the embodiments described herein, the coupler 100 may be adiabatically tapered. Adiabatic tapering, as used herein, means that the waveguides of the coupler have "slow" or gradual changes from the input face 102 and the output face 104 to the midpoint $M_P$ to minimize optical power loss and back reflection due to coupling from the mode of interest (such as the LP01 mode or the LP11 mode) to other modes, as described in Love, J. D.; Henry, W. M.; Stewart, W. J.; Black, R. J.; Lacroix, S.; Gonthier, F.: 'Tapered single-mode fibres and devices. Part 1: Adiabaticity criteria', IEE Proceedings J (Optoelectronics), 1991, 138, (5), p. 343-354. In particular, the change in the diameter of the core of each waveguide should satisfy equation (5):

$$\frac{dD}{dz} \le \frac{D}{\lambda}(n_{11} - n_{CL}) \quad (5)$$

where D is the core diameter of core 108 or core 128, λ is the wavelength of the light, nil is the effective index of LP11 mode in core 108 or core 128, $n_{CL}$ is the refractive index of the cladding immediately adjacent to the core of the waveguide 106 or 126. Accordingly, the slope of the core diameter may be calculated from the Equation (5). Further, Equation (5) may be used to determine both the taper shape and the taper length. In embodiments, the adiabatic taper of the coupler 100 may follow a predetermined function. For example, and without limitation, a width dimension of the coupler may vary parabolically from the full width dimension $W_f$ at the input face 102 and the output face 104 to the tapered width dimension $W_t$ at the midpoint.

As noted herein, in embodiments, the coupler 100 facilitates cross-coupling LP11 modes of an optical signal from one of the first propagation waveguide 106 and the second propagation waveguide 126 to the other of the first propagation waveguide 106 and the second propagation waveguide 126 for optical signals having a wavelength within a spectral band from greater than or equal to 800 nm to less than or equal to 950 nm. In these embodiments, the coupler 100 also facilitates through-propagation (i.e., confinement or non-cross-coupling) of LP01 modes of an optical signal in a single propagation waveguide, such as at least one of the first propagation waveguide 106 and the second propagation waveguide 126, for optical signals having a wavelength within a spectral band from greater than or equal to 800 nm to less than or equal to 950 nm. Said differently, embodiments of the coupler 100 may be used to multiplex (MUX) or demultiplex (DEMUX) LP01 and LP11 modes of optical signals and, as such, may be utilized as a mode-selective optical fiber coupler.

Referring to FIGS. 1A-1B and Table 1 by way of example, Table 1 includes a matrix of optical signal modes (or combinations of modes) coupled into one of the first propagation waveguide 106 and/or the second propagation waveguide 126 at the input face 102 and the corresponding optical signal mode (or combinations of modes) emitted from the first propagation waveguide 106 or the second propagation waveguide 126 at the output face 104. The optical signals have a wavelength within the spectral band from greater than or equal to 800 nm to less than or equal to 950 nm.

TABLE 1

| Input face | | Output face | |
|---|---|---|---|
| Mode(s) input into First Propagation Waveguide | Mode(s) input into Second Propagation Waveguide | Mode(s) output from First Propagation Waveguide | Mode(s) output from Second Propagation Waveguide |
| LP01 + LP11 | — | LP01 | LP11 |
| — | LP01 + LP11 | LP11 | LP01 |
| LP01 | LP11 | LP01 + LP11 | — |
| LP11 | LP01 | — | LP01 + LP11 |

As shown in Table 1, when an optical signal having LP01 and LP11 modes is input into the first propagation waveguide 106 at the input face 102 (no optical signal input in the second propagation waveguide 126), the LP01 mode of the optical signal propagates through the first propagation waveguide 106 and is emitted from the first propagation waveguide 106 at the output face 104 (i.e., the LP01 mode is confined to the first propagation waveguide 106 and through-propagates). However, the LP11 mode of the optical signal propagates through a portion of the first propagation waveguide 106, is cross-coupled into the second propagation waveguide 126 proximate a midpoint $M_P$ of the coupler 100, and is emitted from the second propagation waveguide 126 at the output face 104. That is, the coupler demultiplexes (DEMUXES) the LP01 and LP11 modes of the optical signal introduced into the first propagation waveguide 106 into two separate optical signals separately emitted from the first propagation waveguide 106 and the second propagation waveguide 126, each optical signal having a single mode (i.e., the LP01 mode or the LP11 mode).

Similarly, when an optical signal having LP01 and LP11 modes is input into the second propagation waveguide 126 at the input face 102 (no optical signal input in the first propagation waveguide 106), the LP01 mode of the optical signal propagates through the second propagation waveguide 126 and is emitted from the second propagation waveguide 126 at the output face 104 (i.e., the LP01 mode is confined to the second propagation waveguide and through-propagates). However, the LP11 mode of the optical signal propagates through a portion of the second propagation waveguide 126, is cross-coupled into the first propagation waveguide 106 proximate a midpoint $M_P$ of the coupler 100, and is emitted from the first propagation waveguide 106 at the output face 104. That is, the coupler demultiplexes (DEMUXES) the LP01 and LP11 modes of the optical signal introduced into the second propagation waveguide 126 into two separate optical signals separately emitted from the first propagation waveguide 106 and the second propagation waveguide 126, each optical signal having a single mode (i.e., the LP01 mode or the LP11 mode).

Still referring to FIGS. 1A-1B and Table 1, when a first optical signal having only an LP01 is input into the first propagation waveguide 106 at the input face 102 (no LP11 mode) and a second optical signal having an LP11 mode is input into the second propagation waveguide 126 at the input face 102, the LP01 mode of the first optical signal propagates through the first propagation waveguide 106 and is emitted from the first propagation waveguide 106 at the output face 104 (i.e., the LP01 mode is confined to the first propagation waveguide 106 and through-propagates). However, the LP11 mode of the optical signal propagates through a portion of the second propagation waveguide 126, is cross-coupled into the first propagation waveguide 106 proximate a midpoint $M_P$ of the coupler 100, and is emitted from the first propagation waveguide 106 at the output face 104 along with the LP01 mode. That is, the coupler 100 multiplexes (MUXES) the LP01 and LP11 modes of the separate optical signals introduced into the first propagation waveguide 106 and the second propagation waveguide 126 into a single optical signal emitted from the first propagation waveguide 106, the optical signal having a combination of the LP01 mode of the first optical signal and the LP11 mode of the second optical signal.

Similarly, when a first optical signal having only an LP01 is input into the second propagation waveguide 126 at the input face 102 (no LP11 mode) and a second optical signal having an LP11 mode is input into the first propagation waveguide 106 at the input face 102, the LP01 mode of the first optical signal propagates through the second propagation waveguide 126 and is emitted from the second propagation waveguide 126 at the output face 104 (i.e., the LP01 mode is confined to the second propagation waveguide 126 and through-propagates). However, the LP11 mode of the optical signal propagates through a portion of the first propagation waveguide 106, is cross-coupled into the second propagation waveguide 126 proximate a midpoint $M_P$ of the coupler 100, and is emitted from the second propagation waveguide 126 at the output face 104 along with the LP01 mode. That is, the coupler 100 multiplexes (MUXES) the LP01 and LP11 modes of the separate optical signals introduced into the first propagation waveguide 106 and the second propagation waveguide 126 into a single optical signal emitted from the second propagation waveguide 126, the optical signal having a combination the LP01 mode of the first optical signal and the LP11 mode of the second optical signal.

As indicated in the foregoing description, the mode-selective optical fiber coupler 100 of this embodiment maintains or confines the LP01 mode of the optical signal in the propagation waveguide in which it is introduced (either the first propagation waveguide 106 or the second propagation waveguide 126) due to the design of the coupler 100 (i.e., the design of the first propagation waveguide and the second propagation waveguide, the scaling factor of the coupler etc.). While not wishing to be bound by any particular theory, it is believed this is because the LP01 mode is already primarily confined to the core of the propagation waveguide in which it is introduced and is not close enough in proximity to the adjacent core for efficient cross-coupling. Conversely, the mode-selective optical fiber coupler 100 of this embodiment cross-couples the LP11 mode of the optical signal in the propagation waveguide in which it is introduced (either the first propagation waveguide 106 or the second propagation waveguide 126) to the adjacent propagation waveguide due to the design of the coupler 100. While not wishing to be bound by any particular theory, it is believed this is because the LP11 mode is less localized to the core in which it is introduced and, as such, overlaps to and couples with the adjacent core due to the taper of the coupler 100.

As noted herein, the design of the first propagation waveguide 106, the second propagation waveguide 126, and the taper of the coupler 100 facilitate cross-coupling of an LP11 mode of an optical signal and through-propagation or confinement of an LP01 mode of the optical signal with relatively low loss and relatively low cross-talk for optical signals having wavelengths within a wavelength range from greater than or equal to 800 nm to less than or equal to 950 nm. That is, the LP01 loss of the first propagation waveguide 106 and the second propagation waveguide 126 are relatively low for LP01 modes confined in either the first propagation waveguide 106 or the second propagation waveguide 126. Similarly, the LP11 loss of the first propagation waveguide 106 and the second propagation waveguide 126 are relatively low for LP11 modes cross-coupled into either the first propagation waveguide 106 or the second propagation waveguide 126. In addition, the LP01 cross-talk between the first propagation waveguide 106 and the second propagation waveguide 126 (i.e., the cross-talk of the coupler 100) is relatively low for LP01 modes confined in a propagation waveguides and the LP11 cross-talk between the first propagation waveguide 106 and the second propagation waveguide 126 is relatively low for LP11 modes cross-coupled into adjacent propagation waveguides.

The LP01 loss (in dB) of the coupler is a measure of the attenuation of the power of the LP01 mode of an optical signal propagating in a propagation waveguide over the coupling length L from the input face 102 to the output face 104 as determined at the output face 104 (i.e., LP01 loss=10 log($P_2/P_1$), where $P_1$ is the power of the LP01 mode coupled into the propagation waveguide and $P_2$ is the power of the LP01 mode emitted from the same propagation waveguide). That is, the LP01 loss of a propagation waveguide is determined at the output face 104 for the propagation waveguide in which the optical signal having the LP01 mode was input. As an example, when an optical signal having an LP01 mode is input into the first propagation waveguide 106, the LP01 loss is determined based on the power of the LP01 mode emitted from the first propagation waveguide 106 at the output face 104 relative to the power of the LP01 mode input into the first propagation waveguide 106 at the input face 102. Alternatively, when an optical signal having an LP01 mode is input into the second propagation waveguide 126, the LP01 loss is determined based on the power of the LP01 mode emitted from the second propagation waveguide 126 at the output face 104 relative to the power of the LP01 mode input into the first propagation waveguide 106 at the input face 102. In the embodiments described herein, the LP01 loss is measured for wavelengths of light within a wavelength range from greater than or equal to 800 nm to less than or equal to 950 nm.

In embodiments of the coupler 100 depicted in FIGS. 1A and 1B, the LP01 loss of the coupler 100 (i.e., the loss of LP01 modes propagating through the coupler) is less than 1.0 dB for wavelengths of light in a spectral band having a bandwidth of less than or equal to 100 nm, such as greater than or equal to 25 nm and less than or equal to 100 nm, in a wavelength range from greater than or equal to 800 nm to less than or equal to 950 nm. In embodiments, the LP01 loss of the coupler 100 for wavelengths of light in a spectral band having a bandwidth of 100 nm, such as greater than or equal to 25 nm and less than or equal to 100 nm, within a wavelength range from greater than or equal to 800 nm to less than or equal to 950 nm is less than or equal to 0.9 dB, less than or equal to 0.8 dB, less than or equal to 0.7 dB, less than or equal to 0.8 dB, less than or equal to 0.7 dB, less than or equal to 0.6 dB, less than or equal to 0.5 dB, less than or equal to 0.4 dB, less than or equal to 0.3 dB, less than or equal to 0.2 dB, or even less than or equal to 0.1 dB.

In embodiments of the coupler 100 depicted in FIGS. 1A and 1B, the LP11 loss (in dB) of the coupler 100 is a measure of the attenuation of the power of the LP11 mode of an optical signal over the coupling length L from the input face 102 to the output face 104 for an optical signal having an LP11 mode input into one propagation waveguide at the input face 102 and cross-coupled to the adjacent propagation waveguide and emitted from the adjacent propagation waveguide at the output face 104 (i.e., LP11 loss=10 log($P_2/P_1$), where $P_1$ is the power of the LP11 mode coupled into one propagation waveguide and $P_2$ is the power of the LP11 mode emitted from the adjacent propagation waveguide). LP11 loss is measured at the output face 104. That is, the LP11 loss is determined from the power of the LP11 mode input into one propagation waveguide at the input face 102 and the power of the LP11 mode output from the adjacent propagation waveguide at the output face 104. As an example, when an optical signal having an LP11 mode is input into the first propagation waveguide 106 at the input face 102 and cross-coupled into the second propagation waveguide 126, the LP11 loss is determined based on the power of the LP11 mode emitted from the second propagation waveguide 126 at the output face 104 relative to the power of the LP11 mode input into the first propagation waveguide 106 at the input face 102. Alternatively, when an optical signal having an LP11 mode is input into the second propagation waveguide 126 at the input face 102 and cross-coupled into the first propagation waveguide 106, the LP11 loss is determined based on the power of the LP11 mode emitted from the first propagation waveguide 106 at the output face 104 relative to the power of the LP11 mode input into the second propagation waveguide 126 at the input face 102.

In embodiments of the coupler 100 depicted in FIGS. 1A and 1B, the LP11 loss of the coupler 100 (i.e., the loss of LP11 modes propagating through the coupler) is less than 1.5 dB for wavelengths of light in a spectral band having a bandwidth of less than or equal to 100 nm, such as greater than or equal to 25 nm and less than or equal to 100 nm, within a wavelength range from greater than or equal to 800 nm to less than or equal to 950 nm. In embodiments, the LP11 loss of the coupler 100 for wavelengths of light in the spectral band having a bandwidth of less than or equal to 100 nm, such as greater than or equal to 25 nm and less than or equal to 100 nm, within the wavelength range from greater than or equal to 800 nm to less than or equal to 950 nm is less than or equal to 1.4 dB, less than or equal to 1.3 dB, less than or equal to 1.2 dB, less than or equal to 1.1 dB, less than or equal to 1.0 dB, less than or equal to 0.9 dB, less than or equal to 0.8 dB, less than or equal to 0.7 dB, less than or equal to 0.8 dB, less than or equal to 0.7 dB, less than or equal to 0.6 dB, less than or equal to 0.5 dB, less than or equal to 0.4 dB, less than or equal to 0.3 dB, less than or equal to 0.2 dB, or even less than or equal to 0.1 dB.

The LP01 cross-talk (in dB) of the coupler 100 is a measure of the power of an LP01 mode of an optical signal input into one propagation waveguide that leaks into an adjacent propagation waveguide and is determined in the adjacent propagation waveguide at the output face 104 of the coupler 100 based on the power of the LP01 mode input into one propagation waveguide at the input face 102 and the power of the LP01 mode emitted from the adjacent propagation waveguide at the output face 104 (i.e., LP01 cross-talk=10 log($P_2/P_1$), where $P_1$ is the power of the LP01 mode coupled into one propagation waveguide and $P_2$ is the power of the LP01 mode emitted from the adjacent propagation waveguide). For example, when an optical signal having an LP01 mode is input into the first propagation waveguide 106 at the input face 102, the LP01 cross-talk is determined based on the power of the LP01 mode emitted from the second propagation waveguide 126 at the output face 104 relative to the power of the LP01 mode input into the first propagation waveguide 106 at the input face 102. Alternatively, when an optical signal having an LP01 mode is input into the second propagation waveguide 126 at the input face 102, the LP01 cross-talk is determined based on the power of the LP01 mode emitted from the first propagation waveguide 106 at the output face 104 relative to the power of the LP01 mode input into the second propagation waveguide 126 at the input face 102.

In embodiments of the coupler 100 depicted in FIGS. 1A and 1B, the LP01 cross-talk of the coupler 100 (i.e., the cross-talk of LP01 modes between adjacent propagation waveguides) is less than −10 dB for wavelengths of light within a spectral band having a bandwidth of less than or equal to 100 nm, such as greater than or equal to 25 nm and less than or equal to 100 nm, within a wavelength range from greater than or equal to 800 nm to less than or equal to 950 nm. In embodiments, the LP01 cross-talk of the coupler 100 for wavelengths of light in the spectral band having a bandwidth of less than or equal to 100 nm, such as greater than or equal to 25 nm and less than or equal to 100 nm, in a wavelength range from greater than or equal to 800 nm to less than or equal to 950 nm is less than or equal to −11 dB, less than or equal to −12 dB, less than or equal to −13 dB, less than or equal to −14 dB, less than or equal to −15 dB, less than or equal to −16 dB, less than or equal to −17 dB, less than or equal to −18 dB, less than or equal to −19 dB, less than or equal to −20 dB, less than or equal to −21 dB, less than or equal to −22 dB, less than or equal to −23 dB, less than or equal to −24 dB, or even less than or equal to −25 dB.

In embodiments of the coupler 100 depicted in FIGS. 1A and 1B, the LP11 cross-talk (in dB) of the coupler is a measure of the power of an LP11 mode of an optical signal input into one propagation waveguide that leaks from the propagation waveguide. For the mode-selective optical fiber couplers described herein, the LP11 cross-talk for an optical signal input into a propagation waveguide at the input face 102 is determined at the output face 104 based on the power of the LP11 mode input into the propagation waveguide and the power of the LP11 mode emitted from the same propagation waveguide due to the cross-coupling of the LP11 mode in the coupler 100 (i.e., LP11 cross-talk=10 log($P_2/P_1$), where $P_1$ is the power of the LP11 mode coupled into one propagation waveguide and $P_2$ is the power of the LP11 mode emitted from the same propagation waveguide). For example, when an optical signal having an LP11 mode is input into the first propagation waveguide 106 at the input face 102, the LP11 cross-talk is determined based on the power of the LP11 mode emitted from the first propagation waveguide 106 at the output face 104 relative to the power of the LP11 mode input into the first propagation waveguide 106 at the input face 102. Alternatively, when an optical signal having an LP11 mode is input into the second propagation waveguide 126 at the input face 102, the LP11 cross-talk is determined based on the power of the LP11 mode emitted from the second propagation waveguide 126 at the output face 104 relative to the power of the LP11 mode input into the second propagation waveguide 126 at the input face 102.

In embodiments of the coupler 100 depicted in FIGS. 1A and 1B, the LP11 cross-talk of the coupler 100 (i.e., the cross-talk of LP11 modes between adjacent propagation waveguides) is less than −5 dB for wavelengths of light within a spectral band having a bandwidth of less than or equal to 100 nm, such as greater than or equal to 25 nm and less than or equal to 100 nm, within a wavelength range from greater than or equal to 800 nm to less than or equal to 950 nm. In embodiments, the LP11 cross-talk of the coupler 100 for wavelengths of light in the spectral band having a bandwidth of less than or equal to 100 nm, such as greater than or equal to 25 nm and less than or equal to 100 nm, within the wavelength range from greater than or equal to 800 nm to less than or equal to 950 nm is less than or equal to −6 dB, less than or equal to −7 dB, less than or equal to −8 dB, less than or equal to −9 dB, less than or equal to −10 dB, less than or equal to −11 dB, less than or equal to −12 dB, less than or equal to −13 dB, less than or equal to −14 dB, less than or equal to −15 dB, less than or equal to −16 dB, less than or equal to −17 dB, less than or equal to −18 dB, less than or equal to −19 dB, less than or equal to −20 dB, less than or equal to −21 dB, less than or equal to −22 dB, less than or equal to −23 dB, less than or equal to −24 dB, or even less than or equal to −25 dB.

Figure 3:
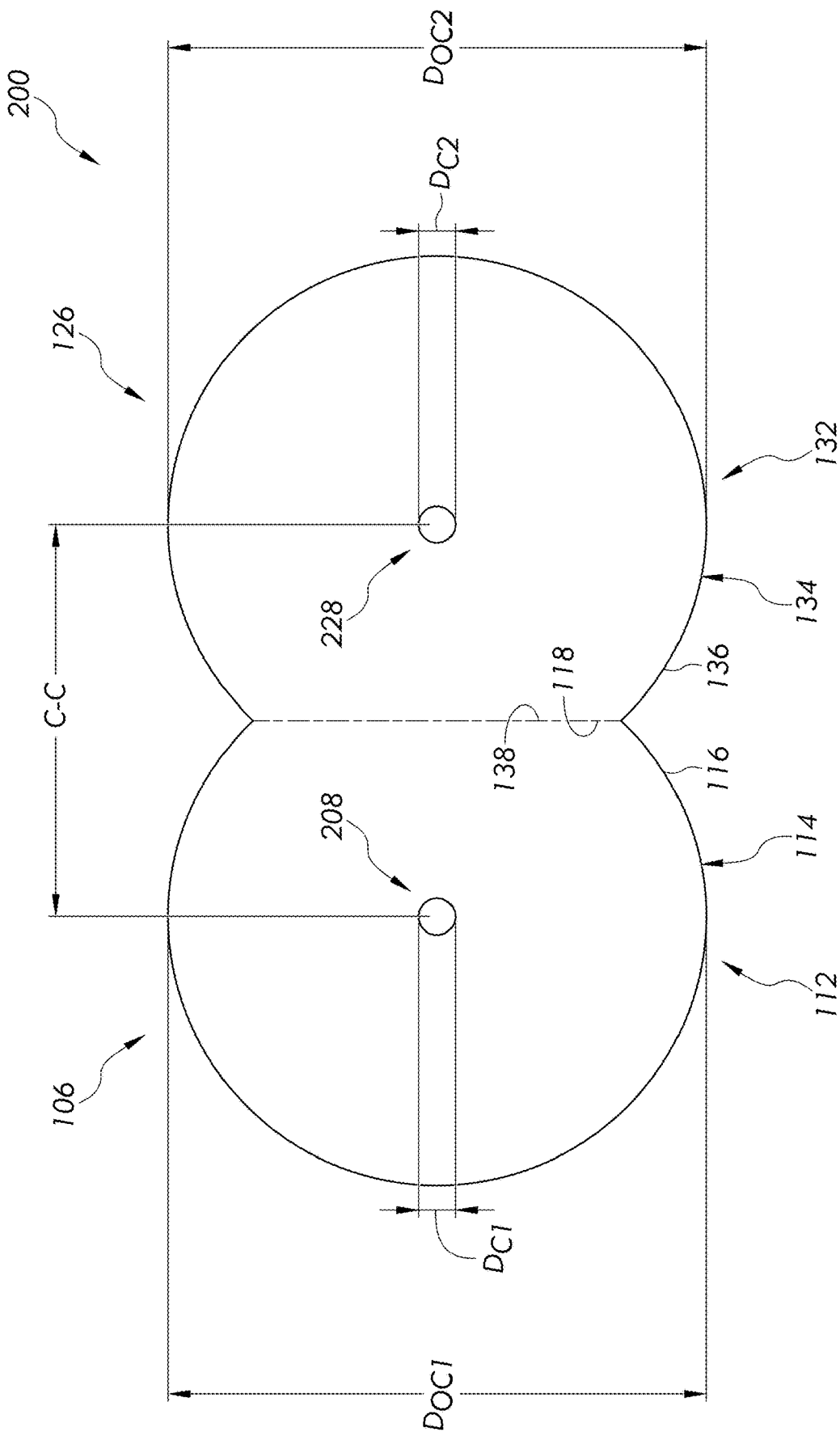
FIG. 3 schematically depicts a cross-sectional view of another embodiment of a mode-selective optical fiber coupler, according to one or more embodiments shown and described herein.

Referring now to FIGS. 1A, 1C, and FIG. 3, an alternative embodiment of a mode-selective optical fiber coupler 200 is schematically depicted. As with the coupler 100 described with respect to FIGS. 1A and 1B, the coupler 200 generally comprises an input face 102, an output face 104, a first propagation waveguide 106, and a second propagation waveguide 126. The input face 102 and output face 104 of the coupler 200 are spaced apart by a coupling length L and the first propagation waveguide 106 and the second propagation waveguide 126 extend from the input face 102 to the output face 104 of the coupler 200. A midpoint $M_P$ of the coupler 200 is located in the length direction of the coupler at a distance L/2 from the input face 102 and the output face 104.

In embodiments, the coupler 200 may further comprises leads 150a, 150b, 152a, 152b, coupled to the input face 102 and the output face 104 to facilitate coupling optical signals into the first propagation waveguide 106 and the second propagation waveguide 126 and coupling optical signals out of the first propagation waveguide 106 and the second propagation waveguide 126. For example, lead 150a may be coupled to the first propagation waveguide 106 at the input face 102 and lead 150b may be coupled to the first propagation waveguide 106 at the output face 104. Similarly, lead 152a may be coupled to the second propagation waveguide 126 at the input face 102 and lead 152b may be coupled to the second propagation waveguide 126 at the output face 104. The leads 150a, 150b, may be optical fibers that are structured and dimensioned to correspond to the structure and dimensions of the first propagation waveguide 106 at the input face 102 and the output face 104. The leads 152a, 152b, may be optical fibers that are structured and dimensioned to correspond to the structure and dimensions of the second propagation waveguide 126 at the input face 102 and the output face 104.

The coupler 200 (including the first propagation waveguide 106 and the second propagation waveguide 126) is tapered from the input face 102 and the output face 104 to the midpoint $M_P$ of the coupler 200 to facilitate cross-coupling of optical signals, such as specific modes of optical signals, from one of the first propagation waveguide 106 and the second propagation waveguide 126 to the other of the first propagation waveguide 106 and the second propagation waveguide 126.

In this embodiment, a first optical signal having an LP01 mode may be coupled into (i.e., launched into) the first propagation waveguide 106 and a second optical signal having an LP01 may be coupled into (i.e., launched into) the second propagation waveguide 126 at the input face 102 of the coupler 200. The first optical signal propagates over the coupling length L of the coupler 200, and exits the first propagation waveguide 106 of the coupler 200 at the output face 104. The second optical signal propagates through a portion of the second propagation waveguide 126 and, as the second optical signal propagates, the LP01 mode of the second optical signal is converted to an LP11 mode that is subsequently cross-coupled to the first propagation waveguide 106 and emitted from the first propagation waveguide 106 at the output face 104 of the coupler 200. This conversion/cross coupling behavior of the coupler 200 is achieved by modifying portions of the first propagation waveguide 106 and the second propagation waveguide 126 of the coupler 100 described with respect to FIGS. 1A and 1B.

In the embodiment of the coupler 200 depicted in FIGS. 1A and 3, the coupler 200 differs from the coupler 100 described with respect to FIGS. 1A and 1B. Notably, neither the first propagation waveguide 106 nor the second propagation waveguide 126 of the coupler 200 of this embodiment comprise an inner cladding. Instead, the first outer cladding 112 of the first propagation waveguide 106 surrounds and is in direct contact with the first core 208 of the first propagation waveguide 106. Similarly, the second outer cladding 132 of the second propagation waveguide 126 surrounds and is in direct contact with the second core 228 of the second propagation waveguide 126. Further, in this embodiment, the first core 208 of the first propagation waveguide 106 is sized to be few-moded at wavelengths from 800 nm to 950 nm and the second core 228 of the second propagation waveguide is sized to be single-moded at a wavelength of 850 nm (i.e., the LP11 mode cutoff is less than 800 nm).

In this embodiment of the coupler 200, the first propagation waveguide 106 is few-moded and the first core 208 has a diameter $D_{C1}$ at the input face 102 and/or the output face 104 greater than or equal to 7.7 μm and less than or equal to 10 μm. For example, the diameter $D_{C1}$ of the first core 208 at the input face 102 and/or the output face 104 may be greater than or equal to 7.8 μm and less than or equal to 9.8 μm, greater than or equal to 8 μm and less than or equal to 9.6 μm, greater than or equal to 8.1 μm and less than or equal to 9.5 μm, greater than or equal to 8.25 μm and less than or equal to 9.35 μm, greater than or equal to 8.4 μm and less than or equal to 9.2 μm, greater than or equal to 8.5 μm and less than or equal to 9.1 μm, or even greater than or equal to 8.66 μm and less than or equal to 9 μm. In embodiments, the diameter $D_{C1}$ of the first core 208 at the input face 102 and/or the output face 104 may be greater than or equal to 7.7 μm and less than or equal to 9.8 μm, greater than or equal to 7.7 μm and less than or equal to 9.6 μm, greater than or equal to 7.7 μm and less than or equal to 9.5 μm, greater than or equal to 7.7 μm and less than or equal to 9.35 μm, greater than or equal to 7.7 μm and less than or equal to 9.2 μm, greater than or equal to 7.7 μm and less than or equal to 9.1 μm, greater than or equal to 7.7 μm and less than or equal to 9 μm, greater than or equal to 7.7 μm and less than or equal to 8.8 μm, greater than or equal to 7.8 μm and less than or equal to 10 μm, greater than or equal to 8 μm and less than or equal to 10 μm, greater than or equal to 8.1 μm and less than or equal to 10 µm, greater than or equal to 8.25 µm and less than or equal to 10 µm, greater than or equal to 8.4 µm and less than or equal to 10 µm, greater than or equal to 8.5 µm and less than or equal to 10 µm, greater than or equal to 8.66 µm and less than or equal to 10 µm, greater than or equal to 8.8 µm and less than or equal to 10 µm, greater than or equal to 9 µm and less than or equal to 10 µm, greater than or equal to 9.1 µm and less than or equal to 10 µm, greater than or equal to 9.2 µm and less than or equal to 10 µm, greater than or equal to 9.35 µm and less than or equal to 10 µm, greater than or equal to 9.5 µm and less than or equal to 10 µm, greater than or equal to 9.6 µm and less than or equal to 10 µm, greater than or equal to 9.8 µm and less than or equal to 10 µm or any range formed from any of the foregoing endpoints.

In this embodiment of the coupler 200, the first outer cladding 112 of the first propagation waveguide 106 is sized to facilitate coupling the first propagation waveguide 106 to optical fibers having standardized dimensions. Accordingly, the first outer cladding 112 has a maximum diameter $D_{OC1}$ of less than or equal to 125 µm and greater than or equal to 115 µm at the input face 102 and/or the output face 104. In embodiments, the maximum diameter $D_{OC1}$ of the first inner cladding 110 may be greater than or equal to 116 µm and less than or equal to 125 µm, greater than or equal to 117 µm and less than or equal to 125 µm, greater than or equal to 118 µm and less than or equal to 125 µm, greater than or equal to 119 µm and less than or equal to 125 µm, greater than or equal to 120 µm and less than or equal to 125 µm, greater than or equal to 121 µm and less than or equal to 125 µm, greater than or equal to 122 µm and less than or equal to 125 µm, greater than or equal to 123 µm and less than or equal to 125 µm, greater than or equal to 124 µm and less than or equal to 125 µm, or any range formed from any of the foregoing endpoints.

Further, in this embodiment, the second propagation waveguide 126 is single-moded and the second core 228 has a diameter $D_{C2}$ at the input face 102 and the output face that is less than the diameter $D_{C1}$ of the first core 208 at the input face 102 and the output face 104. In embodiments, the diameter $D_{C2}$ at the input face 102 and the output face 104 is greater than or equal to 2 µm and less than or equal to 7 µm at the input face 102 and/or the output face 104. For example, the diameter $D_{C2}$ of the second core 228 at the input face 102 and/or the output face 104 may be greater than or equal to 2.25 µm and less than or equal to 6.75 µm, greater than or equal to 2.5 µm and less than or equal to 6.5 µm, or even greater than or equal to 2.75 µm and less than or equal to 6.25 µm. In embodiments, the diameter $D_{C2}$ of the second core 228 at the input face 102 and/or the output face 104 may be greater than or equal to 2 µm and less than or equal to 6.75 µm, greater than or equal to 2 µm and less than or equal to 6.5 µm, greater than or equal to 2 µm and less than or equal to 6.25 µm, greater than or equal to 2 µm and less than or equal to 6 µm, greater than or equal to 2 µm and less than or equal to 5.75 µm, greater than or equal to 2 µm and less than or equal to 5.5 µm, greater than or equal to 2 µm and less than or equal to 5.25 µm, greater than or equal to 2.25 µm and less than or equal to 7 µm, greater than or equal to 2.5 µm and less than or equal to 7 µm, greater than or equal to 2.75 µm and less than or equal to 7 µm, greater than or equal to 3 µm and less than or equal to 7 µm, greater than or equal to 3.25 µm and less than or equal to 7 µm, greater than or equal to 3.5 µm and less than or equal to 7 µm, greater than or equal to 3.75 µm and less than or equal to 7 µm, or any range formed from any of the foregoing endpoints.

In this embodiment of the coupler 200, the second outer cladding 132 of the second propagation waveguide 126 has a maximum diameter $D_{OC2}$ of less than or equal to 125 µm and greater than or equal to 115 µm at the input face 102 and/or the output face 104. In embodiment, the maximum diameter $D_{OC2}$ of the second outer cladding 132 may be greater than or equal to 46.4 µm and less than or equal to 75 µm, greater than or equal to 46.8 µm and less than or equal to 75 µm, greater than or equal to 47.2 µm and less than or equal to 75 µm, greater than or equal to 47.6 µm and less than or equal to 75 µm, greater than or equal to 48 µm and less than or equal to 75 µm, greater than or equal to 48.4 µm and less than or equal to 75 µm, greater than or equal to 48.4 µm and less than or equal to 75 µm, greater than or equal to 49.2 µm and less than or equal to 75 µm, greater than or equal to 49.6 µm and less than or equal to 75 µm, or any range formed from any of the foregoing endpoints.

The refractive index profile and the relative refractive index profile of the first propagation waveguide 106 and the second propagation waveguide 126 of the coupler 200 may be similar in shape as the refractive index profile and the relative refractive index profile depicted in FIGS. 2A and 2B, albeit without the inner cladding. That is, in this embodiment, the outer claddings 112, 132 extend to the core 208, 228 (as shown in FIG. 3). Further, $n_{C1}>n_{OC1}$, $n_{C2}>n_{OC2}$, $\Delta_{C1}>\Delta_{OC1}$, and $\Delta_{C2}>\Delta_{OC2}$, as described herein with respect to FIGS. 2A and 2B.

In embodiments of the coupler 200 described herein, the indices of refraction $n_{C1}$, $n_{C2}$ of the first core 208 and the second core 228 may be greater than or equal to 1.456 and less than or equal to 1.459. The indices of refraction $n_{OC1}$, $n_{OC2}$ of the first outer cladding 112 and the second outer cladding 132 may be greater than or equal to 1.451 and less than 1.454. However, it should be understood that other refractive index profiles for the first propagation waveguide 106 are contemplated and possible so long as $n_{C1}>n_{OC1}$ and $n_{C2}>n_{OC2}$.

In embodiments of the coupler 200 described herein, the relative refractive indices $\Delta_{C1}$, $\Delta_{C2}$ of the first core 208 and the second core 228 may be greater than or equal to 0.25% and less than or equal to 0.45%. The relative refractive indices $\Delta_{OC1}$, $\Delta_{OC2}$ of the first outer cladding 112 and the second outer cladding 132 may be greater than or equal to −0.1% and less than or equal to 0.1%. However, it should be understood that other relative refractive index profiles for the first propagation waveguide 106 are contemplated and possible so long as $\Delta_{C1}>\Delta_{OC1}$ and $\Delta_{C2}\geq\Delta_{OC2}$.

It should be understood that other characteristics of the coupler 200 (i.e., the coupling length, core-to-core spacing, etc.) may be similar to the coupler 100 described herein with respect to FIGS. 1A and 1B.

As noted herein, the coupler 200 (including the first propagation waveguide 106 and the second propagation waveguide 126) is tapered from the input face 102 and the output face 104 to the midpoint $M_P$ of the coupler 100. Tapering of the coupler 100 from the input face 102 and the output face 104 to the midpoint $M_P$ facilitates decreasing the core-to-core spacing between the first core 208 of the first propagation waveguide 106 and the second core 228 of the second propagation waveguide 126 which, in turn, enables cross-coupling of optical signals (or modes of optical signals) from the second core 228 of the second propagation waveguide 126 to the first core 208 of the first propagation waveguide 106.

In addition, tapering of the coupler 100 from the input face 102 and the output face 104 to the midpoint $M_P$, specifically tapering (and pre-tapering as discussed further herein) of the second core 228 of the second propagation waveguide 126, facilitates converting certain modes of an optical signal into other modes prior to cross-coupling the converted mode to the first propagation waveguide 106. For example, and without limitation, the taper of the coupler 200, specifically the taper of the second propagation waveguide 126, may facilitate converting an LP01 mode of an optical signal propagating in the second propagation waveguide 126 to an LP11 mode and cross-coupling the LP11 mode of the optical signal from the second propagation waveguide 126 to the first propagation waveguide 106.

In this embodiment, the design of the first propagation waveguide 106, the second propagation waveguide 126, and the taper of the coupler 200 facilitate converting an LP01 mode of an optical signal to an LP11 mode and cross-coupling the LP11 mode of the optical signal from the second propagation waveguide 126 to the first propagation waveguide 106 with relatively low loss and relatively low cross-talk, as described in further detail herein, for optical signals having wavelengths in a spectral band having a bandwidth of less than or equal to 30 nm, such as greater than or equal to 25 nm and less than or equal to 30 nm, within a wavelength range from greater than or equal to 800 nm to less than or equal to 950 nm. Similarly, the design of the first propagation waveguide 106, the second propagation waveguide 126, and the taper of the coupler 200 facilitate through-propagation (i.e., confinement) of an LP01 mode of an optical signal in the first propagation waveguide 106, with relatively low loss and relatively low cross-talk, as described in further detail herein, for optical signals having wavelengths in a spectral band having a bandwidth of less than or equal to 30 nm, such as greater than or equal to 25 nm and less than or equal to 30 nm, within a wavelength range from greater than or equal to 800 nm to less than or equal to 950 nm.

In embodiments, the degree of taper of the coupler 200 from the input face 102 and the output face 104 to the midpoint $M_P$ is defined by a scaling factor $F_S$. The scaling factor $F_S$ corresponds to the ratio of a dimension of one part of the coupler 200 (e.g., the tapered width dimension $W_t$, the diameter of a core, or the diameter of an outer cladding) at the midpoint $M_P$ to the dimension of a corresponding part of the coupler 200 at the input face 102 or the output face 104 of the coupler 200. In embodiments of the coupler 200, the scaling factor $F_S$ is greater than or equal to 0.65 and less than or equal to 0.9 to facilitate the cross-coupling or through propagation of certain modes of an optical signal with relatively low loss and relatively low cross-talk, as described herein. In embodiments, the scaling factor $F_S$ may be greater than or equal to 0.7 and less than or equal to 0.85. Accordingly, it should be understood that a ratio of the tapered width dimension $W_t$ of the coupler 200 at the midpoint $M_P$ to the full width dimension of the coupler 200 at the input face 102 or the output face 104 is greater than or equal to 0.65 and less than or equal to 0.9. Other parts of both the first propagation waveguide 106 and the second propagation waveguide 126 exhibit a similar relationship.

For example, in embodiments, the ratio of the diameter of the first outer cladding 112 of the first propagation waveguide 106 at the midpoint $M_P$ to the diameter of the first outer cladding 112 of the first propagation waveguide 106 at the input face 102 (and/or the output face 104) is greater than or equal to 0.65 and less than or equal to 0.9. In embodiments, the ratio of the diameter of the first core 208 of the first propagation waveguide 106 at the midpoint $M_P$ to the diameter of the first core 208 of the first propagation waveguide 106 at the input face 102 (and/or the output face 104) is greater than or equal to 0.65 and less than or equal to 0.9.

In embodiments, the ratio of the diameter of the second outer cladding 132 of the second propagation waveguide 126 at the midpoint $M_P$ to the diameter of the second outer cladding 132 of the first propagation waveguide 106 at the input face 102 (and/or the output face 104) is greater than or equal to 0.65 and less than or equal to 0.9. In embodiments, the ratio of the diameter of the second core 228 of the second propagation waveguide 126 at the midpoint $M_P$ to the diameter of the second core 228 of the second propagation waveguide 126 at the input face 102 (and/or the output face 104) is greater than or equal to 0.65 and less than or equal to 0.9.

As noted herein, in the embodiments of the coupler 200, the first propagation waveguide 106 and the second propagation waveguide 126 may have different core diameters. This is accomplished by pre-tapering the second propagation waveguide 126 by forming the portion of the coupler 200 corresponding to the second propagation waveguide 126 from a preform fiber that is pre-tapered, such that the diameter of at least the core of the preform fiber is reduced over a portion of the length of the preform fiber (i.e., the diameter of the core is uniform along a portion of the length of the fiber, albeit less than the diameter of the core of the preform cane corresponding to the first propagation waveguide 106) such that, when the pre-tapered preform fiber is assembled to a preform assembly and then further tapered (as described further herein), the scaling factor $F_S$ of the second propagation waveguide 126 is the same as the scaling factor $F_S$ of the first propagation waveguide 106 despite having different core dimensions.

As with the embodiment of the coupler 100, the coupler 200 may be adiabatically tapered. In embodiments, the taper of the coupler 200 may be parabolic, such as when the width dimension of the coupler varies parabolically from the full width dimension $W_f$ at the input face 102 and the output face 104 to the tapered width dimension $W_t$ at the midpoint.

As noted herein, the coupler 200 facilitates converting an LP01 mode of an optical signal propagating in the second propagation waveguide 126 to an LP11 mode and cross-coupling the LP11 mode from the second propagation waveguide 126 to the first propagation waveguide 106 with relatively low loss and relatively low cross-talk for wavelengths in a spectral band having a bandwidth of less than or equal to 30 nm, such as greater than or equal to 25 nm and less than or equal to 30 nm, within a wavelength range from greater than or equal to 800 nm to less than or equal to 950 nm. The coupler 200 also facilitates through-propagating or confining an LP01 mode of an optical signal propagating in the first propagation waveguide 106 to the first propagation waveguide 106 with relatively low loss and relatively low cross-talk for wavelengths in a spectral band having a bandwidth of less than or equal to 30 nm, such as greater than or equal to 25 nm and less than or equal to 30 nm, within a wavelength range from greater than or equal to 800 nm to less than or equal to 950 nm. Said differently, embodiments of the coupler 200 may be used to selectively convert an LP01 mode in one waveguide to an LP11 mode and multiplex (MUX) the LP11 mode with an LP01 mode in an adjacent waveguide and, as such, may be utilized as a mode-selective optical fiber coupler.

Referring to FIG. 1A, FIG. 3, and Table 2 by way of example, Table 2 includes a matrix of optical signal modes (or combinations of modes) coupled into one of the first propagation waveguide 106 and/or the second propagation waveguide 126 at the input face 102 and the corresponding optical signal mode (or combination of modes) emitted from the first propagation waveguide 106 or the second propagation waveguide 126 at the output face 104 of the coupler 200. The optical signals have wavelengths in a spectral band having a bandwidth of less than or equal to 30 nm, such as greater than or equal to 25 nm and less than or equal to 30 nm, within a wavelength range from greater than or equal to 800 nm to less than or equal to 950 nm.

TABLE 2

| Input face | | Output face | |
|---|---|---|---|
| Mode(s) input into First Propagation Waveguide | Mode(s) input into Second Propagation Waveguide | Mode(s) output from First Propagation Waveguide | Mode(s) output from Second Propagation Waveguide |
| LP01 | LP01 | LP01 + LP11 | — |
| LP01 + LP11 | — | LP01 | LP01 |

As indicated in Table 2, when a first optical signal having an LP01 mode is input into the first propagation waveguide 106 at the input face 102 and a second optical signal having an LP01 mode is input into the second propagation waveguide 126 at the input face 102, the LP01 mode of the first optical signal propagates through the first propagation waveguide 106 and is emitted from the first propagation waveguide 106 at the output face 104 (i.e., the LP01 mode is confined to the first propagation waveguide 106 and through-propagates). However, the LP01 mode of the second optical signal propagates through a portion of the second propagation waveguide 126, is converted to an LP11 mode, and the LP11 mode is cross-coupled into the first propagation waveguide 106 proximate a midpoint $M_P$ of the coupler 200, and is emitted from the first propagation waveguide 106 at the output face 104 along with the LP01 mode. That is, the coupler 200 multiplexes (MUXES) the LP01 and LP11 modes into a single optical signal emitted from the first propagation waveguide 106, the optical signal having a combination of the LP01 mode of the first optical signal and the LP11 mode converted from the second optical signal.

As indicated in the foregoing description, the mode-selective optical fiber coupler 200 of this embodiment maintains or confines the LP01 mode of the first optical signal in the first propagation waveguide 106 due to the design of the coupler 200 (i.e., the design of the first propagation waveguide and the second propagation waveguide, the scaling factor of the coupler etc.). However, the mode-selective optical fiber coupler 200 of this embodiment converts an LP01 mode of the second optical signal propagating in the second propagation waveguide 126 to an LP11 mode and cross-couples the LP11 mode from the second propagation waveguide 126 to the first propagation waveguide 106.

Further, as indicated in Table 2, when an optical signal having an LP01 mode and an LP11 mode is input into the first propagation waveguide 106 at the input face 102, the LP01 mode of the optical signal propagates through the first propagation waveguide 106 and is emitted from the first propagation waveguide 106 at the output face 104 (i.e., the LP01 mode is confined to the first propagation waveguide 106 and through-propagates). However, the LP11 mode of the optical signal propagates through a portion of the first propagation waveguide 106, is cross-coupled into the second propagation waveguide 126 proximate a midpoint $M_P$ of the coupler 200, converted to an LP01 mode, and emitted from the second propagation waveguide 126 at the output face 104. That is, the coupler 200 de-multiplexes (DE-MUXES) the LP01 and LP11 modes into separate optical signals emitted from the first propagation waveguide 106 and the second propagation waveguide 126 and converts the LP11 mode to an LP01 mode.

As indicated in the foregoing description, the mode-selective optical fiber coupler 200 of this embodiment maintains or confines the LP01 mode of the optical signal in the first propagation waveguide 106 due to the design of the coupler 200 (i.e., the design of the first propagation waveguide and the second propagation waveguide, the scaling factor of the coupler etc.). However, the mode-selective optical fiber coupler 200 of this embodiment cross-couples the LP11 mode from the first propagation waveguide 106 to the second propagation waveguide 126 and converts the LP11 mode to an LP01 mode.

The through-propagation of the LP01 mode in the first propagation waveguide 106 and the conversion of the LP01 mode to an LP11 mode in the second propagation waveguide 126 in this embodiment of the coupler 200 are achieved with relatively low loss and relatively low cross-talk for optical signals having wavelengths in a spectral band having a bandwidth of less than or equal to 30 nm, such as greater than or equal to 25 nm and less than or equal to 30 nm, within a wavelength range from greater than or equal to 800 nm to less than or equal to 950 nm That is, the LP01 losses of the coupler 200 are relatively low for LP01 modes confined in the first propagation waveguide 106. Similarly, the LP11 losses of the coupler 200 are relatively low for the converted LP11 mode cross-coupled into the first propagation waveguide 106. In addition, the LP01 cross-talk between the first propagation waveguide 106 and the second propagation waveguide 126 is relatively low for LP01 modes confined in the first propagation waveguide 106 and the LP11 cross-talk between the first propagation waveguide 106 and the second propagation waveguide 126 is relatively low for LP11 modes cross-coupled into the first propagation waveguide 106.

In embodiments of the coupler 200 depicted in FIGS. 1A and 3, the LP01 loss may be determined based on the power of the LP01 mode coupled into the first propagation waveguide 106 and the power of the LP01 mode emitted from the first propagation waveguide 106 (i.e., LP01 loss=10 log($P_2/P_1$), where $P_1$ is the power of the LP01 mode coupled into the first propagation waveguide 106 and $P_2$ is the power of the LP01 mode emitted from the first propagation waveguide 106). In this embodiment, the LP01 loss of the coupler 200 is less than 1.0 dB for wavelengths of light within a spectral band having a bandwidth of less than or equal to 30 nm, such as greater than or equal to 25 nm and less than or equal to 30 nm, within a wavelength range from greater than or equal to 800 nm to less than or equal to 950 nm. In embodiments, the LP01 loss of the coupler 200 for wavelengths of light in the spectral band having a bandwidth of less than or equal to 30 nm, such as greater than or equal to 25 nm and less than or equal to 30 nm, within a wavelength range from greater than or equal to 800 nm to less than or equal to 950 nm is less than or equal to 0.9 dB, less than or equal to 0.8 dB, less than or equal to 0.7 dB, less than or equal to 0.8 dB, less than or equal to 0.7 dB, less than or equal to 0.6 dB, less than or equal to 0.5 dB, less than or equal to 0.4 dB, less than or equal to 0.3 dB, less than or equal to 0.2 dB, or even less than or equal to 0.1 dB.

In embodiments of the coupler 200 depicted in FIGS. 1A and 3, the LP11 loss may be determined based on the power of the LP01 mode coupled into the second propagation waveguide 126 and the power of the LP11 mode emitted from the first propagation waveguide 106 (i.e., LP11 loss=10 log($P_2/P_1$), where $P_1$ is the power of the LP01 mode coupled into the second propagation waveguide 126 and $P_2$ is the power of the LP11 mode emitted from the first propagation waveguide 106). In this embodiment, the LP11 loss of the coupler 200 is less than 1.5 dB for wavelengths of light within a spectral band having a bandwidth of less than or equal to 30 nm, such as greater than or equal to 25 nm and less than or equal to 30 nm, within a wavelength range from greater than or equal to 800 nm to less than or equal to 950 nm. In embodiments, the LP11 loss of the coupler 200 for wavelengths of light in the spectral band having a bandwidth of less than or equal to 30 nm, such as greater than or equal to 25 nm and less than or equal to 30 nm, within a wavelength range from greater than or equal to 800 nm to less than or equal to 950 nm is less than or equal to 1.4 dB, less than or equal to 1.3 dB, less than or equal to 1.2 dB, less than or equal to 1.1 dB, less than or equal to 1.0 dB, less than or equal to 0.9 dB, less than or equal to 0.8 dB, less than or equal to 0.7 dB, less than or equal to 0.8 dB, less than or equal to 0.7 dB, less than or equal to 0.6 dB, less than or equal to 0.5 dB, less than or equal to 0.4 dB, less than or equal to 0.3 dB, less than or equal to 0.2 dB, or even less than or equal to 0.1 dB.

In embodiments of the coupler 200 depicted in FIGS. 1A and 3, the LP01 cross-talk may be determined based on the power of the LP01 mode coupled into the first propagation waveguide 106 and the power of the LP01 mode emitted from the second propagation waveguide 126 (i.e., LP01 cross-talk=10 log($P_2/P_1$), where $P_1$ is the power of the LP01 mode coupled into the first propagation waveguide 106 and $P_2$ is the power of the LP01 mode emitted from the second propagation waveguide 126). In this embodiment, the LP01 cross-talk of the coupler 200 is less than −10 dB for wavelengths of light within a spectral band having a bandwidth of less than or equal to 30 nm, such as greater than or equal to 25 nm and less than or equal to 30 nm, within the wavelength range from greater than or equal to 800 nm to less than or equal to 950 nm. In embodiments, the LP01 cross-talk of the coupler 200 for wavelengths of light in a spectral band having a bandwidth of less than or equal to 30 nm, such as greater than or equal to 25 nm and less than or equal to 30 nm, within the wavelength range from greater than or equal to 800 nm to less than or equal to 950 nm is less than or equal to −11 dB, less than or equal to −12 dB, less than or equal to −13 dB, less than or equal to −14 dB, less than or equal to −15 dB, less than or equal to −16 dB, less than or equal to −17 dB, less than or equal to −18 dB, less than or equal to −19 dB, less than or equal to −20 dB, less than or equal to −21 dB, less than or equal to −22 dB, less than or equal to −23 dB, less than or equal to −24 dB, or even less than or equal to −25 dB.

In embodiments of the optical fiber coupler depicted in FIGS. 1A and 3, the LP11 cross-talk may be determined based on the power of the LP11 mode coupled into the first propagation waveguide 106 and the power of the LP11 mode emitted from the first propagation waveguide 106 (i.e., LP11 cross-talk=10 log($P_2/P_1$), where $P_1$ is the power of the LP11 mode coupled into the first propagation waveguide 106 and $P_2$ is the power of the LP11 mode emitted from the first propagation waveguide 106). In this embodiment, the LP11 cross-talk of the coupler 200 is less than −5 dB for wavelengths of light within a spectral band having a bandwidth of less than or equal to 30 nm, such as greater than or equal to 25 nm and less than or equal to 30 nm, within a wavelength range from greater than or equal to 800 nm to less than or equal to 965 nm. In embodiments, the LP11 cross-talk of the coupler 200 for wavelengths of light in the spectral band having a bandwidth of less than or equal to 30 nm, such as greater than or equal to 25 nm and less than or equal to 30 nm, within a wavelength range from greater than or equal to 800 nm to less than or equal to 950 nm is less than or equal to −6 dB, less than or equal to −7 dB, less than or equal to −8 dB, less than or equal to −9 dB, less than or equal to −10 dB, less than or equal to −11 dB, less than or equal to −12 dB, less than or equal to −13 dB, less than or equal to −14 dB, less than or equal to −15 dB, less than or equal to −16 dB, less than or equal to −17 dB, less than or equal to −18 dB, less than or equal to −19 dB, less than or equal to −20 dB, less than or equal to −21 dB, less than or equal to −22 dB, less than or equal to −23 dB, less than or equal to −24 dB, or even less than or equal to −25 dB.

Figure 4A:
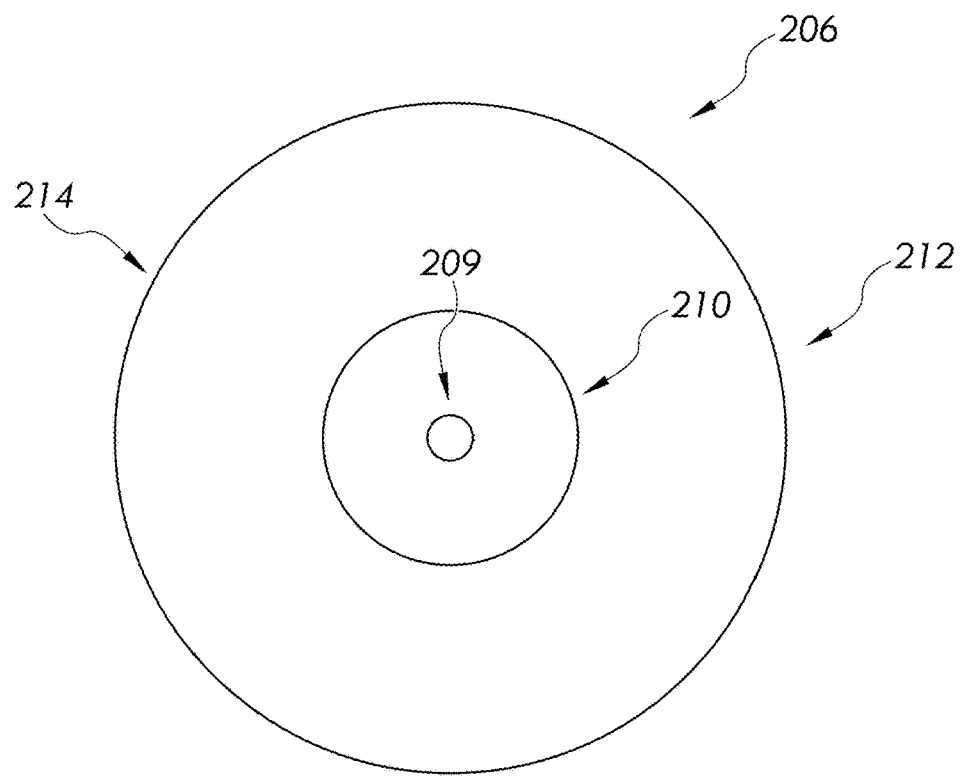
FIG. 4A schematically depicts a step of a method of manufacturing a mode-selective optical fiber coupler, according to one or more embodiments shown and described herein.

Referring now to FIGS. 4A-4G, a method for forming the mode-selective optical fiber couplers 100, 200 is schematically depicted. In a first step, as schematically depicted in FIG. 4A, a preform cane 206 is provided. In embodiments, the preform cane 206 has a structure and refractive index profile corresponding to that of the first propagation waveguide 106 and the second propagation waveguide 126. For example, the preform cane 206 may comprise a core portion 209 with a first core refractive index $n_{C1}$, an inner cladding portion 210 with an inner cladding refractive index $n_{IC1}$, and an outer cladding portion 212 with an outer cladding refractive index $n_{OC1}$. As noted herein, $n_{C1} > n_{IC1} > n_{OC1}$. The inner cladding portion 210 surrounds and directly contacts the core portion 209 such that the inner cladding portion 210 and the core portion 209 are concentric and circular symmetric in cross section with respect to an axial centerline of the core portion 209. The outer cladding portion 212 surrounds and directly contacts the inner cladding portion 210. In embodiments, the outer cladding portion 212, the inner cladding portion 210, and the core portion 209 are concentric. However, it should be understood that, in other embodiments, the outer cladding portion 212 may be non-concentric with the inner cladding portion 210 and the core portion 209.

In an alternative embodiment, the preform cane 206 may be formed without the inner cladding portion, such as when the preform cane is used to form the coupler 200 described herein with respect to FIGS. 1A and 3. In such an embodiment, the preform cane 206 may comprise a core portion 209 with a core refractive index $n_{C1}$ and an outer cladding portion 212 with an outer cladding refractive index $n_{OC1}$. As noted herein, $n_{C1} > n_{OC1}$. The outer cladding portion 212 surrounds and directly contacts the core portion 209. In embodiments, the outer cladding portion 212 and the core portion 209 are concentric.

Figure 4B:
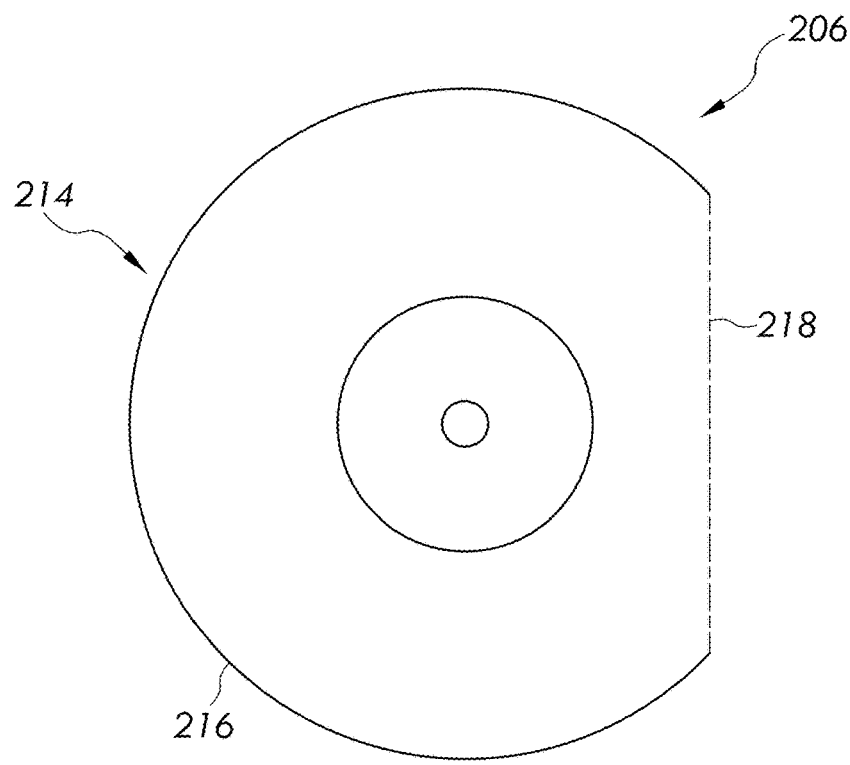
FIG. 4B schematically depicts a step of a method of manufacturing a mode-selective optical fiber coupler, according to one or more embodiments shown and described herein.

In a next step, schematically depicted in FIG. 4B, a portion of the outer surface 214 of the preform cane 206 is removed, by grinding, polishing, or the like, such that the outer surface comprises an arcuate segment 216 and an engagement segment 218. While the engagement segment 218 is depicted herein as being a linear segment, it should be understood that other forms of the engagement segment 218 are contemplated and possible including, for example and without limitation, engagement segments with compound curvatures, engagement segments with saw-tooth profiles, engagement segments with square-tooth profiles, and the like.

Figure 4C:
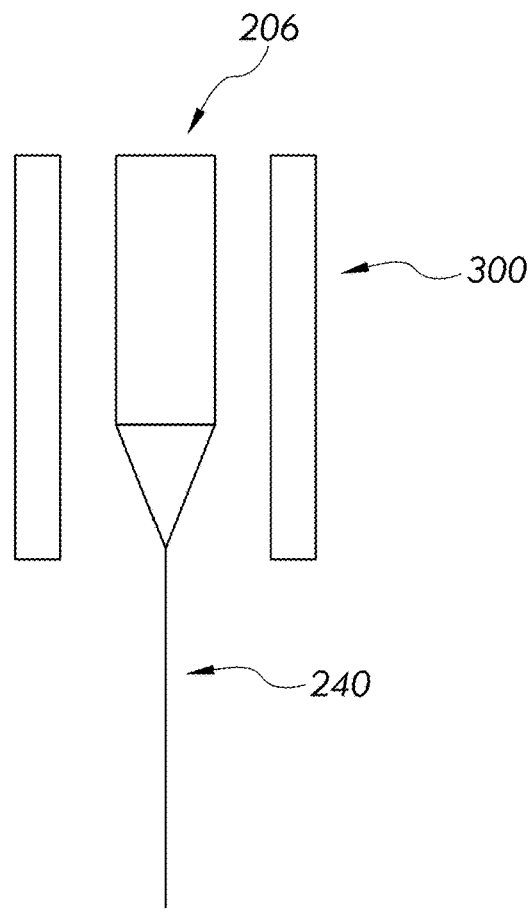
FIG. 4C schematically depicts a step of a method of manufacturing a mode-selective optical fiber coupler, according to one or more embodiments shown and described herein.

In a next step, schematically depicted in FIG. 4C, the preform cane 206 is placed in a furnace 300 where the preform cane 206 is heated and a coupler preform fiber 240 is drawn from the preform cane 206. The drawing step effectively reduces the radial dimensions of the preform cane 206 while maintaining the relative structure and orientation of the parts of the preform cane 206. Heating the preform cane 206 and drawing the coupler preform fiber 240 from the preform cane 206 may be performed using conventional techniques for manufacturing optical fibers.

Figure 4D:
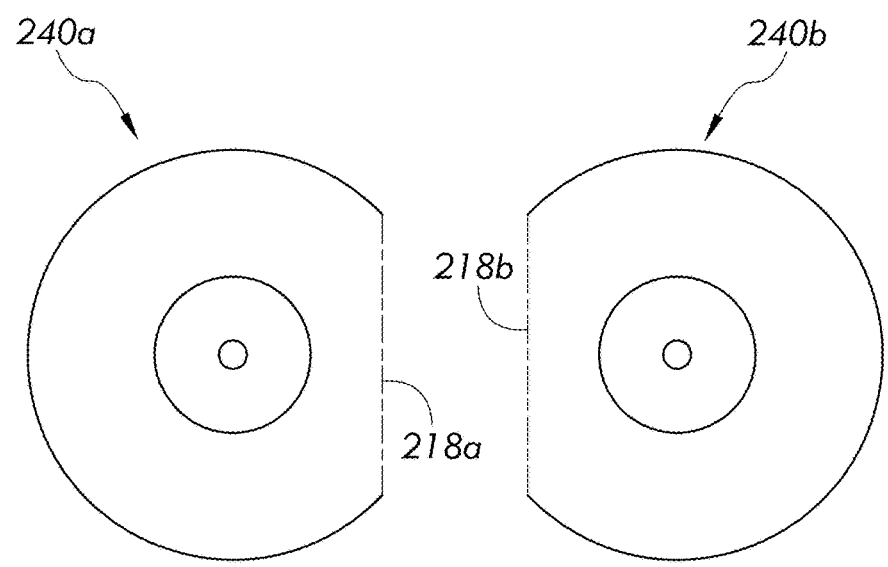
FIG. 4D schematically depicts a step of a method of manufacturing a mode-selective optical fiber coupler, according to one or more embodiments shown and described herein.

In a next step, schematically depicted in FIG. 4D, the coupler preform fiber 240 is segmented into a first preform fiber 240a with a first engagement segment 218a and a second preform fiber 240b with a second engagement segment 218b.

Figure 4E:
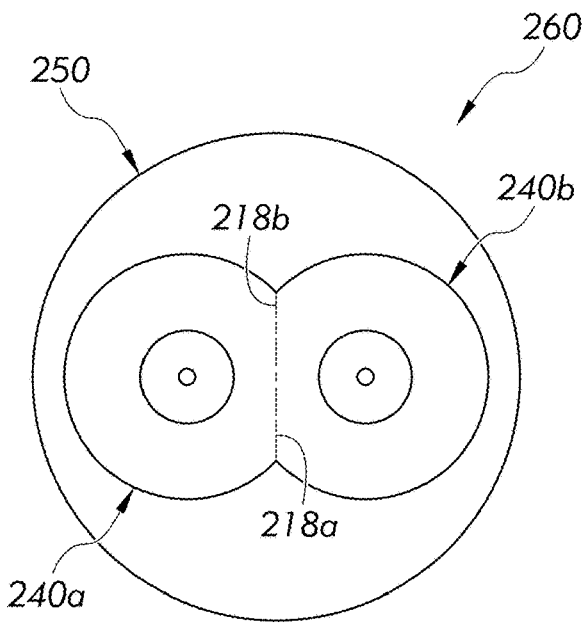
FIG. 4E schematically depicts a step of a method of manufacturing a mode-selective optical fiber coupler, according to one or more embodiments shown and described herein.

In a next step, schematically depicted in FIG. 4E, the first preform fiber 240a and the second preform fiber 240b are mated along the first engagement segment 218a and the second engagement segment 218b and inserted (sleeved) into a capillary tube 250 to form a preform assembly 260. In embodiments, the capillary tube 250 may have an index of refraction $n_T$ that is equal to the index of refraction of the outer cladding of each of the first preform fiber 240a and the second preform fiber 240b. Portions of the first preform fiber 240a and the second preform fiber 240b may extend outside of the capillary tube 250 and subsequently serve as leads or pigtails for coupling optical signals in to or out of the coupler.

Figure 4F:
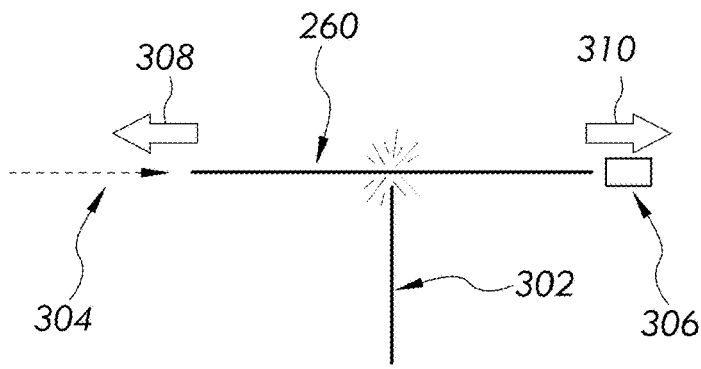
FIG. 4F schematically depicts a step of a method of manufacturing a mode-selective optical fiber coupler, according to one or more embodiments shown and described herein.

In a next step, schematically depicted in FIG. 4F, the preform assembly 260 is further processed to fuse the first preform fiber 240a and the second preform fiber 240b along the respective first engagement segment 218a and the second engagement segment 218b within the capillary tube 250, collapse and fuse the capillary tube 250 to the first preform fiber 240a and the second preform fiber 240b, and to introduce a taper in the preform assembly 260, thereby forming a mode-selective optical fiber coupler 100, 200. In embodiments, the first preform fiber 240a and the second preform fiber 240b are fused along the respective first engagement segment 218a and second engagement segment 218b within the capillary tube 250 and the capillary tube 250 is collapsed and fused to the first preform fiber 240a and the second preform fiber 240b by heating the preform assembly 260 along the length of the preform assembly 260. Heating may be accomplished by, for example and without limitation, a flame of a burner, a laser source (such as a $CO_2$ laser), or the like. In embodiments, the taper is imparted to the preform assembly 260 by locally heating a portion of the preform assembly 260 at and around a midpoint of the preform assembly 260 and simultaneously tensioning the preform assembly 260 (as indicated by arrows 308 and 310). In embodiments, the heating may be accomplished by directing a beam 302 of a $CO_2$ laser onto the preform assembly 260 at and around the midpoint of the preform assembly 260, thereby heating and softening the glass of a portion of the preform assembly 260. Tensioning the preform assembly while heating and softening the glass of the preform assembly introduces a localized taper in the preform assembly 260 in the portion of the preform assembly 260 that is heated.

Still referring to FIG. 4F, in embodiments, the process of tapering the preform assembly 260 may be actively controlled to achieve the desired properties in the resultant coupler 100, 200. For example, for couplers designed to operate in a spectral band around 850 nm, a test signal 304 with a wavelength of 1550 nm may be input into one of the propagation waveguides of the preform assembly 260 during tapering, and the power of the LP01 modes output from each of the propagation waveguides of the preform assembly 260 monitored with detector 306. In this embodiment, the LP01 mode of the 1550 nm test signal is partially cross-coupled into the adjacent propagation waveguide and output from the preform assembly 260. Heating and tensioning proceeds until the cross-coupled power output from each of the propagation waveguides reaches a target value, at which point the tensioning and heating are discontinued. For example, for a 1550 nm test signal 304 input into the preform assembly 260, the target cross-coupled power output goes through a maximum before reverting to the target cross-coupled power of 3.2 dB from each of the propagation waveguides, which corresponds to the resultant coupler 100, 200 having the desired loss and cross-talk characteristics in a wavelength range from 800-950 nm.

In embodiments, tapering the preform assembly 260 results in the formation of the mode-selective optical fiber coupler 100, 200.

As noted herein with respect to the coupler 200, in embodiments, the second propagation waveguide 126 may be formed from a preform fiber that is pre-tapered to achieve the desired properties of the coupler 200 (i.e., conversion of LP01 modes to LP11 modes along with cross-coupling). In this embodiment, prior to the step of mating the first preform fiber 240a and the second preform fiber 240b and inserting the first preform fiber 240a and the second preform fiber 240b into the capillary tube 250 (i.e., prior to the step schematically depicted in FIG. 4E), the second preform fiber 240b corresponding to the second propagation waveguide 126 may be pre-tapered.

Figure 4G:
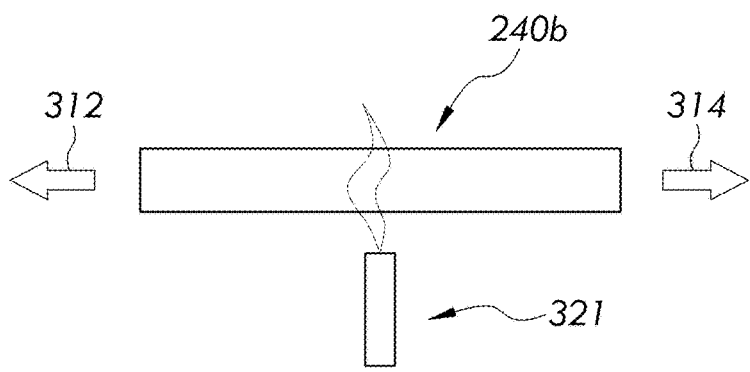
FIG. 4G schematically depicts a step of a method of manufacturing a mode-selective optical fiber coupler, according to one or more embodiments shown and described herein.

Referring to FIG. 4G by way of example, pre-tapering of the second preform fiber 240b may be achieved by heating a portion of the second preform fiber 240b at and around a midpoint of the second preform fiber 240b and simultaneously tensioning the second preform fiber 240b (as indicated by arrows 312 and 314). In embodiments, the heating may be accomplished by placing a portion of the second preform fiber 240b in the flame of a burner 321, thereby heating and softening the glass of a portion of the second preform fiber 240b. Tensioning the second preform fiber 240b while heating and softening the glass of the preform reduces the dimensions of the second preform fiber 240b in the portion of the second preform fiber 240b that is heated. As noted herein, at least the diameter of the core in the portion that is heated may be uniformly reduced such that the diameter of the core has a uniform diameter around the midpoint. Thereafter, the second preform fiber 240b may be mated to the first preform fiber 240a and sleeved into the capillary tube 250, as described herein.

EXAMPLES

The embodiments described herein will be further clarified by the following examples.

Example 1

A mode-selective optical fiber coupler having the structure depicted in FIGS. 1A and 1B was modeled in Synopsis® RSoft Photonics Device Tools to determine the LP01 loss, LP01 cross-talk, LP11 loss, and LP11 cross-talk of the coupler. The modeled dimensions of the coupler are reported in Table 3.

TABLE 3

| | |
|---|---|
| L (mm) | 28 |
| $D_{C1}$ (µm) | 8.4 |
| $D_{IC1}$ (µm) | 50 |
| $D_{OC1}$ (µm) | 125 |

TABLE 3-continued

| | |
|---|---|
| $D_{C2}$ (μm) | 8.4 |
| $D_{IC2}$ (μm) | 50 |
| $D_{OC2}$ (μm) | 125 |
| C-C (μm) | 65 |
| $F_S$ | 0.21 |

Figure 5:
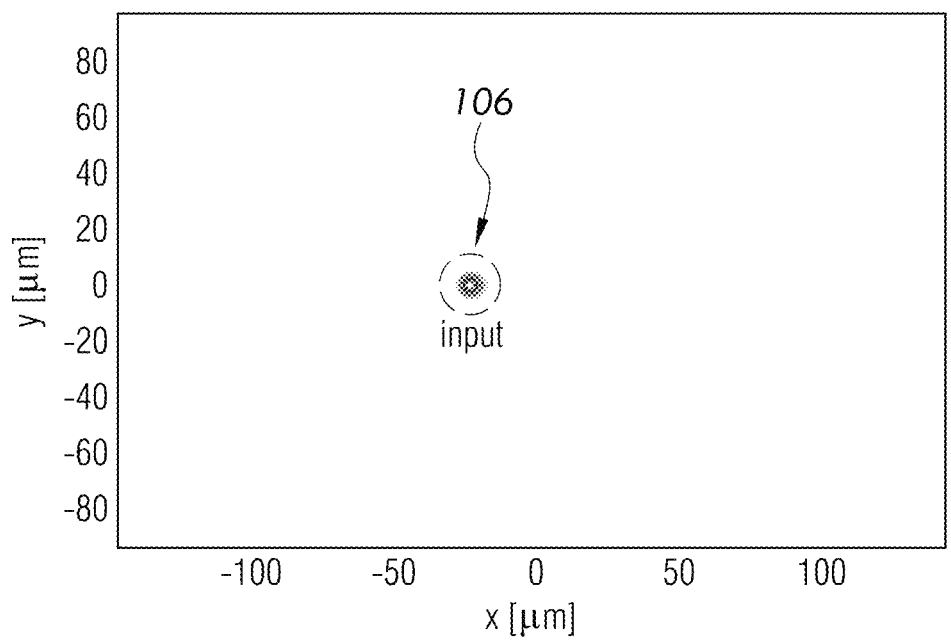
FIG. 5 graphically depicts the power of an LP01 mode of an optical signal in a first propagation waveguide at an input face of a coupler, according to one or more embodiments shown and described herein.
Figure 6:
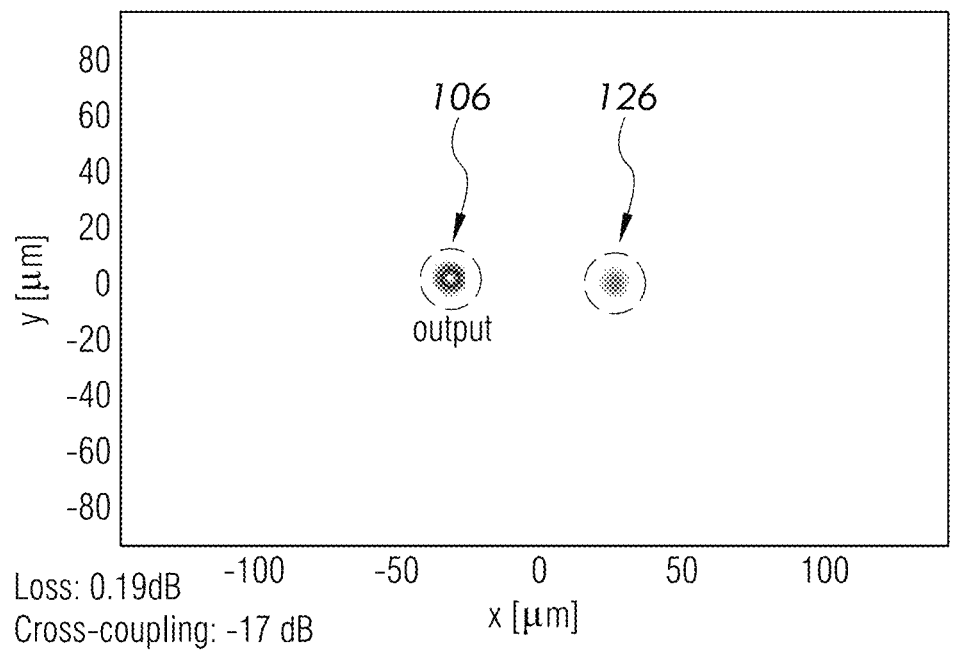
FIG. 6 graphically depicts the power of an LP01 mode of an optical signal in a first propagation waveguide and a second propagation waveguide at an output face of a coupler, according to one or more embodiments shown and described herein.

Referring to FIGS. 1B and 5-8, the coupler was modeled with an optical signal having a wavelength of 850 nm and comprising an LP01 mode and an LP11 mode launched into the first propagation waveguide 106. FIGS. 5 and 6 graphically depict the power of the LP01 mode in the first propagation waveguide 106 at the input face 102 of the coupler 100 (FIG. 5) and the power of the LP01 in the first propagation waveguide 106 and the second propagation waveguide 126 at the output face 104 of the coupler 100 (FIG. 6). As graphically depicted in FIGS. 5 and 6, the LP01 mode is substantially confined in the first propagation waveguide 106 with a modeled LP01 loss of 0.19 dB and a modeled LP01 cross-talk of −17 dB. That is, FIG. 5 graphically depicts that the power of the LP01 mode coupled into the first propagation waveguide 106 is substantially confined to the core of the first propagation waveguide 106 at the input face 102 while FIG. 6 graphically depicts that the power of the LP01 mode coupled into the first propagation waveguide 106 is substantially confined to the core of the first propagation waveguide 106 at the output face 104 with only minimal loss of power to the second propagation waveguide 126 due to cross-coupling.

Figure 7:
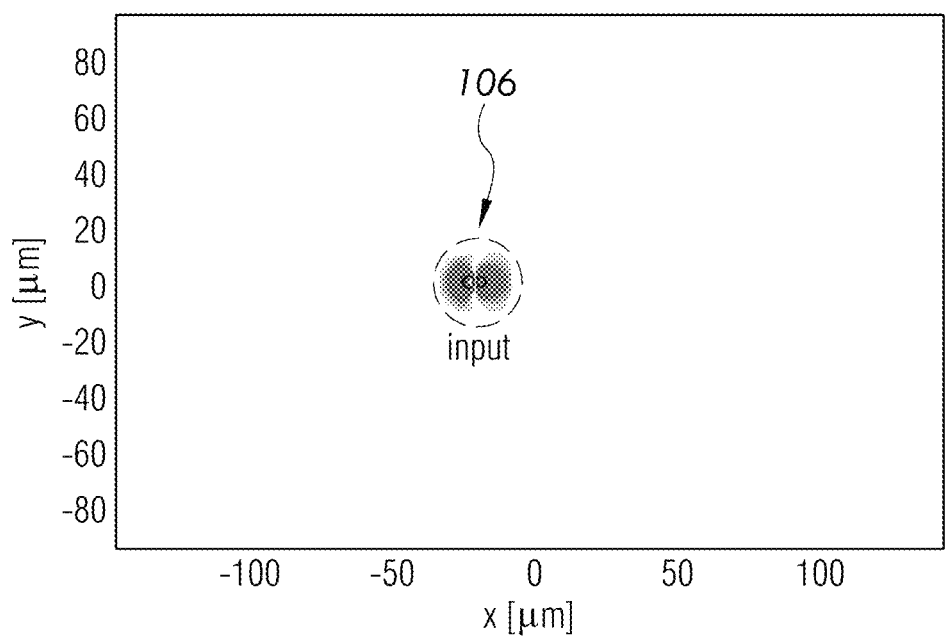
FIG. 7 graphically depicts the power of an LP11 mode of an optical signal in a first propagation waveguide at an input face of a coupler, according to one or more embodiments shown and described herein.
Figure 8:
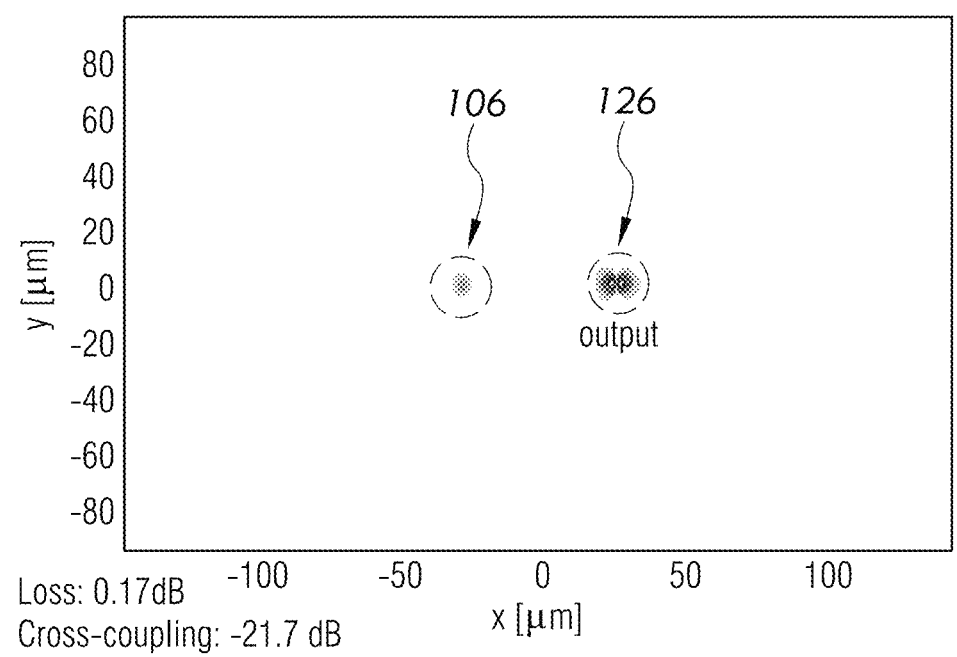
FIG. 8 graphically depicts the power of an LP11 mode of an optical signal in a first propagation waveguide and a second propagation waveguide at an output face of a coupler, according to one or more embodiments shown and described herein.

FIGS. 7 and 8 graphically depict the power of the LP11 mode in the first propagation waveguide 106 at the input face 102 of the coupler 100 (FIG. 7) and the power of the LP11 mode in the first propagation waveguide 106 and the second propagation waveguide 126 at the output face 104 of the coupler 100 (FIG. 8). As graphically depicted in FIGS. 7 and 8, the LP11 mode is substantially cross-coupled from the first propagation waveguide 106 into the second propagation waveguide 126 with a modeled LP11 loss of 0.17 dB and a modeled LP11 cross-talk of −27 dB. That is, FIG. 7 graphically depicts that the power of the LP11 mode coupled into the first propagation waveguide 106 is substantially confined to the core of the first propagation waveguide 106 at the input face 102 while FIG. 8 graphically depicts that the power of the LP11 mode coupled into the first propagation waveguide 106 is substantially cross-coupled to the core of the second propagation waveguide 126 at the output face 104 with only minimal loss of power.

Figure 9:
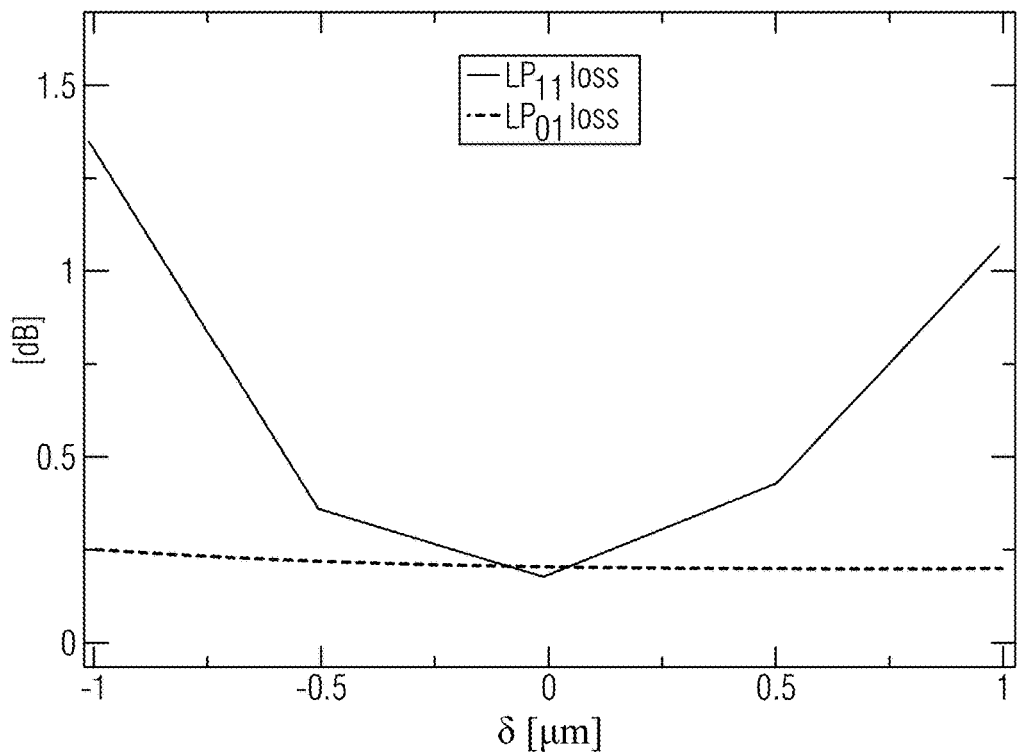
FIG. 9 graphically depicts the LP01 loss and the LP11 loss of a coupler as a function of variations in core-to-core spacing, according to one or more embodiments shown and described herein.

In addition, the effect of variations in the center-to-center (C-C) spacing between the first core 108 of the first propagation waveguide 106 and the second core 128 of the second propagation on the LP01 loss and the LP11 loss was also investigated. In particular, the LP01 loss and the LP11 loss were modeled for C-C deviating from the 65 μm nominal spacing by +/−0.5 μm and +/−1 μm. The results are graphically depicted in FIG. 9 which plots the LP01 loss and the LP11 loss (Y-axis) as a function of the change in core-to-core spacing (X-axis). As depicted in FIG. 9, variations in core-to-core spacing of up to +/−1 μm cause a slight variation in the LP01 losses while still maintaining the LP01 loss to less than approximately 0.25 dB. Variations in core-to-core spacing of up to +/−1 μm cause a larger variation in LP11 losses. However, the LP11 losses are considered to be relatively low at less than 1.5 dB.

Figure 10:
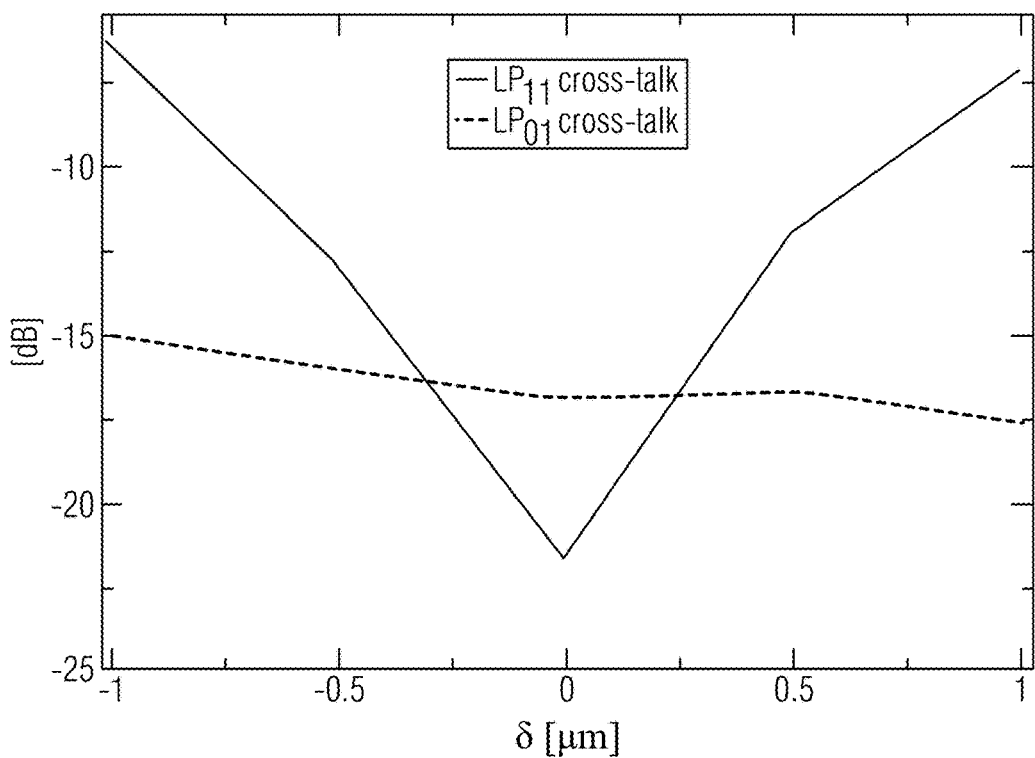
FIG. 10 graphically depicts the LP01 cross-talk and the LP11 cross-talk of a coupler as a function of variations in core-to-core spacing, according to one or more embodiments shown and described herein.

Further, the effect of variations in the center-to-center (C-C) spacing between the first core 108 of the first propagation waveguide 106 and the second core 128 of the second propagation on the LP01 cross-talk and the LP11 cross-talk was also investigated. In particular, the LP01 cross-talk and the LP11 cross-talk were modeled for C-C deviating from the 65 μm nominal spacing by +/−0.5 μm and +/−1 μm. The results are graphically depicted in FIG. 10 which plots the LP01 cross-talk and the LP11 cross-talk (Y-axis) as a function of the change in core-to-core spacing (X-axis). As depicted in FIG. 10, variations in core-to-core spacing of up to +/−1 μm cause a variation in the LP01 cross-talk while still maintaining the LP01 cross-talk to less than approximately −15 dB. Variations in core-to-core spacing of up to +/−1 μm cause a larger variation in LP11 cross-talk. However, the LP11 cross-talk is considered to be relatively low at less than 0 dB.

Figure 11:
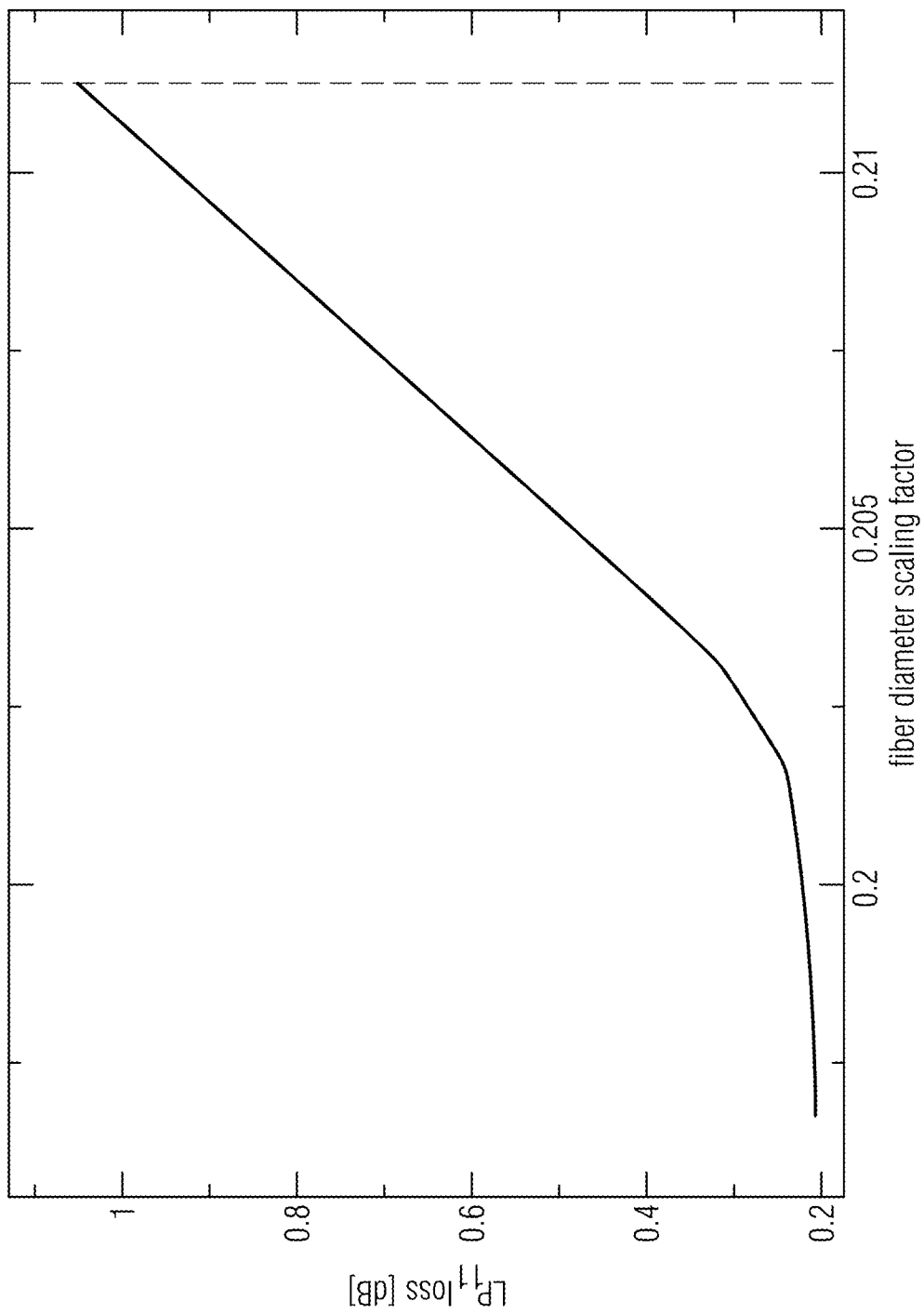
FIG. 11 graphically depicts the LP11 loss as a function of variations in the scaling factor $F_S$, according to one or more embodiments shown and describe herein.

In addition, the effect of variations in the scaling factor $F_S$ on the LP11 loss was investigated for center-to-center spacings deviating from the nominal 65 μm spacing by +1 μm. In particular, the LP11 loss was modeled for scaling factors of from approximately 0.2 to approximately 0.21 for a center-to-center spacing of 66 μm. The results are graphically depicted in FIG. 11 which plots the LP11 loss (Y-axis) as a function of scaling factor $F_S$ (X-axis). As depicted in FIG. 11, LP11 loss decreases significantly with decreases in the scaling factor $F_S$, indicating that increases in the LP11 loss due to increases in the core-to-core spacing may be offset by reducing the scaling factor $F_S$ of the coupler 100.

Modeling was also conducted to investigate the effect of changes to the diameters $D_{IC1}$ and Dice of the first inner cladding 110 and the second inner cladding 130, respectively, on the LP01 loss, the LP11 loss, the LP01 cross-talk, and the LP11 cross-talk. From the modeling results it was determined that variations in the diameters $D_{IC1}$, Dice of up to +/−1 μm could be tolerated while still maintaining the LP01 loss and the LP11 loss to less than 0.5 dB and the LP01 cross-talk and the LP11 cross-talk to less than −10 dB.

The performance of the coupler was also modeled for optical signals having wavelengths of 800 nm, 825 nm, 850 nm, 875 nm, and 900 nm input into the first propagation waveguide 106 at the input face 102 of the coupler 100. This modeling simulated the performance of the coupler in the wavelength band compatible with SWDM applications (i.e., 800 nm-900 nm). The results are tabulated in Table 4 below.

TABLE 4

| Wavelength (nm) | LP11 Loss (dB) | LP11 Cross-talk (dB) |
|---|---|---|
| 800 | 1.1 | −7.36 |
| 825 | 0.44 | −11.9 |
| 850 | 0.17 | −21.7 |
| 875 | 0.29 | −14.3 |
| 900 | 1.0 | −7.45 |

As indicated in Table 4, the modeled coupler demonstrated LP11 losses less than or equal 1.1 dB and LP11 cross-talk less than −7 dB for wavelengths in the range of 800-900 nm indicating suitability for use in SWDM applications.

Example 2

A mode-selective optical fiber coupler having the structure depicted in FIGS. 1A and 1B was modeled in Synopsis® RSoft Photonics Device Tools to determine the LP01 loss, LP01 cross-talk, LP11 loss, and LP11 cross-talk of the coupler for use with input wavelengths in the spectral band from 850 nm to 950 nm. The modeled dimensions of the coupler are reported in Table 5.

TABLE 5

| | |
|---|---|
| L (mm) | 24 |
| $D_{C1}$ (μm) | 8.4 |
| $D_{IC1}$ (μm) | 50 |
| $D_{OC1}$ (μm) | 125 |
| $D_{C2}$ (μm) | 8.4 |
| $D_{IC2}$ (μm) | 50 |
| $D_{OC2}$ (μm) | 125 |
| C-C (μm) | 65 |
| $F_S$ | 0.23 |

Figure 12:
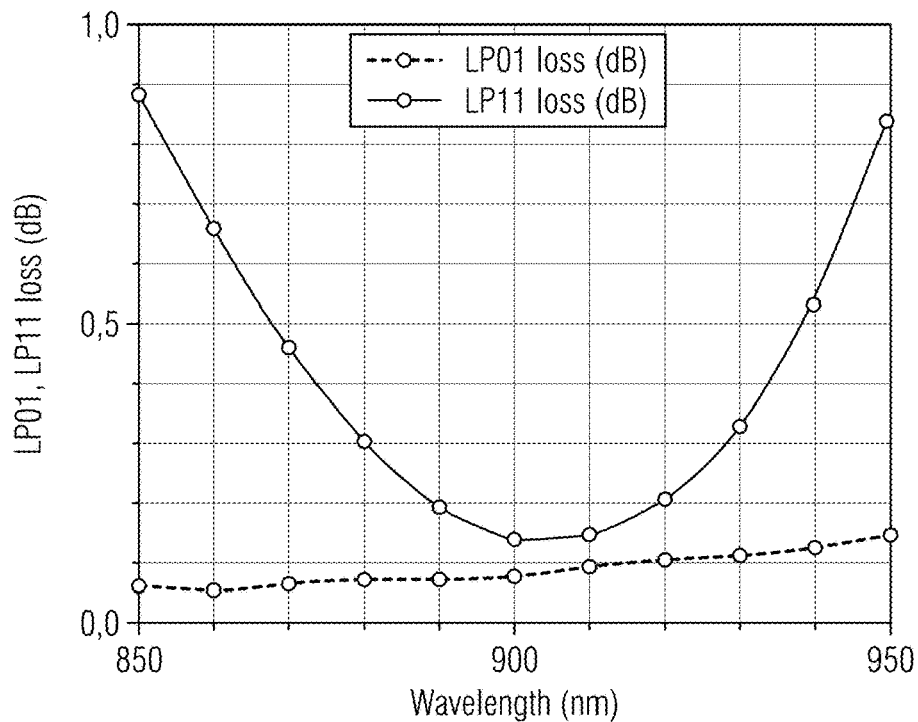
FIG. 12 graphically depicts the LP01 loss and the LP11 loss of a coupler as a function of wavelength, according to one or more embodiments shown and described herein.

The effect of variations in the wavelength of the optical signal input into the first propagation waveguide 106 on the LP01 loss and the LP11 loss was investigated. In particular, the LP01 loss and the LP11 loss were modeled for wavelengths within the spectral band from 850 nm to 950 nm. The results are graphically depicted in FIG. 12 which plots the LP01 loss and the LP11 loss (Y-axis) as a function of wavelength (X-axis). As depicted in FIG. 12, the coupler had an LP01 loss of less than 0.2 dB and an LP11 loss of less than 0.9 dB over the spectral band from 850 nm to 950 nm.

Figure 13:
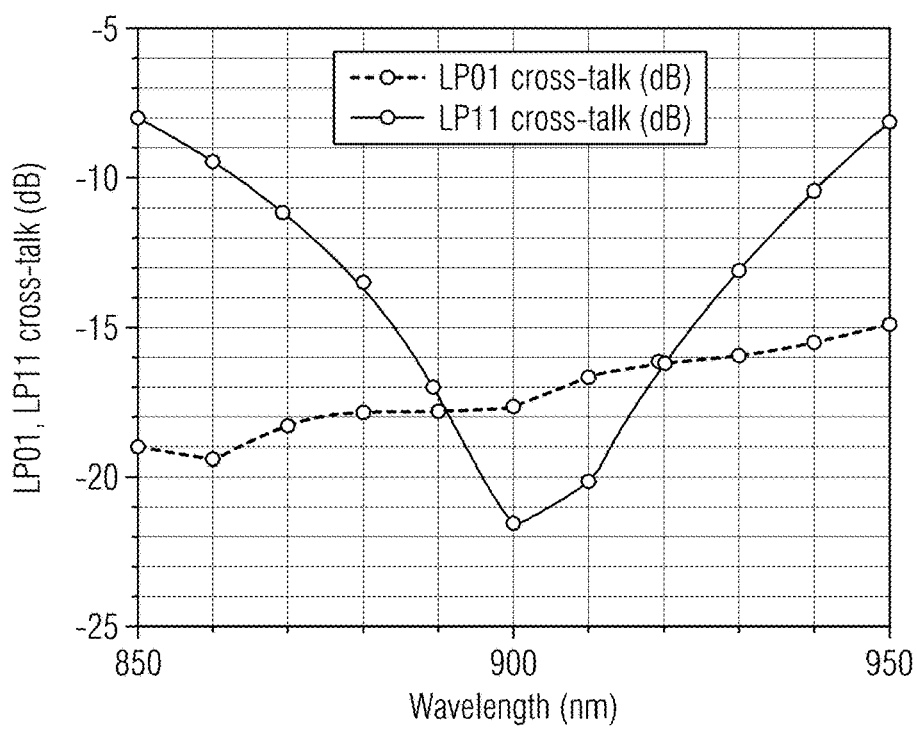
FIG. 13 graphically depicts the LP01 cross-talk and the LP11 cross-talk of a coupler as a function of wavelength, according to one or more embodiments shown and described herein.

The effect of variations in the wavelength of the optical signal input into the first propagation waveguide 106 on the LP01 cross-talk and the LP11 cross-talk was investigated. In particular, the LP01 cross-talk and the LP11 cross-talk were modeled for wavelengths within the spectral band from 850 nm to 950 nm. The results are graphically depicted in FIG. 13 which plots the LP01 cross-talk and the LP11 cross-talk (Y-axis) as a function of wavelength (X-axis). As depicted in FIG. 13, the coupler had an LP01 cross-talk of less than or equal to −15 dB and an LP11 cross-talk of less than or equal to −8 dB over the spectral band from 850 nm to 950 nm.

Example 3

A mode-selective optical fiber coupler 200 having the structure depicted in FIGS. 1A and 3 was modeled in Synopsis® RSoft Photonics Device Tools. The modeled dimensions of the coupler are reported in Table 6. In this embodiment, the first propagation waveguide 106 comprised a few-moded waveguide and the second propagation waveguide 126 comprised a single-moded waveguide, as described herein with respect to FIG. 3. Accordingly, as described herein with respect to FIG. 3, an LP01 launched into the first propagation waveguide 106 at the input face 102 through-propagates through the first propagation waveguide 106 and is emitted from the first propagation waveguide 106 at the output face 104. An LP01 mode launched into the second propagation waveguide 126 at the input face 102 is converted to an LP11 mode, cross-coupled into the first propagation waveguide 106, and emitted from the first propagation waveguide 106 at the output face 104. In this embodiment, the second propagation waveguide 126 was modeled with a pre-taper such that the second core 228 of the second propagation waveguide 126 had a diameter of 3.72 μm at the input face 102 and the output face 104 of the coupler 200. The first core 208 of the first propagation waveguide 106 was modeled with a diameter of 8.2 μm at the input face 102 and the output face 104 of the coupler 200.

TABLE 6

| | |
|---|---|
| L (mm) | 14 |
| $D_{C1}$ (um) | 8.2 |
| $D_{OC1}$ (um) | 125 |
| $D_{C2}$ (um) | 3.72 |

TABLE 6-continued

| | |
|---|---|
| $D_{OC2}$ (um) | 56.4 |
| C-C (um) | 15 |
| $F_S$ | 0.8 |

Figure 14:
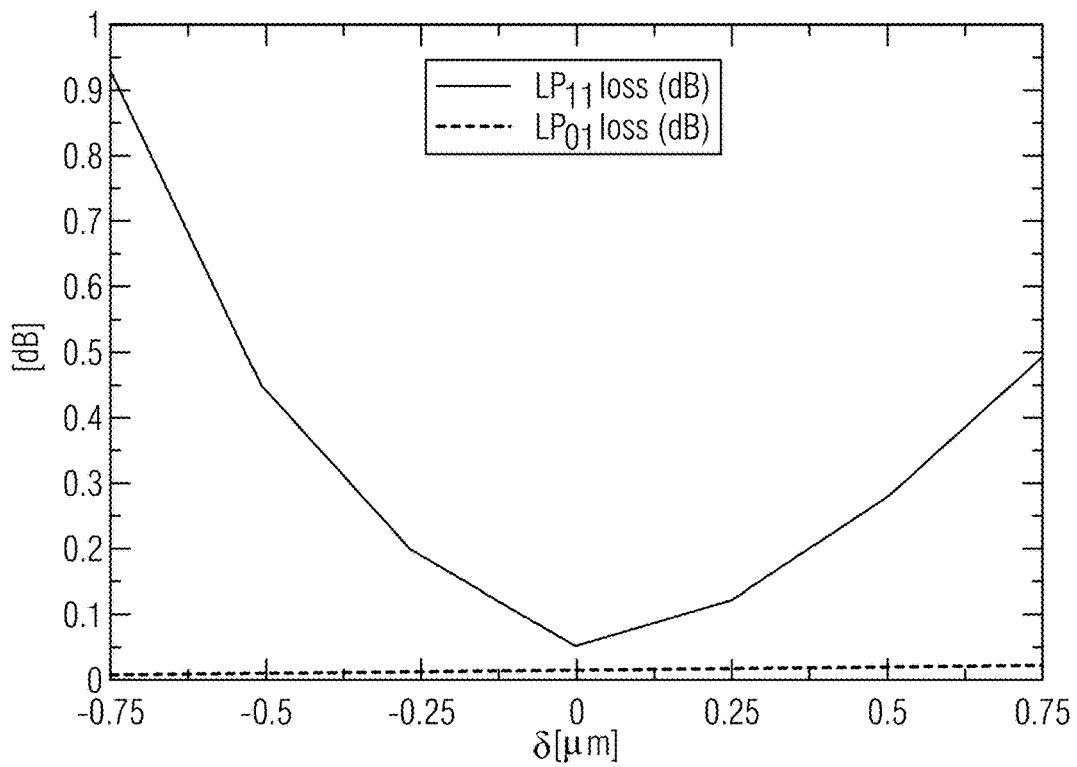
FIG. 14 graphically depicts the LP01 loss and the LP11 loss of a coupler as a function of variations in core-to-core spacing, according to one or more embodiments shown and described herein.

Referring to FIGS. 1A, 3, 14, and 15, the effect of variations in the center-to-center (C-C) spacing between the first core 108 of the first propagation waveguide 106 and the second core 128 of the second propagation on the LP01 loss and the LP11 loss was investigated. In particular, the LP01 loss and the LP11 loss were modeled for C-C deviating from the 15 μm nominal spacing by +/−0.75 μm. The results are graphically depicted in FIG. 14 which plots the LP01 loss and the LP11 loss (Y-axis) as a function of the change in core-to-core spacing (X-axis). As depicted in FIG. 14, variations in core-to-core spacing of up to +/−0.75 μm cause a slight variation in the LP01 loss while still maintaining the LP01 loss to less than 0.05 dB. Variations in core-to-core spacing of up to +/−0.75 μm cause a larger variation in LP11 loss. However, the LP11 losses are considered to be relatively low at less than 0.95 dB.

Figure 15:
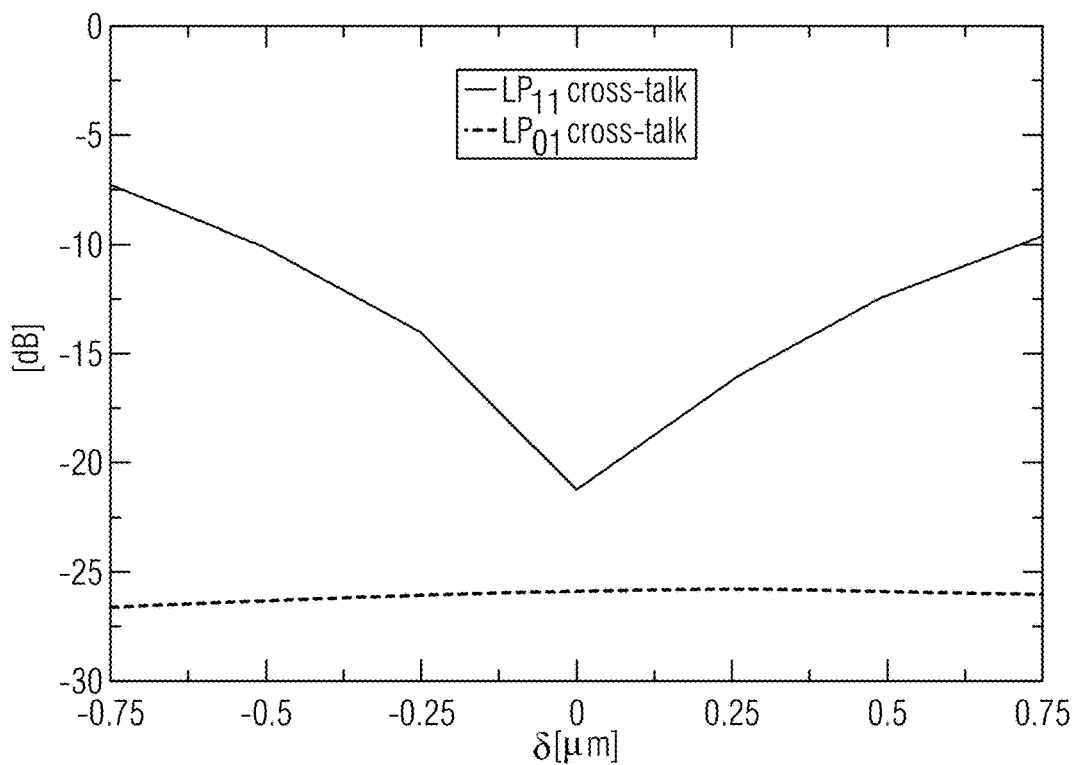
FIG. 15 graphically depicts the LP01 cross-talk and the LP11 cross-talk of a coupler as a function of variations in core-to-core spacing, according to one or more embodiments shown and described herein.

Further, the effect of variations in the center-to-center (C-C) spacing between the first core 108 of the first propagation waveguide 106 and the second core 128 of the second propagation on the LP01 cross-talk and the LP11 cross-talk was also investigated. In particular, the LP01 cross-talk and the LP11 cross-talk were modeled for C-C deviating from the 15 μm nominal spacing by +/−0.75 μm. The results are graphically depicted in FIG. 15 which plots the LP01 cross-talk and the LP11 cross-talk (Y-axis) as a function of the change in core-to-core spacing (X-axis). As depicted in FIG. 15, variations in core-to-core spacing of up to +/−0.75 μm cause a variation in the LP01 cross-talk while still maintaining the LP01 cross-talk to less than −25 dB. Variations in core-to-core spacing of up to +/−0.75 μm cause a larger variation in LP11 cross-talk. However, the LP11 cross-talk is considered to be relatively low at less than approximately −5 dB.

Figure 16:
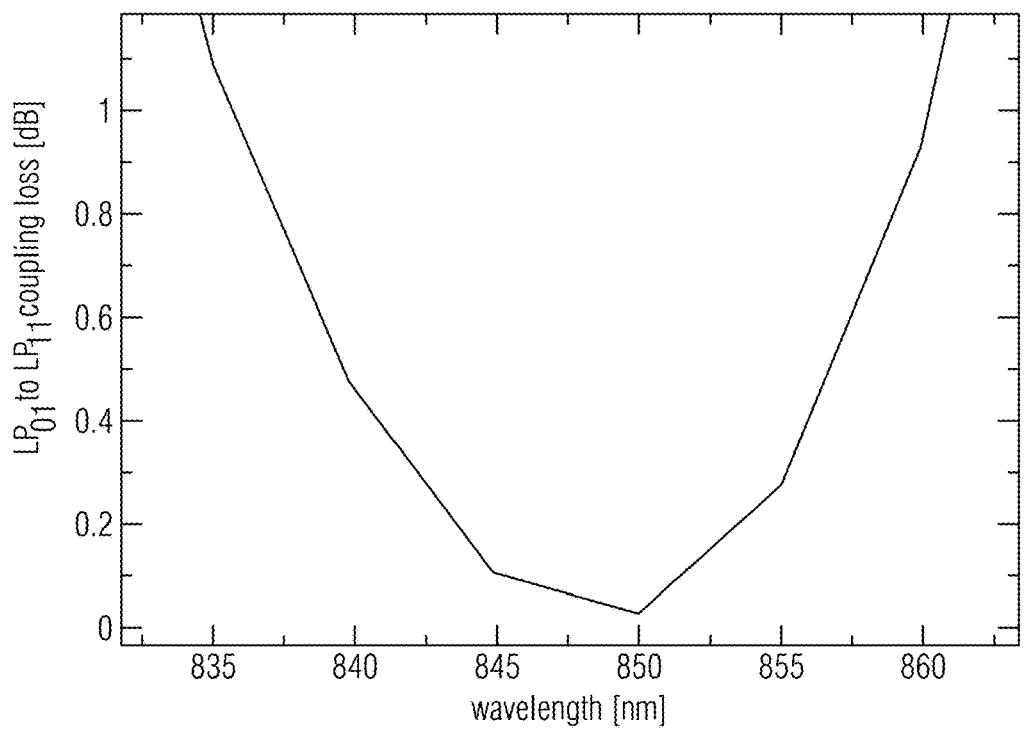
FIG. 16 graphically depicts the LP01 to LP11 conversion/coupling loss as a function of wavelength, according to one or more embodiments shown and described herein.

Referring now to FIG. 16, FIG. 16 graphically depicts the wavelength dependence on the conversion efficiency (i.e., the power loss when converting the LP01 mode to an LP11 mode and cross-coupling the LP11 mode) of the modeled coupler of Example 3 designed for operation with optical signals having a wavelength of 850 nm. In particular, FIG. 16 graphically depicts the conversion/coupling loss (Y-axis) as a function of wavelength (X-axis) for an LP01 mode launched into the second propagation waveguide 126 at the input face 102, converted to an LP11 mode, cross-coupled into the first propagation waveguide 106, and emitted from the first propagation waveguide 106 at the output face 104. The coupling loss is determined is determined from the power of the LP01 mode input into the second propagation waveguide and the power of the LP11 mode output from the first propagation waveguide 106 (i.e., the coupling loss=10 log($P_2/P_1$), where $P_1$ is the power of the LP01 mode input into the second propagation waveguide 126 and $P_2$ is the power of the LP11 mode output from the first propagation waveguide 106). As shown in FIG. 16, the LP01 to LP11 conversion/coupling losses increase for input wavelengths deviating from 850 nm, indicating an operational spectral band of approximately 30 nm centered at 850 nm to facilitate LP01 to LP11 conversion/coupling losses of less than approximately 1 db.

Figure 17:
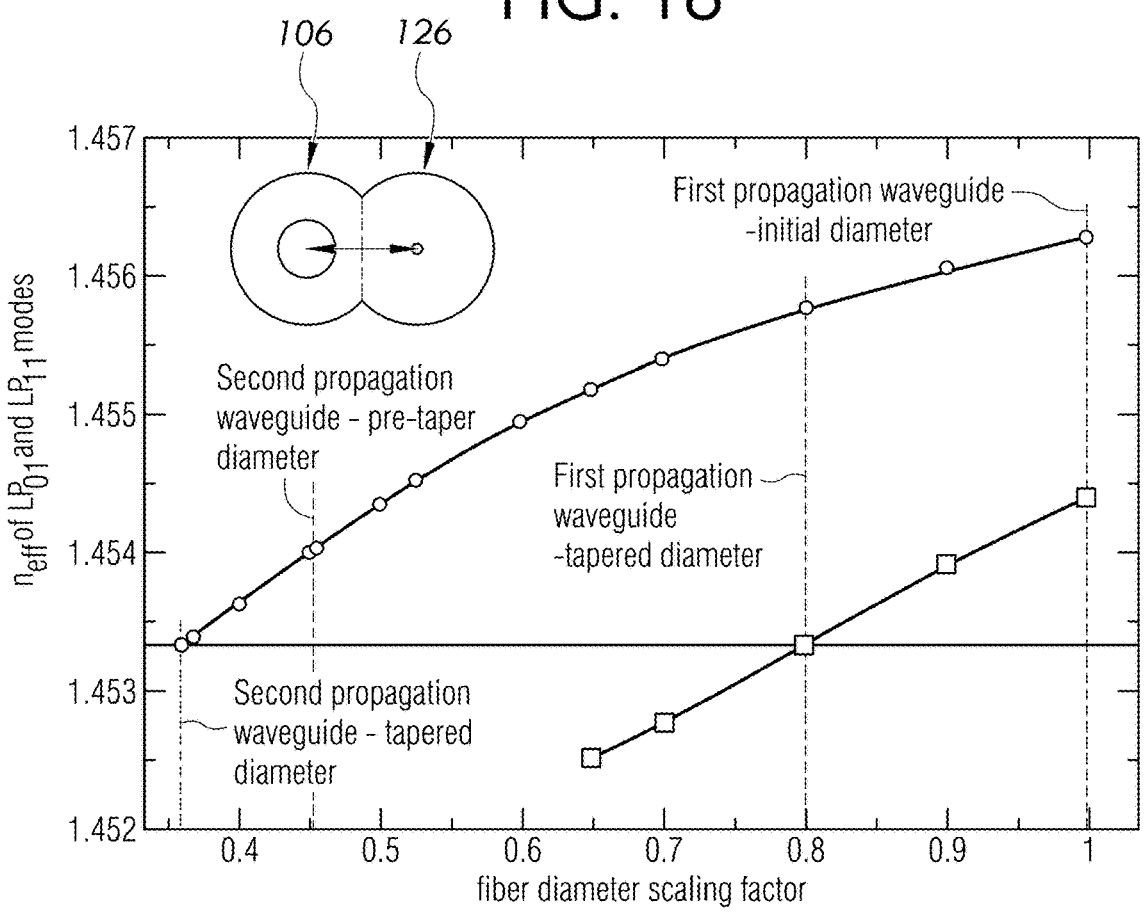
FIG. 17 graphically depicts the effective index of refraction of LP01 and LP11 modes as function of the scaling factor for one or more embodiments shown and described herein.

Referring now to FIG. 17, FIG. 17 graphically depicts the effective index of refraction ($n_{eff}$) for the LP01 and LP11 modes of the first propagation waveguide 106 and the second propagation waveguide 126 (Y-axis) as function of the scaling factor ($F_S$) (X-axis) of the coupler 200. As shown in FIG. 17, when the coupler 200 is tapered with a scaling factor of 0.8, (i.e., when the diameter of each of the first core 208 and the second core 228 at the midpoint $M_P$ of the coupler 200 are each reduced to a diameter that is 80% of the their respective diameters at the input face 102 and/or the output face 104), $n_{eff}$ of the first propagation waveguide 106 and the second propagation waveguide 126 are equal, as indicated by the horizontal line between $n_{eff}$ of 1.453 and $n_{eff}$ of 1.454. This enables conversion of the LP01 mode to an LP11 mode and cross-coupling of the LP11 mode from the second propagation waveguide 126 to the first propagation waveguide 106 due to phase matching between the LP01 and LP11 modes in combination with the close proximity of the respective cores of the first propagation waveguide 106 and the second propagation waveguide 126.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A mode-selective optical fiber coupler comprising:
an input face and an output face separated by a coupling length L;
a first propagation waveguide extending from the input face to the output face, the first propagation waveguide comprising a first core, a first inner cladding concentric with the first core, and a first outer cladding surrounding the first inner cladding, the first outer cladding having a first outer surface comprising a first arcuate segment and a first engagement segment; and
a second propagation waveguide extending from the input face to the output face, the second propagation waveguide comprising a second core, a second inner cladding concentric with the second core, and a second outer cladding surrounding the second inner cladding, the second outer cladding having a second outer surface comprising a second arcuate segment and a second engagement segment, wherein:
the first engagement segment and the second engagement segment are joined along the coupling length L;
the first propagation waveguide and the second propagation waveguide are tapered from the input face and the output face to a midpoint of the coupler such that a tapered width dimension $W_t$ of the coupler at the midpoint is less than a full width dimension $W_f$ of the coupler at the input face and at the output face;
when an LP01 mode of an optical signal coupled into the first core at the input face propagates through the first propagation waveguide and is emitted from the first core at the output face, an LP01 loss of the coupler at the output face is less than 1.0 dB for wavelengths in a spectral band having a bandwidth of less than or equal to 100 nm within a wavelength range from greater than or equal to 800 nm to less than or equal to 950 nm; and
when an LP11 mode of the optical signal coupled into the first core at the input face is cross-coupled to the second core and is emitted from the second core at the output face, an LP11 loss of the coupler at the output face is less than 1.5 dB for wavelengths in the spectral band having the bandwidth of less than or equal to 100 nm within the wavelength range from greater than or equal to 800 nm to less than or equal to 950 nm.

2. The mode-selective optical fiber coupler of claim 1, wherein:
the LP01 loss of the coupler at the output face is less than 0.5 dB for wavelengths in the spectral band having the bandwidth of less than or equal to 100 nm within the wavelength range from greater than or equal to 800 nm to less than or equal to 950 nm.

3. The mode-selective optical fiber coupler of claim 1, wherein:
the LP11 loss of the coupler at the output face is less than 1.0 dB for wavelengths in the spectral band having the bandwidth of less than or equal to 100 nm within the wavelength range from greater than or equal to 800 nm to less than or equal to 950 nm.

4. The mode-selective optical fiber coupler of claim 1, wherein:
an LP01 cross-talk of the coupler at the output face is less than −10 dB for wavelengths in the spectral band having the bandwidth of less than or equal to 100 nm within the wavelength range from greater than or equal to 800 nm to less than or equal to 950 nm.

5. The mode-selective optical fiber coupler of claim 1, wherein:
an LP11 cross-talk of the coupler at the output face is less than −5 dB for wavelengths in the spectral band having the bandwidth of less than or equal to 100 nm within the wavelength range from greater than or equal to 800 nm to less than or equal to 950 nm.

6. The mode-selective optical fiber coupler of claim 1, wherein a core-to-core spacing between the first core and the second core is less than or equal to 67 μm at the input face and at the output face.

7. The mode-selective optical fiber coupler of claim 6, wherein the core-to-core spacing between the first core and the second core is greater than or equal to 63 μm at the input face and at the output face.

8. The mode-selective optical fiber coupler of claim 1, wherein the full width dimension $W_f$ of the coupler at the input face and the output face is less than 250 μm.

9. The mode-selective optical fiber coupler of claim 1, wherein a ratio of the tapered width dimension $W_t$ at the midpoint to the full width dimension $W_f$ at the input face or the output face is from greater than or equal to 0.14 to less than or equal to 0.26.

10. The mode-selective optical fiber coupler of claim 1, wherein a width dimension of the coupler varies adiabatically from the full width dimension $W_f$ at the input face and the output face to the tapered width dimension $W_t$ at the midpoint.

11. The mode-selective optical fiber coupler of claim 1, wherein the first core and the second core each have a diameter greater than or equal to 8 μm and less than or equal to 10 μm at the input face and at the output face.

12. The mode-selective optical fiber coupler of claim 1, wherein the first propagation waveguide and the second propagation waveguide are single-moded at a wavelength of greater than 1260 nm.

13. The mode-selective optical fiber coupler of claim 1, wherein the first inner cladding and the second inner cladding each have a diameter greater than or equal to 48 μm and less than or equal to 52 μm at the input face and at the output face.

14. The mode-selective optical fiber coupler of claim 1, wherein the first outer cladding and the second outer cladding each have a diameter less than or equal to 125 μm at the input face and at the output face.

15. The mode-selective optical fiber coupler of claim 1, wherein the coupling length L is greater than or equal to 24 mm and less than or equal to 30 mm.

16. The mode-selective optical fiber coupler of claim 1, wherein:
the first core comprises a first core refractive index $n_{C1}$;
the first inner cladding comprises a first inner cladding refractive index $n_{IC1}$; and
the first outer cladding comprises a first outer cladding refractive index $n_{OC1}$, wherein $n_{C1} > n_{IC1} > n_{OC1}$.

17. The mode-selective optical fiber coupler of claim 16, wherein:
the second core comprises a second core refractive index $n_{C2}$;
the second inner cladding comprises a second inner cladding refractive index $n_{IC2}$; and
the second outer cladding comprises a second outer cladding refractive index $n_{OC2}$, wherein $n_{C2} > n_{IC2} > n_{OC2}$.

18. The mode-selective optical fiber coupler of claim 17, wherein:
$n_{C1}$ and $n_{C2}$ are greater than or equal to 1.455 and less than or equal to 1.46;
$n_{IC1}$ and mu are greater than or equal to 1.45 and less than 1.455; and
$n_{OC1}$ and $n_{OC2}$ are greater than or equal to 1.445 and less than 1.45.

19. The mode-selective optical fiber coupler of claim 1, wherein the first propagation waveguide and the second propagation waveguide are formed from silica-based glass.

20. A mode-selective optical fiber coupler comprising:
an input face and an output face separated by a coupling length L;
a first propagation waveguide extending from the input face to the output face, the first propagation waveguide comprising a first core, a first inner cladding concentric with the first core, and a first outer cladding surrounding the first inner cladding, the first outer cladding having a first outer surface comprising a first arcuate segment and a first engagement segment; and
a second propagation waveguide extending from the input face to the output face, the second propagation waveguide comprising a second core, a second inner cladding concentric with the second core, and a second outer cladding surrounding the second inner cladding, the second outer cladding having a second outer surface comprising a second arcuate segment and a second engagement segment, wherein:
the first engagement segment and the second engagement segment are joined along the coupling length L;
the first propagation waveguide and the second propagation waveguide are tapered from the input face and the output face to a midpoint of the coupler such that a tapered width dimension $W_t$ of the coupler at the midpoint is less than a full width dimension $W_f$ of the coupler at the input face and at the output face;
when a first optical signal consisting of an LP01 mode coupled into the first core at the input face propagates through the first propagation waveguide and is emitted from the first core at the output face, an LP01 loss of the coupler in the first propagation waveguide at the output face is less than 1.0 dB for wavelengths in a spectral band having a bandwidth of less than or equal to 100 nm with a wavelength range from greater than or equal to 800 nm to less than or equal to 950 nm; and
when a second optical signal comprising an LP11 mode coupled into the second core at the input face is cross-coupled to the first core and is emitted from the first core at the output face, an LP11 loss of the coupler at the output face is less than 1.5 dB for wavelengths in the spectral band having the bandwidth of less than or equal to 100 nm with the wavelength range from greater than or equal to 800 nm to less than or equal to 950 nm.

\* \* \* \* \*